US009749795B2

(12) United States Patent
Navarro et al.

(10) Patent No.: US 9,749,795 B2
(45) Date of Patent: Aug. 29, 2017

(54) METHOD AND APPARATUS FOR INTERACTING WITH POTENTIAL PURCHASERS OF ART

(71) Applicant: Art B Co, LLC, Miami, FL (US)

(72) Inventors: Victor Ernesto Navarro, North Miami, FL (US); Pablo Duarte-Hinterholzer, Miami, FL (US); Andrea Ximena Devoto, Miami, FL (US)

(73) Assignee: ART B CO, LLC, Miami, FL (US)

( * ) Notice: Subject to any disclaimer, the term of this patent is extended or adjusted under 35 U.S.C. 154(b) by 0 days.

(21) Appl. No.: 15/072,877

(22) Filed: Mar. 17, 2016

(65) Prior Publication Data
US 2016/0330580 A1 Nov. 10, 2016

Related U.S. Application Data

(60) Provisional application No. 62/158,031, filed on May 7, 2015.

(51) Int. Cl.
*H04W 24/00* (2009.01)
*H04W 4/02* (2009.01)
*G06Q 30/06* (2012.01)

(52) U.S. Cl.
CPC ........ *H04W 4/021* (2013.01); *G06Q 30/0641* (2013.01)

(58) Field of Classification Search
CPC .......... G06Q 30/0641; G06Q 30/0281; H04W 4/021; H04W 4/02; G06F 17/30017; G06F 17/3028; G08B 5/36

USPC ...................................................... 455/456.1
See application file for complete search history.

(56) References Cited

U.S. PATENT DOCUMENTS

| 2016/0011733 A1* | 1/2016 | Mann .................... G06F 3/0484 715/709 |
| 2016/0057270 A1* | 2/2016 | Kazanchian ...... H04M 1/72525 455/419 |
| 2017/0046889 A1* | 2/2017 | Clemente .............. H04W 4/008 |

* cited by examiner

*Primary Examiner* — Timothy Pham
(74) *Attorney, Agent, or Firm* — Michael P. Fortkort, Esq.; Michael P Fortkort PC

(57) ABSTRACT

A method and apparatus enables users to view, lease, purchase and try art in their homes all via an application designed to operate on a portable computing device. An exemplary embodiment of a system for interacting with a purchaser of art includes a communications device that is programmed to gather, organize, and share information between a dedicated platform and end users. The architecture of an exemplary embodiment incorporates three components—an indoor positioning system (termed an art beacon), an Application ("app"), and a platform. The indoor positioning system communicates with mobile devices (Applications) via Bluetooth Low Energy (BLE) technology or similar communications system. The signal strength and amplitude of each art beacon can be adjusted to cover a wide or narrow field to avoid interference with the signals from other nearby art beacons given the space requirements of each participating business. This system works together with a software solution designed to deliver relevant content to mobile devices running the dedicated application.

25 Claims, 46 Drawing Sheets

METHOD AND APPARATUS FOR INTERACTING WITH POTENTIAL PURCHASERS OF ART

RELATED APPLICATIONS

This application claims the benefit of U.S. Provisional Patent Application No. 62/158,031 filed May 7, 2015 by the same inventors and bearing the same title, which provisional patent application is hereby incorporated by reference as if repeated herein in its entirety, including the drawings.

BACKGROUND

The present invention relates generally to methods and systems for displaying art and more particularly, to a method and system for displaying art in an interactive manner to improve the experience of the art by the viewer and potential purchaser.

Art galleries provide a wide variety of art available to those interested, but yet art remains still relatively available and affordable to a small, interested few. Moreover, purchasing art, unlike other consumer products, requires significantly more interaction between the purchaser, the art and the potential placement of the art in the purchaser's environment, often delaying the purchase of the art indefinitely.

The present invention is therefore directed to the problem of developing a method and apparatus for enabling art to be presented to a mass audience both for viewing and purchasing and ease of display of the art in one's environment.

SUMMARY OF THE INVENTION

The present invention solves these and other problems by providing a method and apparatus for enabling users to view, lease, purchase and display art in their homes all via an application designed to operate on a portable computing device (such as, for example, a smart phone, mobile device, portable computing device, handheld computer, portable communications device, personal computer, computer tablet, iPad™, or other similar device), so that decisions affecting the potential purchase can be made more effectively at the point of sale, thereby providing art purveyors a tool to sell their art more effectively and easily.

According to one aspect of the present invention, an exemplary embodiment of a system for interacting with a potential purchaser of art includes a portable computer and communications device that is programmed to gather, organize, and share information between a dedicated platform and end users. The exemplary embodiment includes a database storing relevant content regarding displays of works of art and a server coupled to this database. The server stores relevant content for each of the displays of works of art in relation to a unique instruction that can be used to query the database or otherwise obtain the relevant content for a particular display.

In turn, the server is connected to a communications network to enable multiple similar computing devices also coupled to the communications network to interact with the server and database. The server may be a single server or multiple servers located in one or more different locations, but all enabling multiple devices to access the database as needed.

A spatial positioning system disposed near the displays of works of art transmits data with an encoded unique instruction regarding one or more works of art. The spatial positioning system could be located indoors, outdoors, in public spaces or private spaces depending on the specific application and location of the works of art. Each of the displays can employ its own unique low energy beacon transmitter with its own encoded unique instruction associated with the display so that the encoded unique instruction can be used to query the database for the correct relevant content. The low energy beacon can be a Bluetooth™ or similar signal. Moreover, multiple pieces of art can be assigned to one or more of these low energy beacons.

An application is encoded on a non-transitory computer readable media for execution on a mobile device (or other similar portable communications and computing device), which application enables the mobile device to interact with the server and database upon detection of the low energy beacon and the unique instruction encoded therein to obtain the relevant content regarding the displays of works of art.

According to another aspect of the present invention, an exemplary method for interacting with a user regarding displays of works of art stores in a database relevant content regarding the displays of works of art. Each of the displays has associated therewith a unique instruction, which enables one to query a database using the unique instruction via a server coupled to the Internet or other communications network, which could either be a public or private network. One or more transmitters may be disposed near the displays of works of art—each transmitter near one of the displays, and each of the transmitters transmits a low energy beacon having encoded therein a unique instruction for each display, which instruction is used to query the database. A mobile device interacts with the server and database upon detection of one of the low energy beacons and the unique instruction encoded therein to obtain relevant content regarding the display associated with the unique instruction.

According to yet another aspect of the present invention, an apparatus to enable a user to interact with at least one of a plurality of artwork displays using a portable computing device includes a computing platform, one or more spatial positioning systems and an application for downloading and executing on a portable computing device. The computing platform includes a database storing a relevant content file regarding each of the plurality of artwork displays in relation with a unique instruction for each of the plurality of artwork displays. The computing platform may also include a server coupled to the database, which server may be coupled to a communications network so that a plurality of other computing devices that are also coupled to the communications network may interact with the database. Each of the plurality of spatial positioning systems are disposed near one of the plurality of artwork displays, and each of the spatial positioning systems transmits a low energy beacon having encoded therein one of the unique instructions related to the one of the plurality of artwork displays near which each spatial positioning system is disposed. A non-transitory computer readable media has encoded thereon the application for executing on the portable computing device. The application enables the portable computing device to interact with the communications platform upon detection of one of the low energy beacons by using an encoded unique instruction encoded in the detected low energy beacon to obtain the relevant content file related to the encoded unique instruction from the database. The relevant content file may include: an artist's biography, an artist's statement, one or more artwork descriptions, artwork availability, gallery information, venue information and/or related digital marketing collateral. The application may also include a visualizing module in which a user can take a picture of a desired location for a selected artwork (or use a previously taken and stored image or picture), specify dimensions within the picture, electronically place the selected artwork into the picture and view the selected artwork in proportion in the desired location, thereby enabling the user to view size, color and image suitability of the artwork. This picture can be stored locally within the electronic device, or within the user's profile web/cloud space (etc.) and shared via text, e-mail, social media, etc. The application may also include an alert (e.g., a push-notification, proximity alert, instant message, e-mail, or text message) to be displayed on the portable computing device, which alert is triggered when the portable computing device breaches (i.e., enters or exits) a location where a previously selected work of art is being displayed, which alert invites the user of the portable computing device into the location to view and interact with the previously selected work of art in which the user has previously indicated interest. The application may also enable the user to establish a predetermined distance in proximity to the location in which the previously selected art is being displayed, which controls a distance from the location at which the alert is triggered. There are multiple options that may trigger the alert. For example, but without limitation, the alert may be triggered when the portable computing device breaches (e.g., enters or exits) a location where: (i) a previously selected piece of art is being displayed; (ii) a hyper-contextual or auto-tag event has occurred; or (iii) the client's profile preferences, Wishlist item(s), social sharing, or deep link meets a segmentation criteria.

According to still another aspect of the present invention, an exemplary embodiment of a method for interacting with a user regarding one or more displays of one or more works of art includes: storing relevant content regarding said one or more displays of said one or more works of art, each of the stored relevant content being stored in relation with a unique instruction; disposing a plurality of transmitters near a plurality of displays of the one or more works of art, each transmitter being disposed near only one of the one or more displays, each of the transmitters transmitting a low energy beacon having encoded therein only one of the unique instructions for said only one of said one or more displays; and causing a mobile device to interact with a server and a database upon detection of one of the low energy beacons being transmitted for a particular one of the one or more displays using an encoded instruction encoded within the detected one of the low energy beacons to obtain the relevant content related to the encoded instruction and the particular one of the one or more displays. In this exemplary embodiment of a method, the relevant content may comprise one or more of the following: an artist's biography, an artist's statement, one or more artwork descriptions, artwork availability, gallery information, venue information and related digital marketing collateral. This exemplary embodiment of a method may include generating an alert to be displayed on the mobile device, which alert is triggered when the mobile device is within a geo-fence (macro) and/or micro-fence (beacon generated area of coverage) where a selected work of art in which the user of the mobile device has previously expressed interest is being displayed, which alert invites the user of the mobile device into the location to view and interact with the selected work of art. In this case, the terms macro-fence or micro-fence relate to the difference between the size of the space covered by the geo-fence. One example of a micro-fence could be a viewing area around a single piece of art, whereas one example of a macro-fence could be an entire art gallery, just to name two types of geo-fences.

This exemplary embodiment of a method may include enabling the user to establish a predetermined distance in proximity to the location in which the selected work of art is being displayed, which controls a distance from the location at which the alert is triggered.

According to still another aspect of the present invention, an exemplary embodiment of a method for interacting with a user regarding one or more displays of one or more works of art includes: providing an art viewing application to a subscriber for installation on a wireless communications device; storing relevant content regarding each of said one or more displays of said one or more works of art, each of the one or more displays having associated therewith a unique instruction via which the relevant content for said each of the one or more displays can be retrieved; and disposing a plurality of transmitters near a plurality of displays of one or more works of art, each transmitter being disposed near a particular one of the one or more displays, each of the transmitters transmitting a low energy beacon having encoded therein a particular unique instruction for a particular one of the one or more displays. This exemplary embodiment of a method may include causing the wireless communications device to interact with a server and a database upon detection of one of the low energy beacons and the particular unique instruction encoded therein. This exemplary embodiment of a method may include transmitting formatted relevant content regarding the particular one of the one or more displays associated with the particular unique instruction over a wireless communication channel to the wireless communications device associated with the subscriber. This exemplary embodiment of a method may include activating an alert to cause the alert to display on the wireless communications device and to enable connection under user control via a Uniform Resource Locator (URL) to the server and database over the Internet (or any other public or private network) when the wireless communications device breaches the micro-fence of any of the beacons or has breached a geo-fenced area. In this exemplary embodiment of a method, the relevant content may comprise one of more of the following: an artist's biography, an artist's statement, one or more artwork descriptions, artwork availability, gallery information, venue information and related digital marketing collateral.

According to yet another aspect of the present invention, an exemplary embodiment of a non-transitory computer readable media has encoded thereon an application for executing on a portable communications device to enable a user to interact with one or more displays of one or more works of art. In this exemplary embodiment, the application may include: a detection module to enable the portable communications device to detect a low energy beacon having encoded therein a unique instruction code associated with one of the one or more displays of the one or more works of art; a communications module to cause the portable communications device to interact with a database storing relevant content regarding the one or more displays of the one or more works of art upon detection of the low energy beacon using the unique instruction encoded within the low energy beacon to obtain relevant content regarding said one of the one or more displays of the one or more works of art; and a viewing module to enable the user to view the relevant content regarding said one of the one or more displays of the one or more works of art on the portable communications device. In this exemplary embodiment, the application may include a visualizing module in which a user can take an image of a desired location of selected artwork, specify dimensions within the image, electronically place the selected artwork in the image and view the selected artwork in proper scale within the image of the desired location, thereby enabling the user to view the selected artwork in the desired location to view size, color and image suitability of the selected artwork. In this exemplary embodiment, the communications module may generate an alert to display on the portable communications device and upon user control to enable connection via a URL to the database over the Internet when the portable communications device breaches the micro-fence of any of the beacons or has breached a geo-fenced area. In this exemplary embodiment, the relevant content may comprise one of more of the following: an artist's biography, an artist's statement, one or more artwork descriptions, artwork availability, gallery information, venue information and related digital marketing collateral. In this exemplary embodiment, the application, the application may include an alert to be displayed on the portable communications device, which alert is triggered when the portable communications device is within a geo-fence and/or micro-fence where a user selected work of art is being displayed, which alert invites the user of the portable communications device into the location to view and interact with the user selected work of art in which the user has previously indicated interest and/or is hyper-contextually linked. In this exemplary embodiment, the application may enable a user to set a predetermined distance in proximity to the location in which the user selected art is being displayed, which controls the distance from the location at which the alert is triggered.

DETAILED DESCRIPTION

Figure 1:
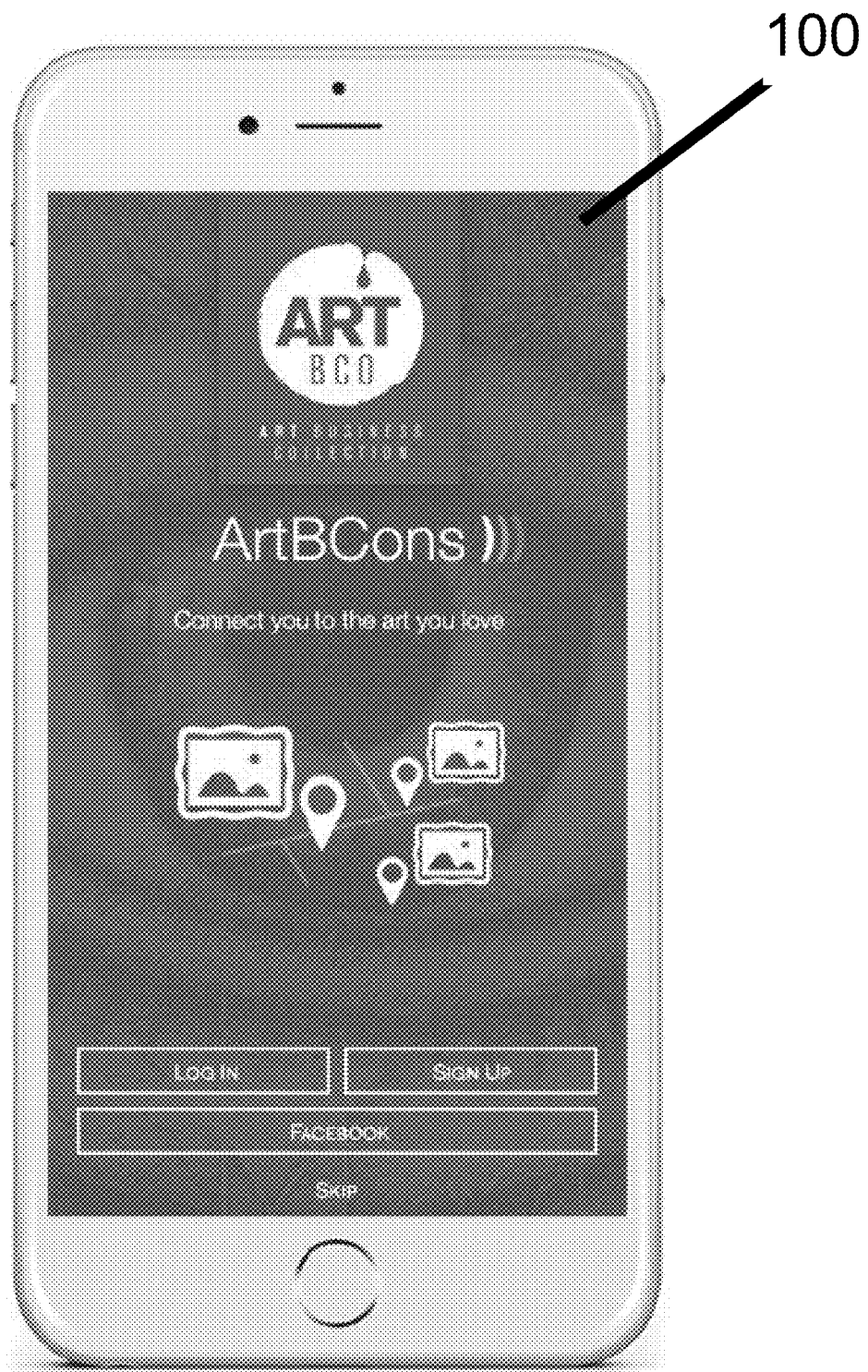
FIG. 1 depicts an exemplary embodiment of a main entry screen of an application for interacting with art, which application is executable on a handheld computing device according to one aspect of the present invention.

The architecture of an exemplary embodiment of the present invention incorporates three components—a spatial positioning system (also termed an art beacon), an Application ("app") for execution on a remote portable computing device, and a computing platform with a server and database. The spatial positioning system communicates with remote portable computing devices, such as mobile devices, smart phones, handheld computers, portable computers, iPAD™s, wearable technology, or other similar devices via an Application executing on such device, which Application has been downloaded and installed on the device previously. Communication between the art beacon and a mobile device occurs via Bluetooth™ Low Energy (BLE) technology or a similar communications system. The signal strength and amplitude of each art beacon can be adjusted to cover a wide field or a narrow field to avoid interference with signals from other nearby art beacons given the space requirements of each participating business or for certain exhibits within a large gallery. This system works together with a software solution on the platform designed to deliver relevant content to mobile devices running the dedicated application.

Art Beacons

An art beacon is an electronic device that creates a personal area network, aka micro-fence, and transmits a signal (in the form of packets of data) to mobile apps, on both iOS and Android systems, whose primary function is to facilitate the delivery of hyper-contextual content based on the proximity of the mobile device to goods and services within a given space.

The Art Beacon may be implemented using a commercially available product, such as those provided by Kontakt-io (model Kontakt.io, Smart Beacon ibeacon format), and Shenzen Minew, model i4 Pilot iBeacon. The Art Beacon uses BLE technology, which uses a 2.4 GHz radio that is dual mode and connects to traditional Bluetooth™ as well as Low Energy (LE) devices. The modulation uses a 0.5 index which allows the devices signal to be split into 40 potential channels—one channel can have an "advertising" interval of one packet every 350 milliseconds to every 10 seconds. Instructions may contain up to 47 bytes in length formatted as: 1 byte preamble, 4 byte access address, 2-39 bytes advertising channel PDU, 2 byte Header (2 byte is size and type of payload—type of connection and whether the device supports it), 6 byte MAC Address (device info contained in payload), up to 31 bytes data (actual information), 3 bytes CRC. Setting up the art beacon only involves programming them on the contextual marketing service platform (e.g., Pulsate™). Data transmission happens only when a campaign is created on Pulsate™ and "attached" to one specific beacon, a selection of beacons, or all beacons.

Setup and Operation

A user must download and install ArtBCo's app and "opt-in" to receive alerts (e.g., push-notifications, proximity alerts, and instant messages) through the platform. This equips the mobile device to "listen" for a beacon's signal. The opt-in permissions allow the app to not have to actively run in the background in order to listen for beacon signals or receive any communication from the ArtBCo platform.

The signal itself is an empty data packet (pulse) that contains an instruction that tells the mobile device to connect to ArtBCo's platform. Only smartphones that have downloaded the app, and have opted-in to receive alerts, can listen for beacon signals, even if the app is not running in the background. An instruction that is negotiated between the smartphone and the platform is hyper-contextual which means it depends on the user's profile, their preferences and the context (location, galleries or artworks in sight/range, frequency of visits/views, etc.).

When a beacon's micro-fence is "breached" by a mobile device, the application aspect is already listening for a beacon's signal. A breach occurs when a mobile device crosses a micro-fence's threshold either upon entry or exit. The signal contains an instruction telling the mobile device to connect, through its cellular network or Wi-Fi, to a specific URL or the application's cache that contains content relevant to the specific "event" that just occurred.

An event, in this context, can be any physical occurrence such as entering a gallery space, walking near a piece of artwork, or exiting the gallery all within a beacon's micro-fence, depending on the programming and the application desired. Thus, a wide variety of implementations are possible. A beacon is also capable of detecting the proximity of a mobile device in relation to the beacon's own position (i.e., it knows how far or close a mobile device is to it).

Process

As to how the connection is routed, it begins when the smartphone hears the signal from the beacon which instructs the smartphone to connect to its cellular network, or a Wi-Fi network, which then connects to the Restful-API aspect which interprets the signal and directs the connection to the platform's database. When the specific content is located on the platform's database, it is routed back to the Restful-API which interprets (or "understands") this as the content the smartphone was searching for and routes it through cellular network, or Wi-Fi, back to the smartphone's display.

This same set of interactions/communications can happen when a user breaches a geo-fence (macro fence). These macro-fences are set using a contextual marketing platform like Pulsate™ and can potentially cover an area as small as a small block/building to the size of a country.

Experience

When exposed to a signal from a beacon (micro-fence) the smartphone connects with the platform (e.g., an API/database) and obtains specific content that is relevant to the profile of the user and/or their physical location in relation to the beacon. As an example, this beacon is placed near an artwork, for example one considered French Impressionism inside a gallery, a genre in which the user has indicated interest in, for example. Within the beacon's signal an instruction will say "Artwork: French Impressionism" which the mobile device cross-references with the user's profile and confirms a match then proceeds to obtain the content. This is how a contextual marketing campaign is programmed and deployed in its simplest form using a service such as Pulsate™.

The user of the smartphone can engage/react to the specific content provided by triggering other instructions from the smartphone to the platform such as requesting more content, instant messaging, etc. Again, the smartphone will connect to the platform (API/database) via cellular network or Wi-Fi and obtain, from it, the corresponding content or enable a specific functionality.

At the same time, while the smartphone "listens" to the beacon's signal/pulse, the app actively monitors the behavior of the user while inside the micro-fence including measuring dwell times (the amount of time a user "dwells" within a beacon's micro-fence), location (maintained separately by managing a beacon database containing beacon ID's and gallery address where they are placed), information being requested, etc. and stores these events as "big data" for later analysis and targeted marketing on an individual or large scale. A user can be tracked not only through Bluetooth but also by cellular network or Wi-Fi.

One Beacon with Multiple Instructions

A single beacon is capable of transmitting more than one signal (packet of data) at a time. As stated before, a signal must contain an instruction for a mobile device to recall and display content that a user may find valuable, useful, or engaging and may trigger an action by them. Signal transmissions can only occur when a user meets criteria that have been defined through segmentation.

Segmentation, in this context, is a logic-based framework that combines a variety of aspects in an unlimited number of ways, such as an individual's personal characteristics (e.g., demographic, psychographic, behavioristic, etc.) with their location and a specific event (as previously defined), etc. One or more segments can then be programmed into any number of beacons at a time thus allowing a single beacon to transmit multiple instructions or multiple beacons to transmit a single instruction.

System Interaction

Art beacons (e.g., low energy transmitters encoded with unique instructions associated with relevant data in a searchable online database accessible through the platform) can be applied to a range of functionalities from welcome messages to contextual marketing communications. When a mobile device is within a predetermined range of an art beacon, the mobile device "listens" for the signal being transmitted, which triggers the app to interact with the online platform to obtain hyper-contextual content in real-time. The platform includes a database and a restful-API (interface), which interacts with a client (such as a mobile device, tablet, web, etc.). The content requested is drawn from the central repository and relays elements such as, but not limited to, an artist's biography, an artist's statement, artwork descriptions, artwork availability, gallery or venue information, and related digital marketing collateral. Other information may be included without departing from the scope of the present invention.

By providing immersive content, the platform receives and records quantifiable behaviors in the form of "big data." Big Data is best described as the volume of data generated at the systemic level, called "events" (e.g., transaction, streaming, POS) at high velocity from a variety of entry points; in the context of the present invention these volumes of data are captured through the preferences, interests, interactions, and responses. These data are accumulated as qualitative (e.g., experience-based) information that is parsed, categorized, and organized as quantitative analytics or measurable data.

The solution also captures and retains demographic information as users create individual profiles. This information is used to create an initial layer of segmentation that includes, but not limited to Name, Email, Social Media handles (which allows users to tag and/or share with others users within the app), and Preferences, such as: (i) Artist's name, gender, age, and nationality, for example; (ii) Artworks, mediums used, year produced, style, color and other information desired to be shared by the Artist, for example; (iii) Biographical information, including artist's statement; (iv) Pricing, leasing, and commissioning options; (v) Location (e.g., gallery, and public space) and address; (vi) Status (e.g., available for purchase, lease, on hold, currently on lease, sold, etc.); (vii) Address (Street, Apt., City, State, Zip, Country, Phone); and (viii) Credit Card (Card Number, Card Holder, Expiration Month, Expiration Year, Security Code, option to save in profile).

A user may skip this process, which limits the range of features they can access; allowing them to view and filter artworks in their immediate area and view basic artist and artwork content.

Geo-Fencing and Contextual Marketing

Figure 44:
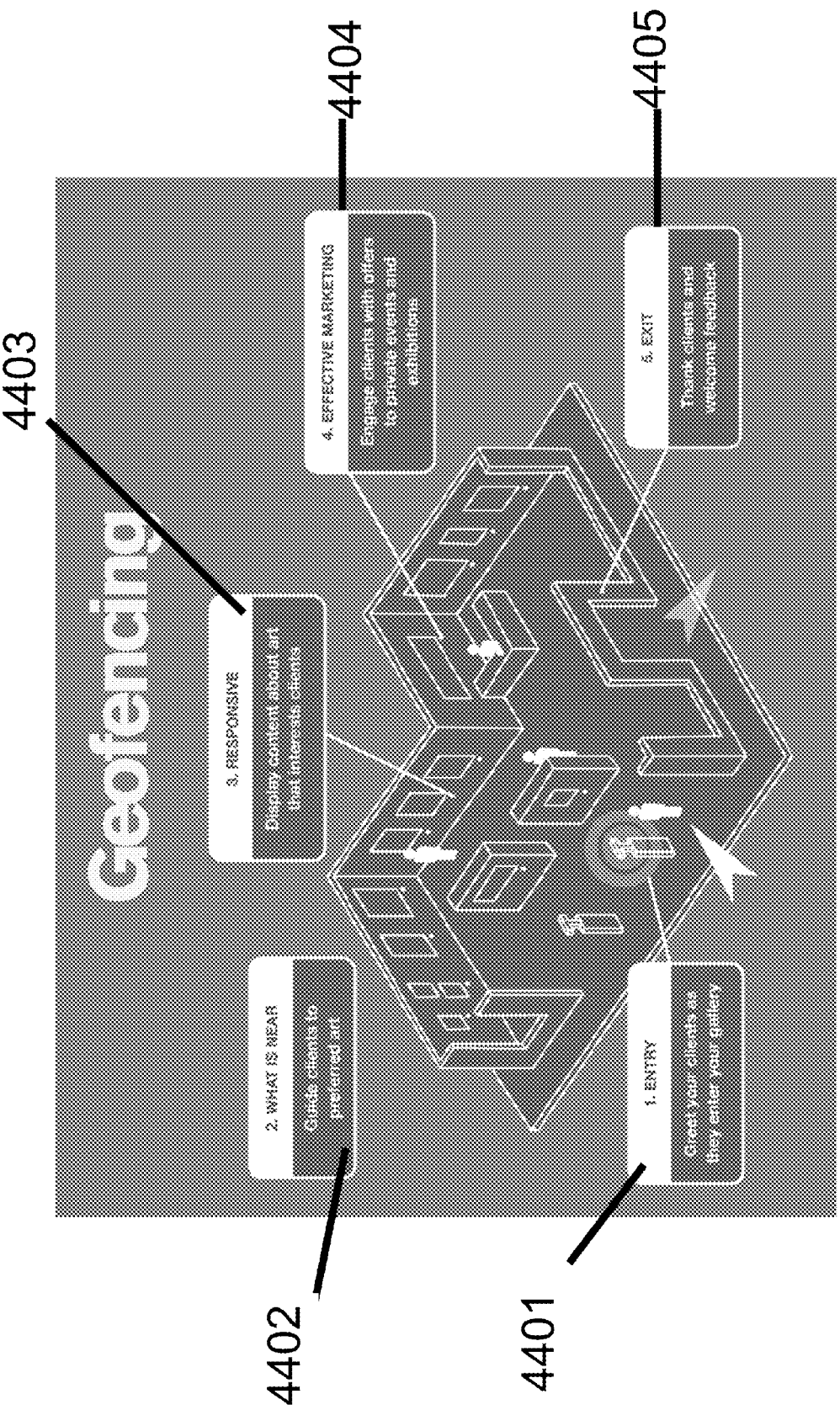
FIG. 44 depicts a block diagram of a geofencing block diagram of one aspect of the present invention.

Referring to FIG. 44, art purveyors can define a specified geographical range in which, upon breaching this area, users receive an alert 4401, text message, or an email, from participating businesses. Further alerts 4402 can be used to guide client to preferred art based on the settings in the client's list. Content about the art 4403 can be displayed. Clients can be engaged with offers 4404 to private events and exhibitions. Finally, clients can be thanked and asked for feedback 4405 through an alert, email marketing, or text messaging, etc.

Figure 43:
FIG. 43 depicts a block diagram of a user receiving a push notification or alert regarding art on display nearby, about which the user may be interested in receiving information according to still another aspect of the present invention.

An alert 4302 (See FIG. 43) can only be received if a user has opted-in allowing alerts on the user's portable computing device or smart phone; however, if the user has not opted-in then a text message and/or email may be sent—the receipt of which may not necessarily coincide with a user being within a geo-fence and/or micro-fence.

Users are asked to opt-in immediately after launching the application for the first time and/or can set this trigger for alerts when the user creates his or her profile, which will activate immediately based on the user's preferences. Artwork added to 'Favorites' or 'WishList' will also trigger a notification when the user breaches a geo-fenced area set up according to the present invention.

The alert also serves to deliver Contextual Marketing that can capture: (i) the effectiveness of the alert—that is, the number of users who walk into a business in response to the alert or who to return to the business after exiting without recording a transaction; (ii) client whereabouts that lead to understanding how often a client visits a particular gallery or area where art is kept; and (iii) measure engagement—does the client now seek other venues where their favorite artists and galleries are showing or do they only show interest in specific pieces?

By collecting and analyzing this data in real time, targeted marketing efforts may be customized, context-specific, and deliver relevant messaging more effectively which increases conversions. The collection of data is not necessarily dependent on a user being in a geo-fenced and/or micro-fenced area as the solution can pull information from other points of entry such as searching, filtering, and sharing artworks through social channels, events, as well as preferences.

Relevant/current information: Once a client enters a gallery either by following an alert, or by walk-in, they begin interacting and learning more about current offerings. Information regarding new artists, artwork, events, availability of items (e.g., sold, price, leasing), promotions, exhibitions, etc. is made readily available through the platform and app interacting. The data gathered provides:

Analytic information: Clients' interest level can be categorized by assessing whether they remain focused on what they came to see or if they become engaged with related items—this is termed "dwell time."

Trends: User engagement is compiled to show where the 'hotspots' exist. Reflects if a particular artist or artwork resonates with the public, which can help drive selling costs as well as the artists' status.

Recommendations: Related material is recommended based on the user's preferences whether stated or inferred. These items are actively forwarded to the user which is measured separately.

Segmentation: Clients may be automatically tagged for future promotions, events, exhibitions, and various art categories. For example, if a client walks into a gallery, or is browsing online, and adds an artist or artwork, categorized as 'Abstract', for the first time to their Favorites they are automatically tagged as "Interested in: Abstract."

Various art categories. For example, if a client walks into a gallery, or is browsing online, and adds an artist or artwork, categorized as 'Abstract', for the first time to their Favorites they are automatically tagged as "Interested in: Abstract."

Locator Functionality

The present invention allows users to locate where art is kept. It acts as the bridge between a gallery's database and the user interface using a map portal running on a personal computer or App executing on a mobile device or smart phone, for example.

Measuring Behavioristic: When a client searches for a particular artwork the system calculates the distance they must travel to view it; this information can be used to determine how far clients are willing to travel and during what times and do these leads result in any transactions. This information would be used to define a media strategy based on reach and frequency.

Feedback: Clients, artists, galleries, dealers, and affiliates have the ability to communicate directly with one another before, during, and after calendar events, exhibits, and everyday walk-ins.

Clients: The information clients leave can help to strengthen, improve, or settle the relationship they have with providers (e.g., galleries, dealers, purveyors). They can comment on their experience allowing providers to respond accordingly before reaching social media.

Providers benefit from this information by continuing their operations and either enhancing the experience or adapting to clients' concerns. This also creates an opportunity for follow up and reengaging clients to determine if their efforts are effective.

The interaction between users and the solution enhances the experience by strengthening engagement, differentiating the operator of the present invention brand from its competition through its integrated solution and ease of use that also gives it a competitive advantage, and establishes a brand presence which effectively amplifies brand loyalty and long term client equity.

Art Visualizer

Figure 35:
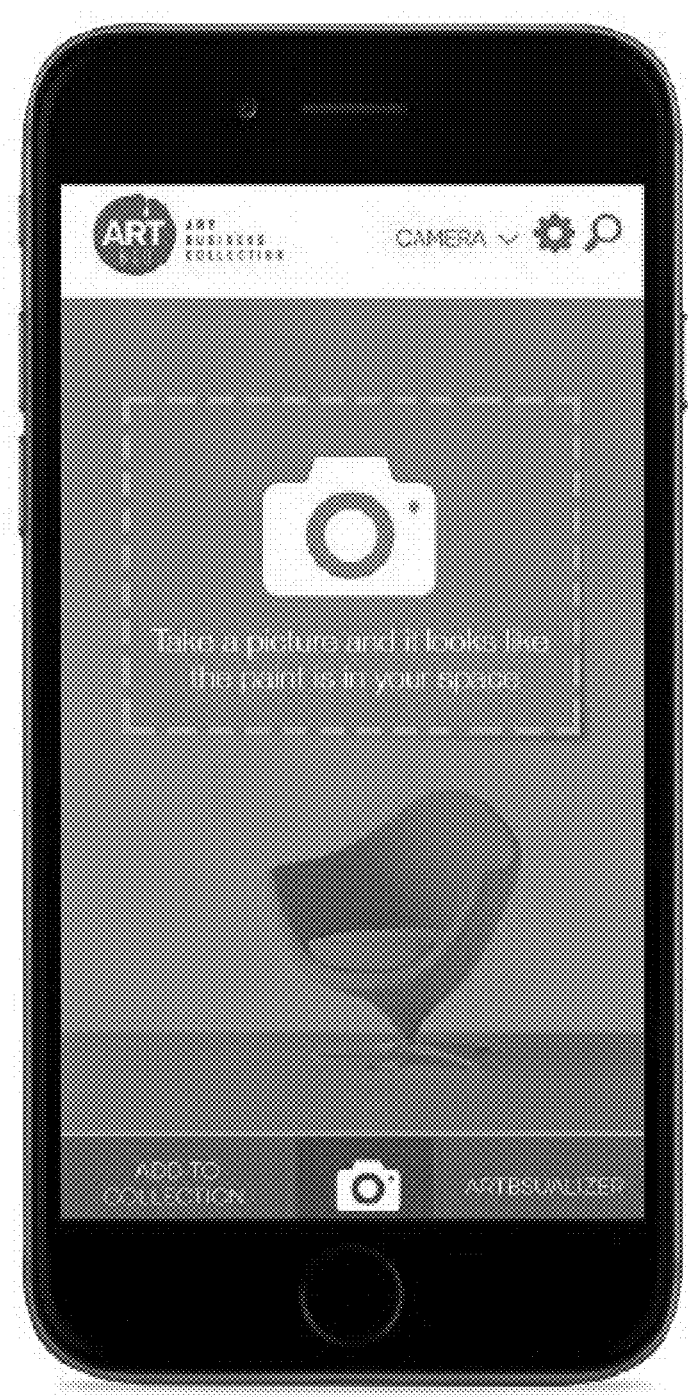
FIGS. 35-36 depict screens for enabling a user to add a camera picture to his space according to still another aspect of the present invention.
Figure 36:
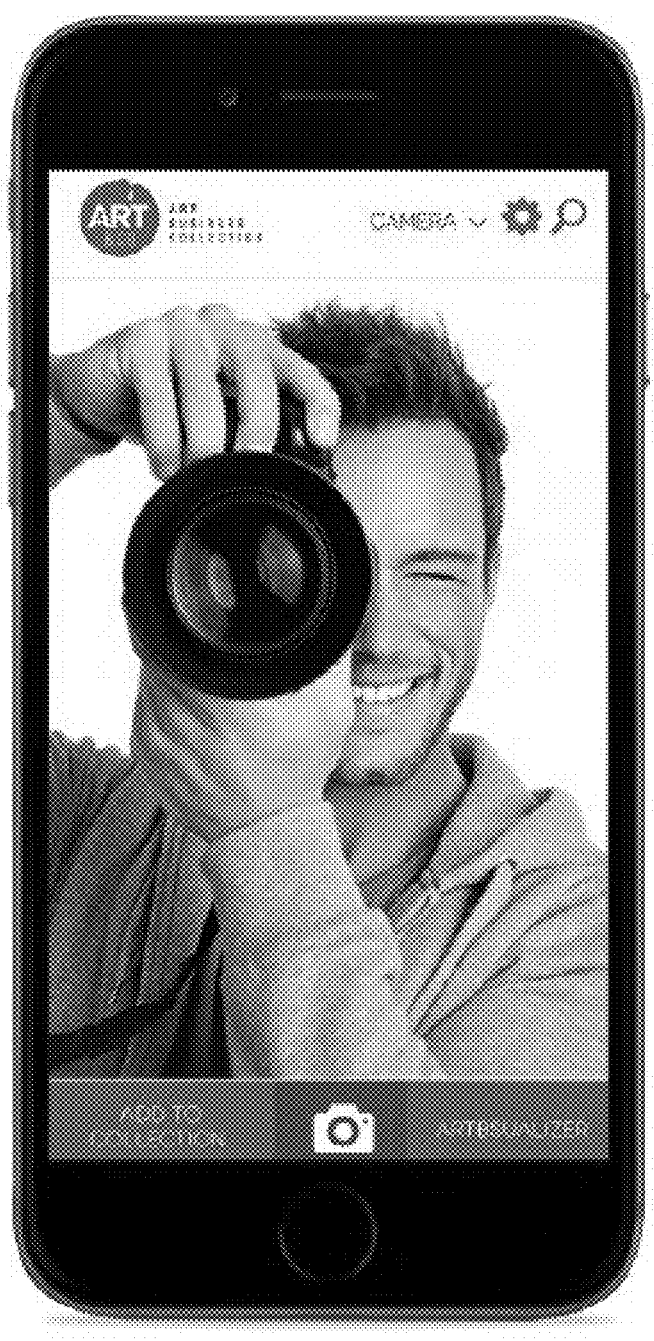
Figure 37:
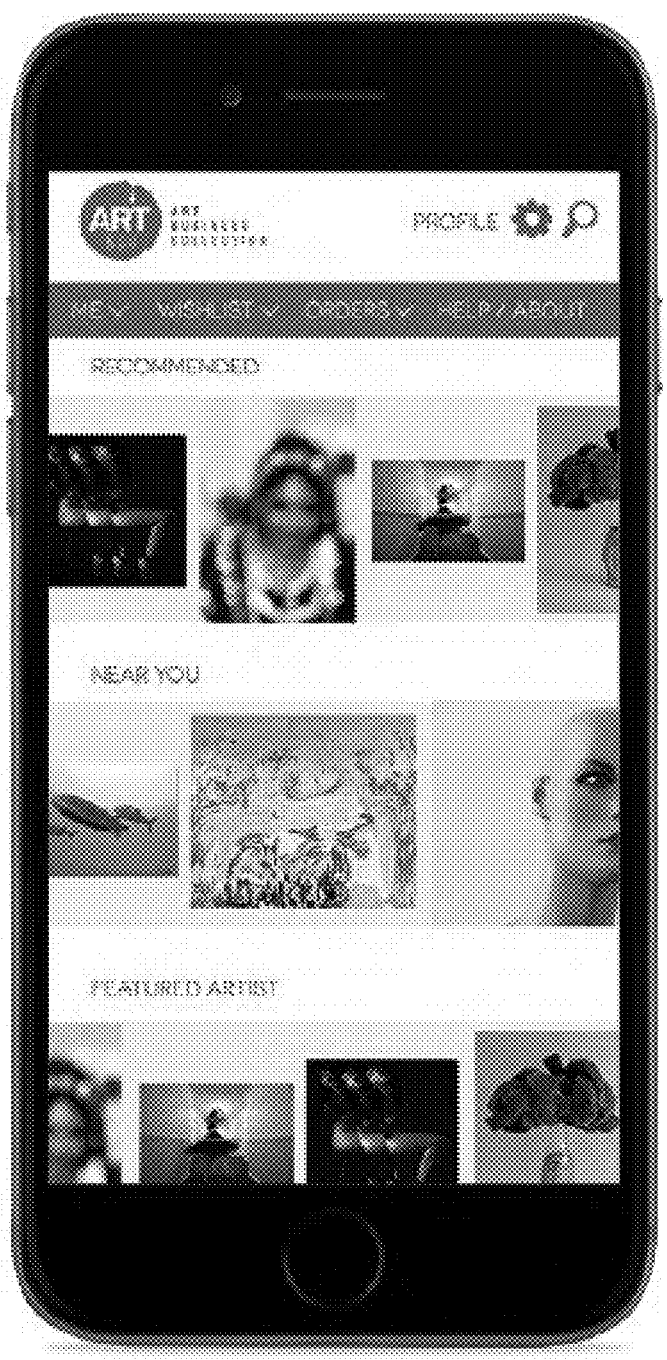
FIG. 37-39 depict exemplary embodiments of how a user accesses his wish list and details within each wish list of the application of the present invention according to yet another aspect of the present invention.

Within the solution of the present invention is a visually contextual feature called the Art Visualizer for execution within the App on the mobile device. See FIG. 23. The visualizer tool assists clients in visualizing how art products would appear relative to the size of their defined space 2301. FIG. 35 shows another opening screen to enable a user to take a picture and place it in his space. By accessing the mobile camera within a smart phone, portable computing device or other similar device, the feature lets users record their spaces 2300 (e.g., available wall space in the home or place of business) and superimpose a selected piece of art, which is accessible directly through the app (e.g., Camera, Wishlist, Saved Photos, etc.) or solution, upon the space. Artworks are scaled to reflect their "true" size and accurate colors. The pieces may also be repositioned around the space to choose the "perfect" placement for them; this gives users a better sense of control when they are engaged decision-making at the time of purchasing. The screen permits the user to define a new space 2301 by taking a picture 2302 or choosing from a gallery 2303.

First, the artwork's details in ArtBCo's database contains dimensions (i.e., length and width) which the app can reference when needed. When using the visualizer feature, upon the user indicating where the top and bottom borders are in the space, the artwork will be visualized (an entire wall, space above fireplace, etc.). When the user enters the distance between the top and bottom borders, it is important to be accurate as possible in this step since the value entered is what the app uses to calculate the relative size of the artwork against the background space.

Figure 24:
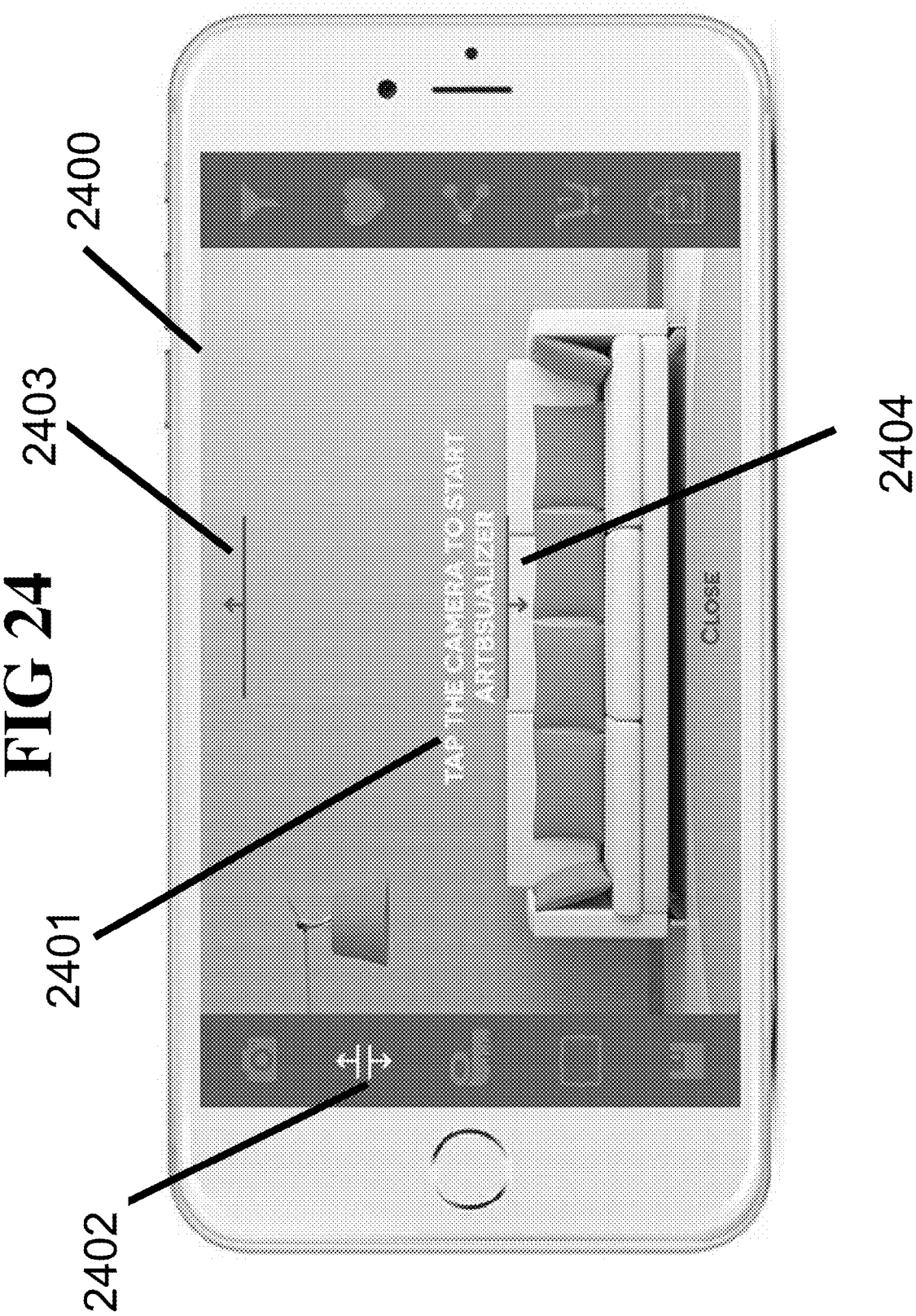

Turning to FIG. 24, to add a new space 2400 in which the user desires to visualize certain artwork, the user taps the camera 2401 to start the ArtBsualizer and the following steps occur:

1. Users must take a picture of the wall or area where they intend to view the art by tapping on the camera icon 2304 on the top left of the control panel. After tapping the camera icon 2304 a menu 2301 appears to take a new picture 2302 or select from the mobile device's album 2303 or from virtual storage provided through the application.

2. Once the picture is taken the user has the option to continue to the next step or retake the picture.

3. Once the user selects the sizing icon 2402 two horizontal lines 2403, 2404 appear in a red-orange color in the center of the image (see FIG. 24); the user must drag one line to where the wall intersects the ceiling and the other to the floor.

Figure 25:
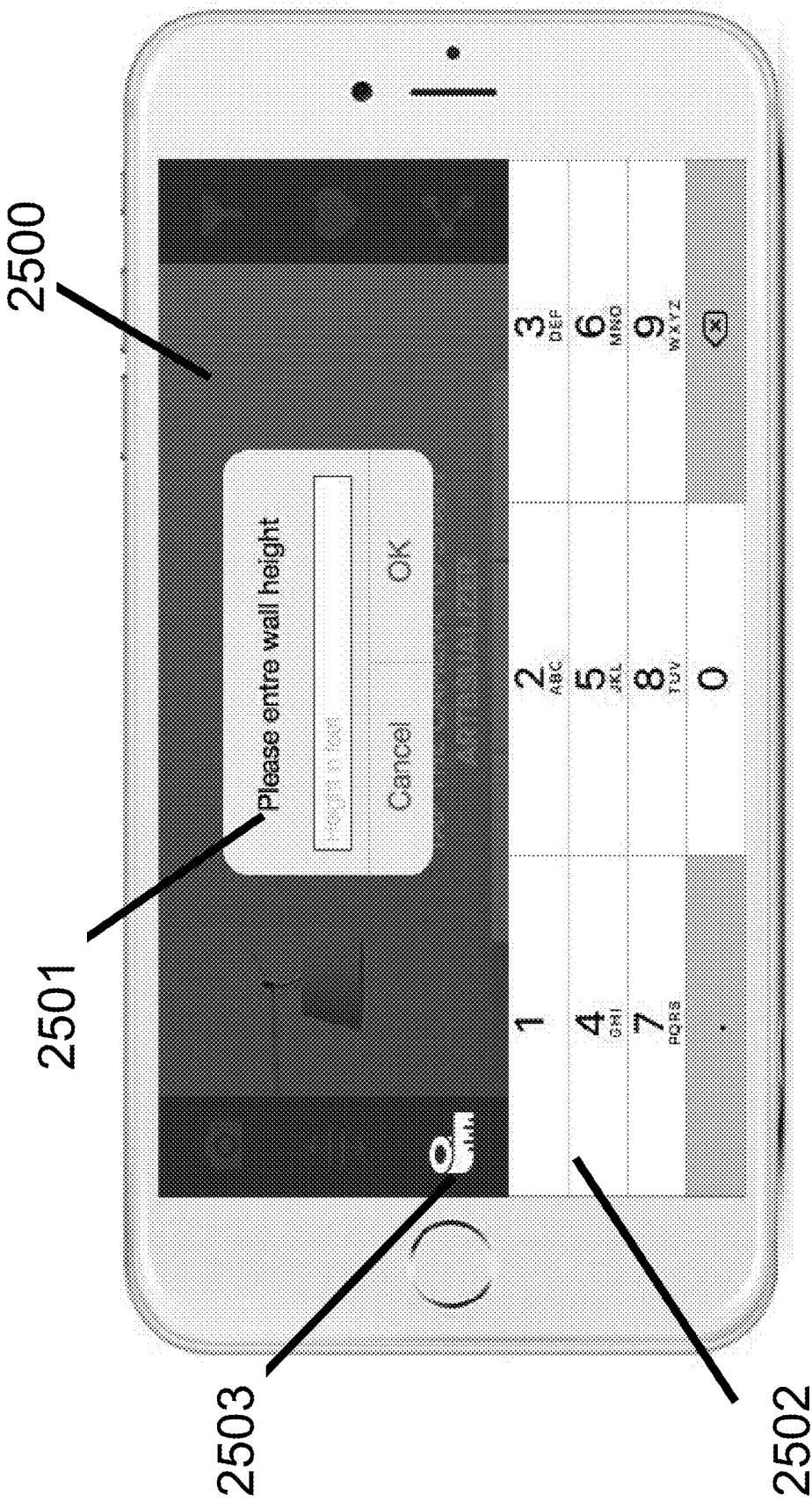

4. Selecting the tape measure icon 2503 opens a menu via which the user must then indicate the height of the surface space in menu 2500 and entering the height 2501 (see FIG. 25) via keypad 2502.

Figure 26:
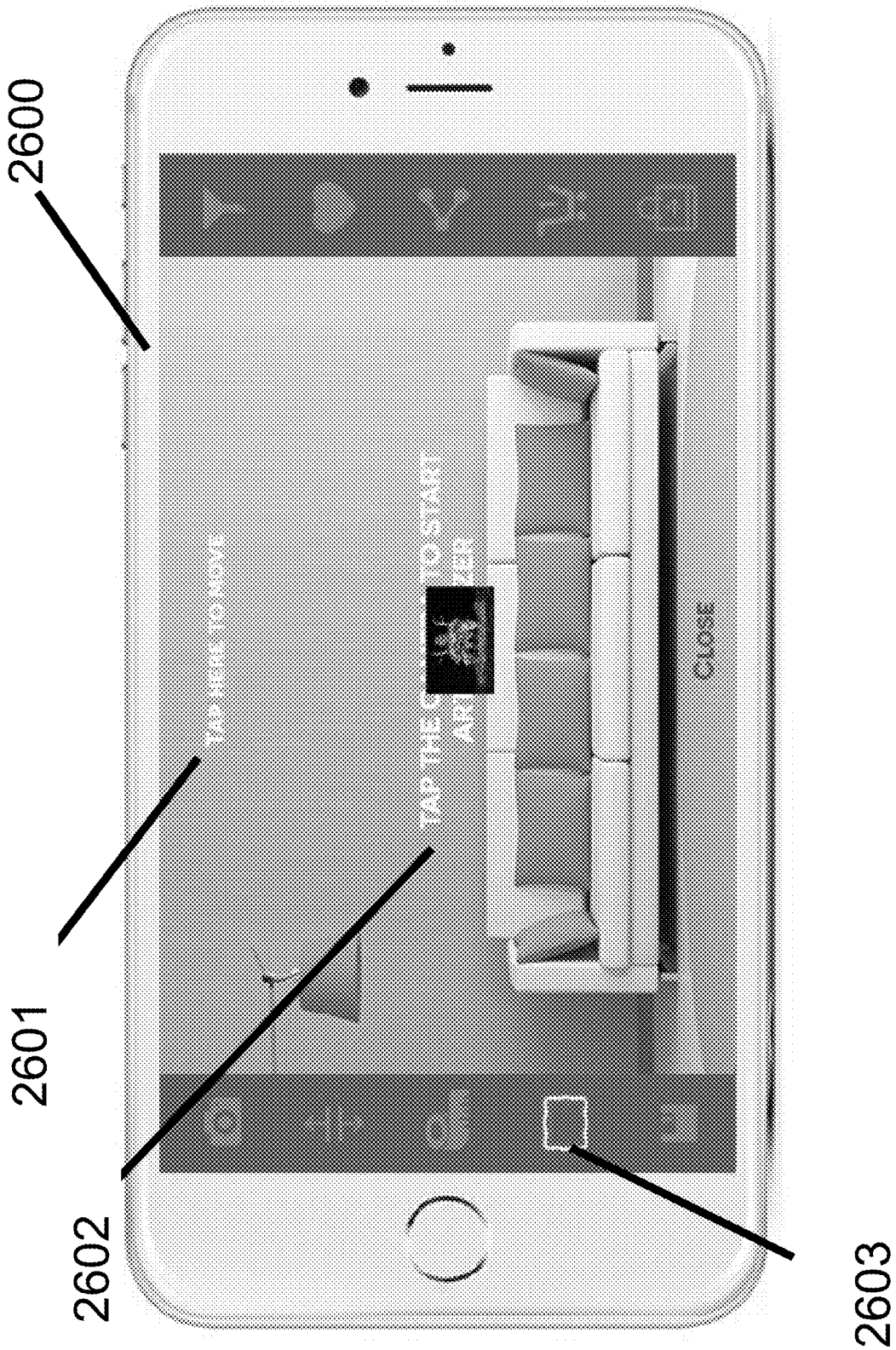

5. FIG. 26 shows screen 2600. By tapping the frame icon 2603 the user confirms the height of the wall and renders the image to incorporate every available piece of art to scale (see FIG. 26). The user can move the art 2601 or restart the visualizer 2602.

Figure 27:
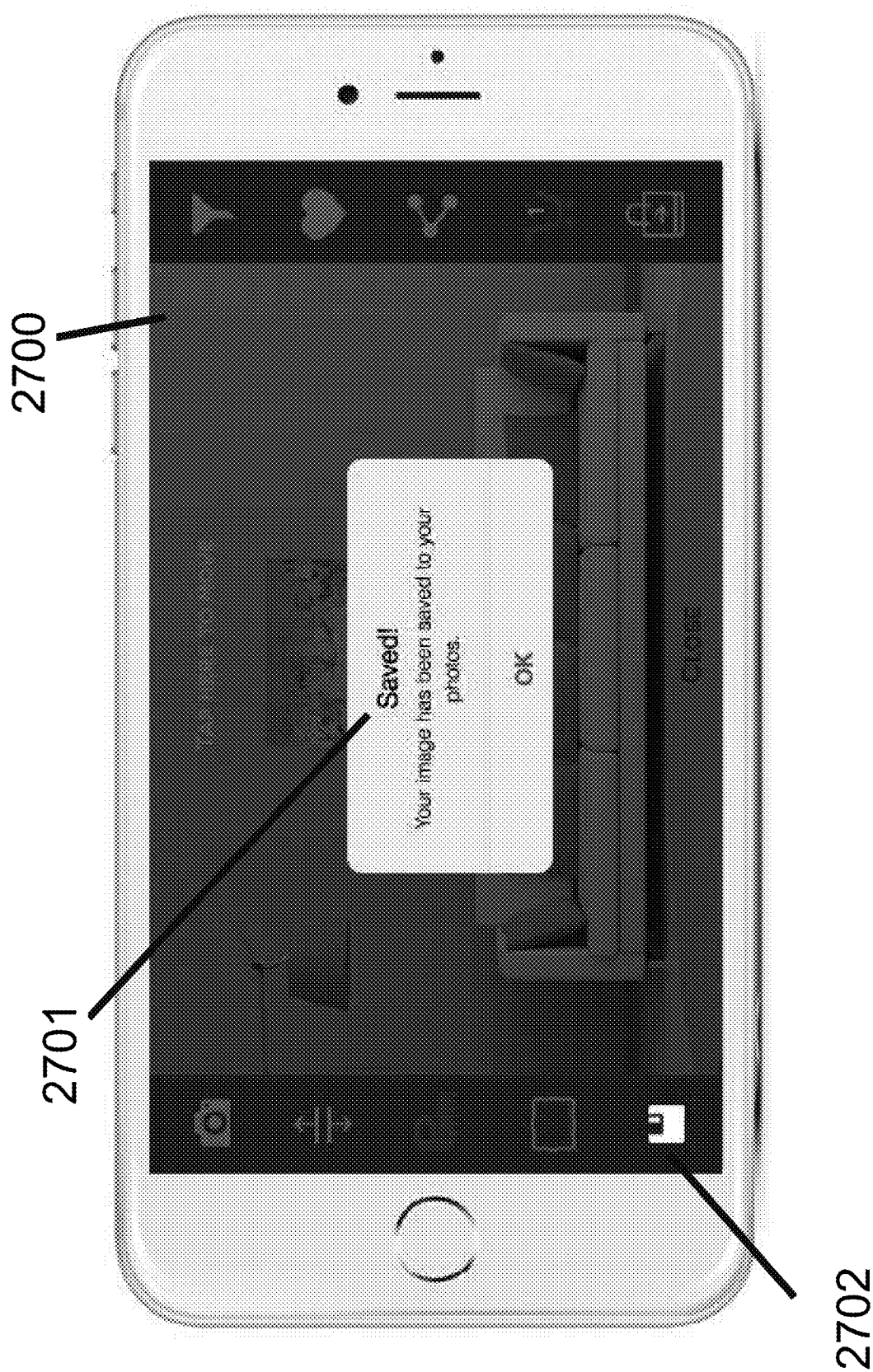

6. When the user is ready to save the space with the piece of visualized art they will tap on the diskette icon 2702 to keep the rendering in their phone's memory (see FIG. 27). This opens screen 2800 in FIG. 28. Message 2701 appears indicating the image has been saved.

Figure 28:
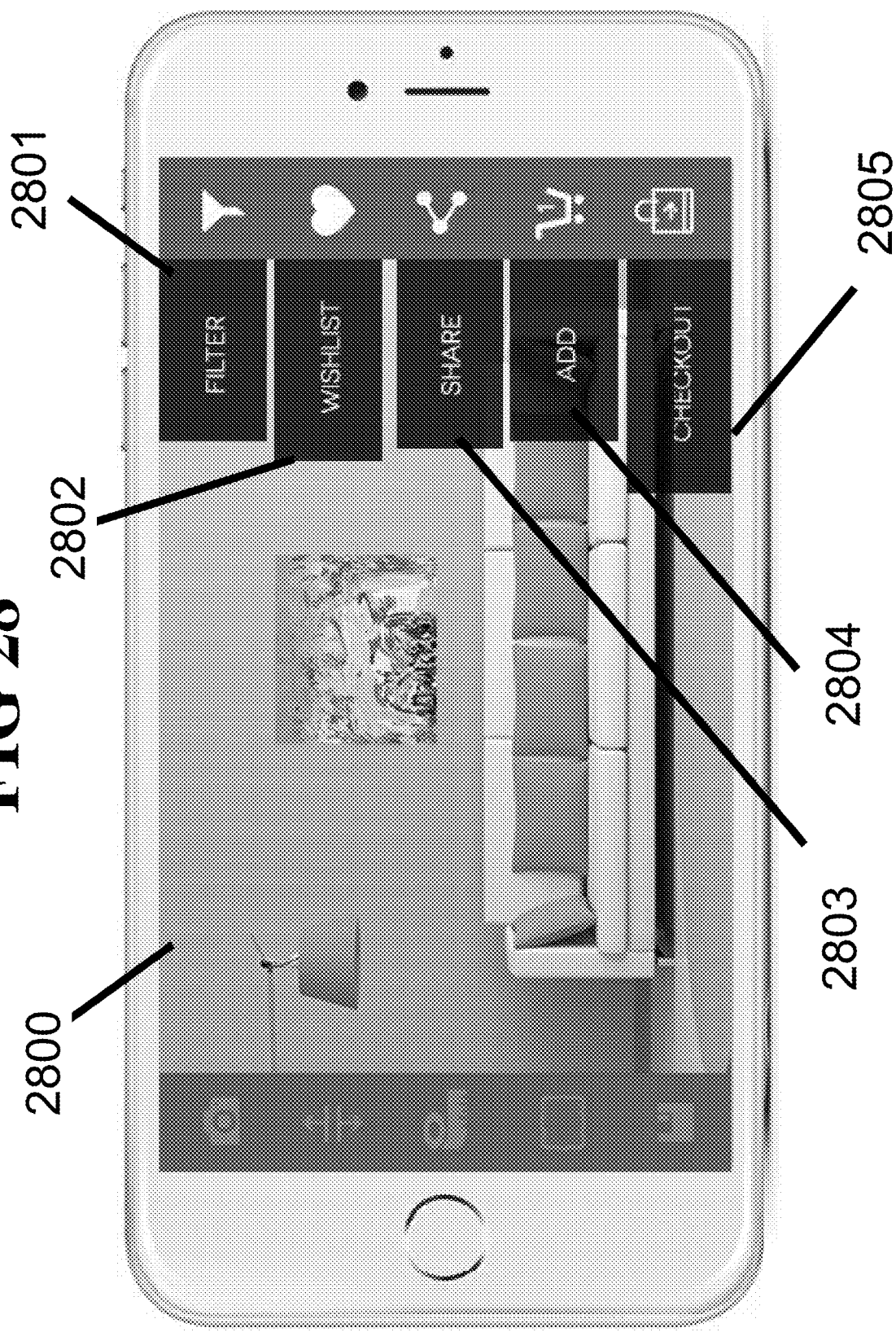

7. Referring to FIG. 28, the control panel on the right edge displays various icons to filter 2801, add to Wishlist 2802, share 2803, add to shopping cart 2804, and checkout 2805.

Once the new surface is added and saved the user can manipulate art within the new surface to enable the user to determine the suitability of the artwork within the space portrayed.

1. The screen will display two rolling drum columns. The left side will display art (which can be filtered) and saved spaces will be on the right.
2. A button on the bottom left of the screen will allow users to filter artwork. Pressing this button activates the 'Filter Page'. After filters have been set users can save the specific filter for use on their saved surfaces.
3. The column on the left is then updated with filtered selections from which the user can choose.
4. The user must then select a piece of art and a surface from each column and press a button at the bottom center that says "Bsualize" to view the combination in real-space. Users can save the combination to their picture gallery from here and/or swipe the screen with their finger to scroll to the next piece of art.

The present invention offers geolocation or visualization features that accurately represent its offerings and provides rich media and content as a seamless, user-friendly, and interactive solution.

Portable Computing Device Application

An exemplary embodiment of the present invention includes an application for execution on a handheld device, such as a smart phone, personal digital assistant or other portable computing device. This application allows a user to locate art in which the user is interested.

FIGS. 1-40 depict various screens displayed to a user of the application, which is entitled ArtBCons™. The application of the present invention interacts with a communications and segmentation platform (called Pulsate™) and database that stores details of art products, art galleries, clients (e.g., registered users of the application) and artists. FIG. 1 depicts the main entry screen of the application 100, which allows a user to locate his or her art, while concomitantly permitting listed art to locate the user. Based on Global Positioning System (GPS) technology, the application of the present invention provides real-time geo-location and engaging content on every piece of art in a catalog of the system, which content is stored in the main database accessible by the communications platform. The application of the present invention interacts with the database via the communications platform.

Figure 2:
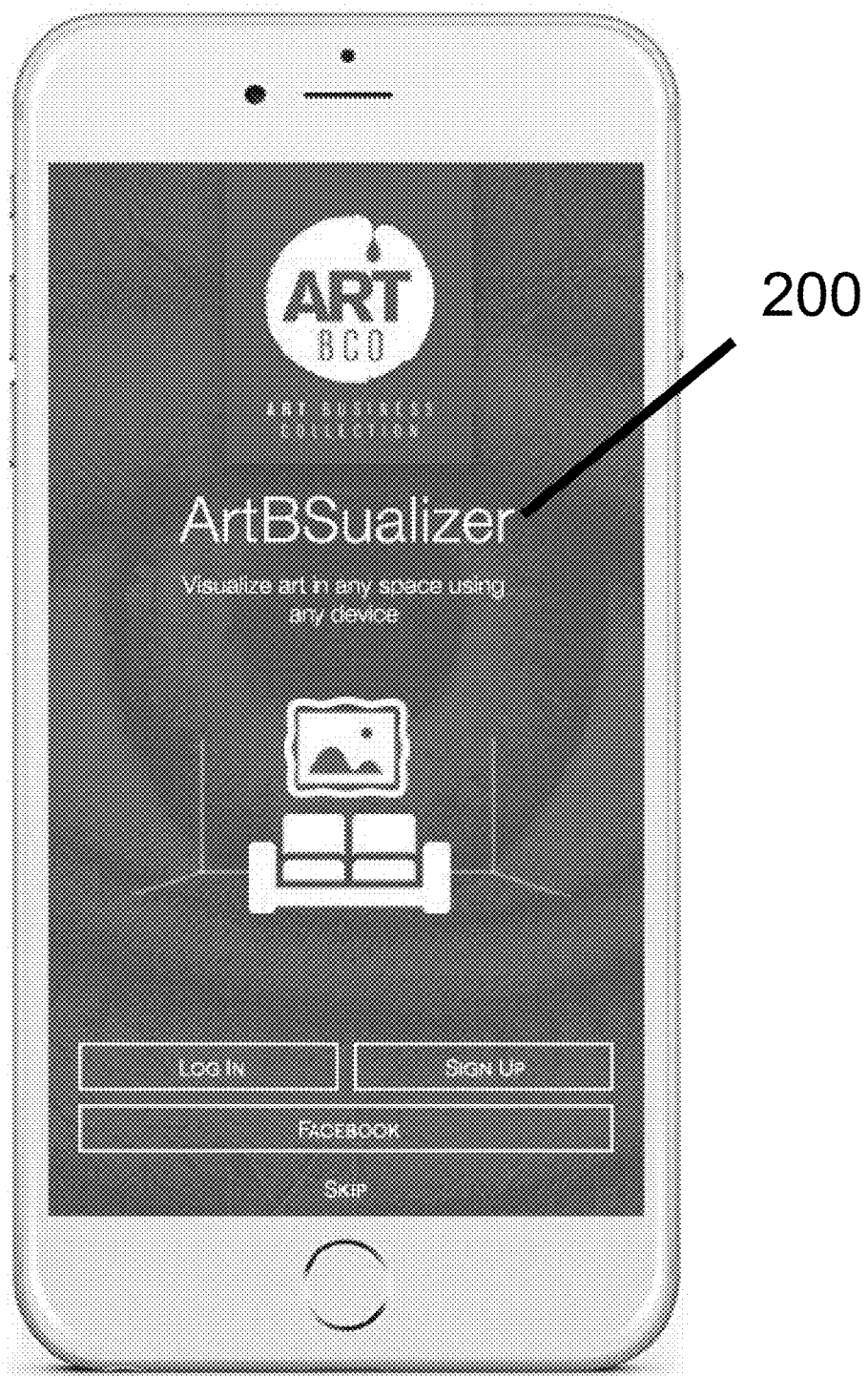
FIG. 2 depicts an exemplary embodiment of a screen shot of the application of the present invention, which enables a user to access a tool that enables the user to view a selected piece of art in a defined space of the user according to another aspect of the present invention.

Turning to FIG. 2, shown therein is another screen shot of the application, which enables a user to access the tool 200 called ArtBSualizer™ that enables a user to view a selected piece of art in the space of the user's choice. This tool provides a visual that assists a user in measuring art products in a real space. Mock furniture and dimensions are provided to the user to enable the user to define a living space and place art within the defined space with specified dimensions so that the user can determine the appropriateness of a given piece of art.

Figure 3:
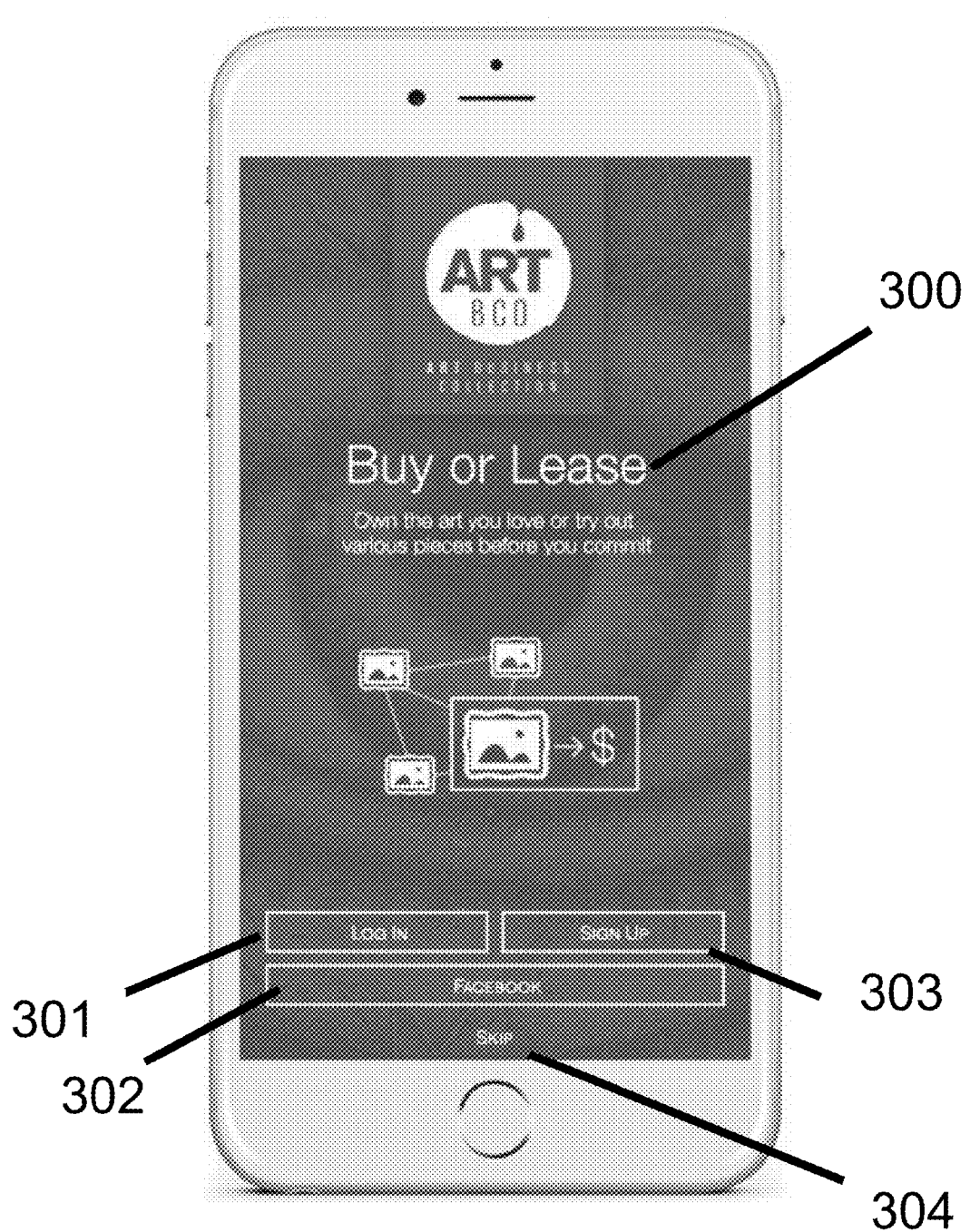
FIG. 3 depicts an exemplary embodiment of a screen shot of the application of the present invention, which enables a user to access a tool that enables the user to buy or lease selected pieces of art from the system catalog according to yet another aspect of the present invention.

Turning to FIG. 3, shown therein is another screen shot of the application, which enables a user to access a tool 300 that enables a user to buy or lease selected pieces of art from the system catalog, the details of which are stored in the central database. This provided a login button 301, a Facebook® button (to sign in with a Facebook® account) 302, a sign up button 303 and a skip button 304.

Figure 4:
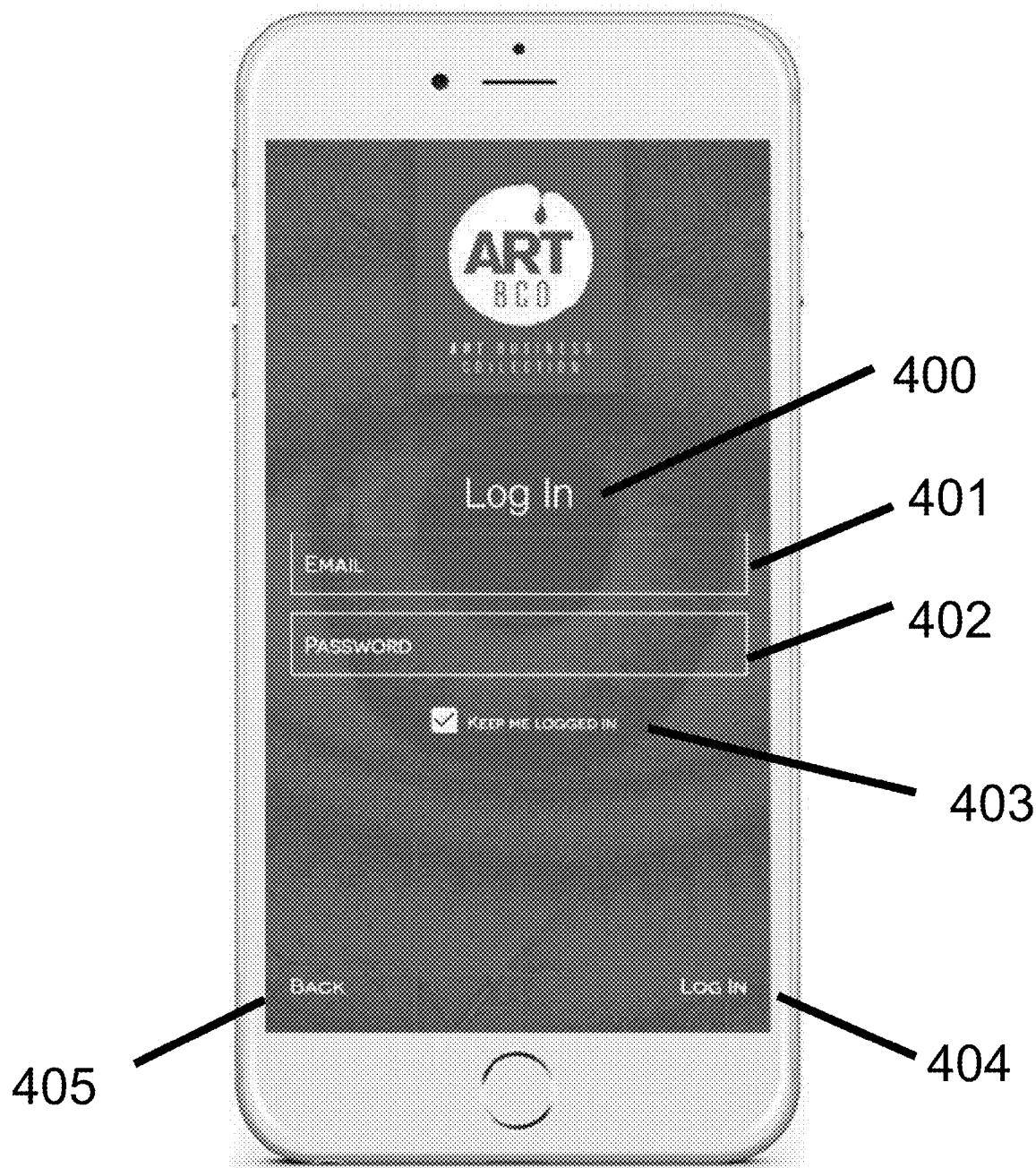
FIG. 4 depicts an exemplary embodiment of a signup screen shot of the application of the present invention, which enables a user to log in to system according to still another aspect of the present invention.

Turning to FIG. 4, shown therein is a login screen 400, via which the user may login using an email 401 and password 402. There is a button to keep the user logged in 403, as well as login 404 and back buttons 405.

Figure 5:
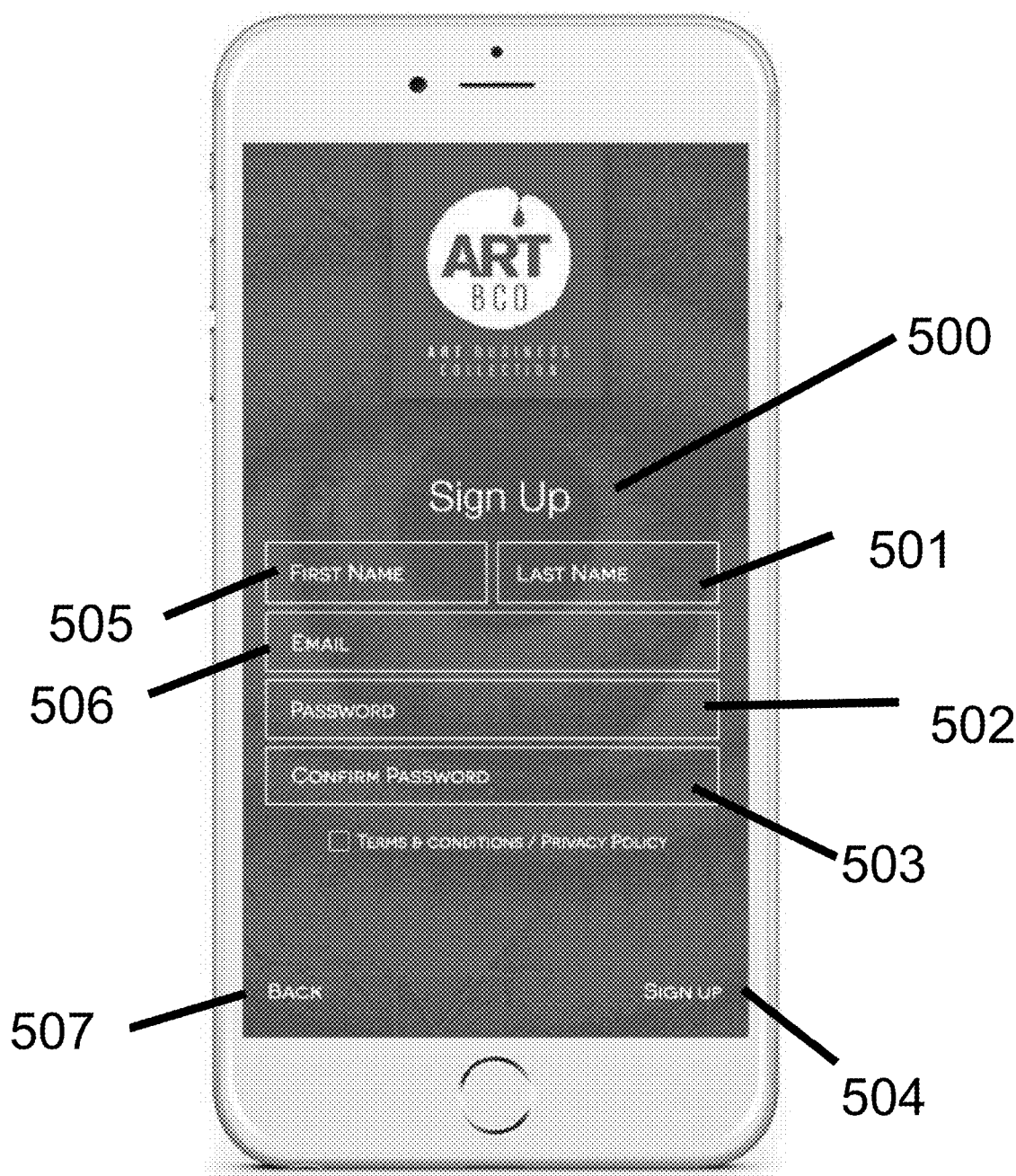
FIG. 5 depicts an exemplary embodiment of a screen shot of the application of the present invention, which enables a user to sign up and register with the system according to yet another aspect of the present invention.

Turning to FIG. 5, shown therein is a signup screen shot 500 of the application, which enables a user to signup with the system using first name 505, last name 501, email 506, password 502, and confirm password 503. There are signup 504 and back buttons 507. A user can either skip registration subject to limited functionality or register as an artist as another embodiment of this solution.

The Skip 304 option allows customers to view the content and navigate the application without the ability to buy, lease or experience more advanced features like personal profile, recommendations, alerts, or building a virtual collection that requires more information about the user.

The application may employ an Artist option that enables artists to login and pass directly to a page showing them the benefits of joining the system and presenting the Terms & Conditions for artists so that they can accept them (by clicking in a check box).

Figure 6:
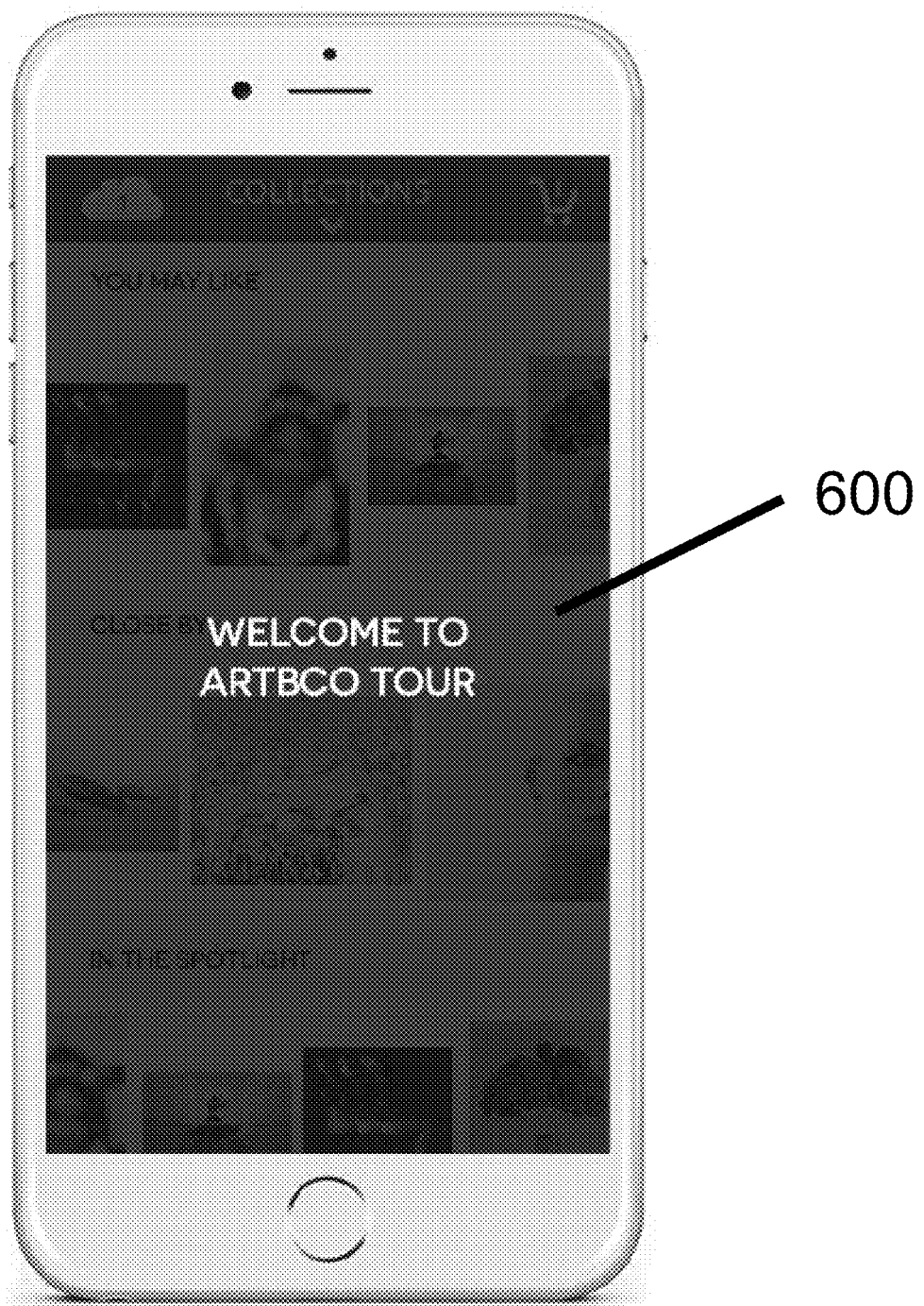
FIG. 6 depicts an exemplary embodiment of a screen shot of the application of the present invention which enables a user to tour the system and collections according to yet another aspect of the present invention.
Figure 7:
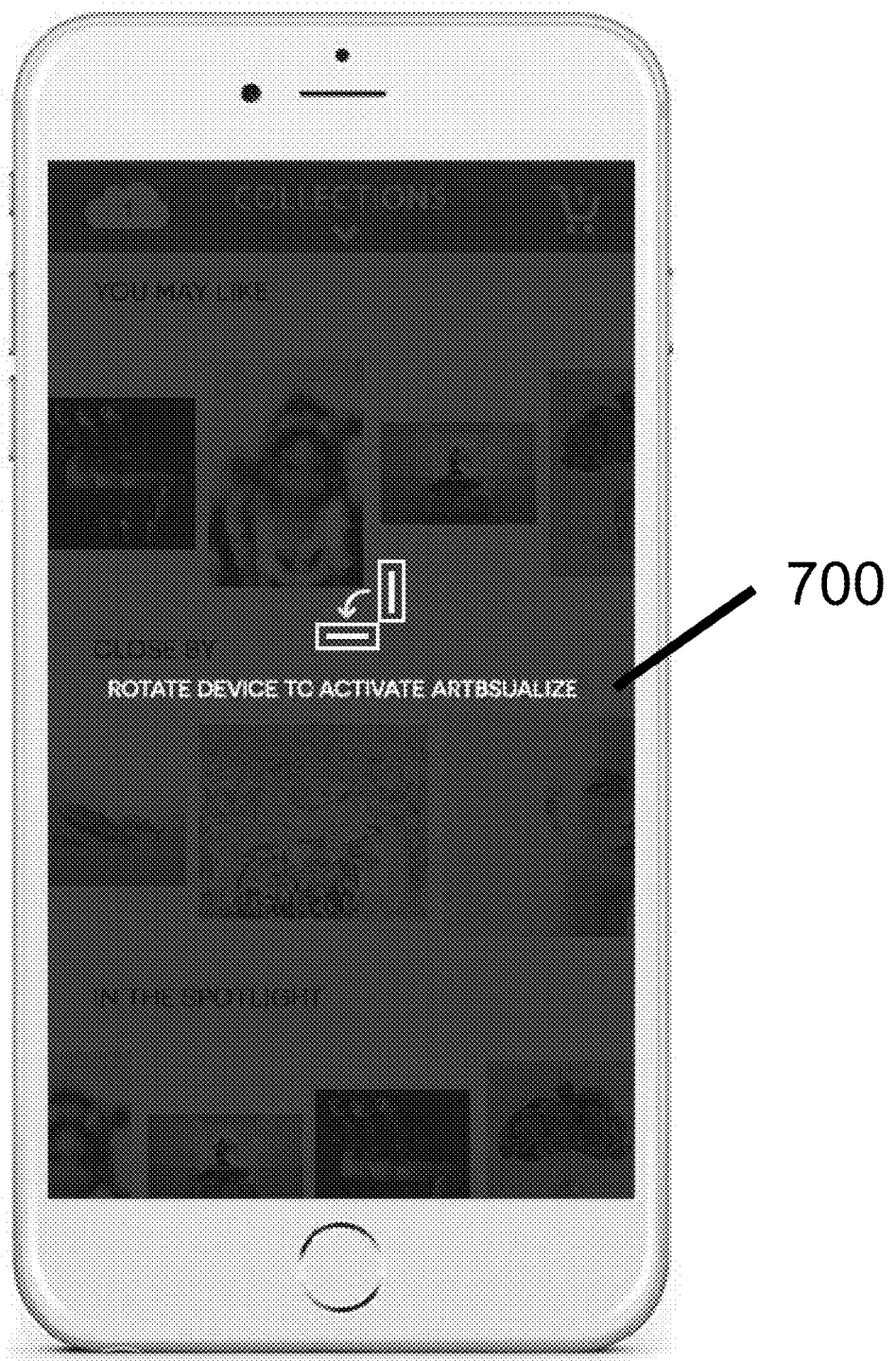
FIG. 7 depicts an exemplary embodiment of a screen shot of an interface for browsing art collections using the application of the present invention, which enables the user to activate the visualizer feature for a specific piece of art while browsing the collection by rotating the handheld device according to yet another aspect of the present invention.
Figure 8:
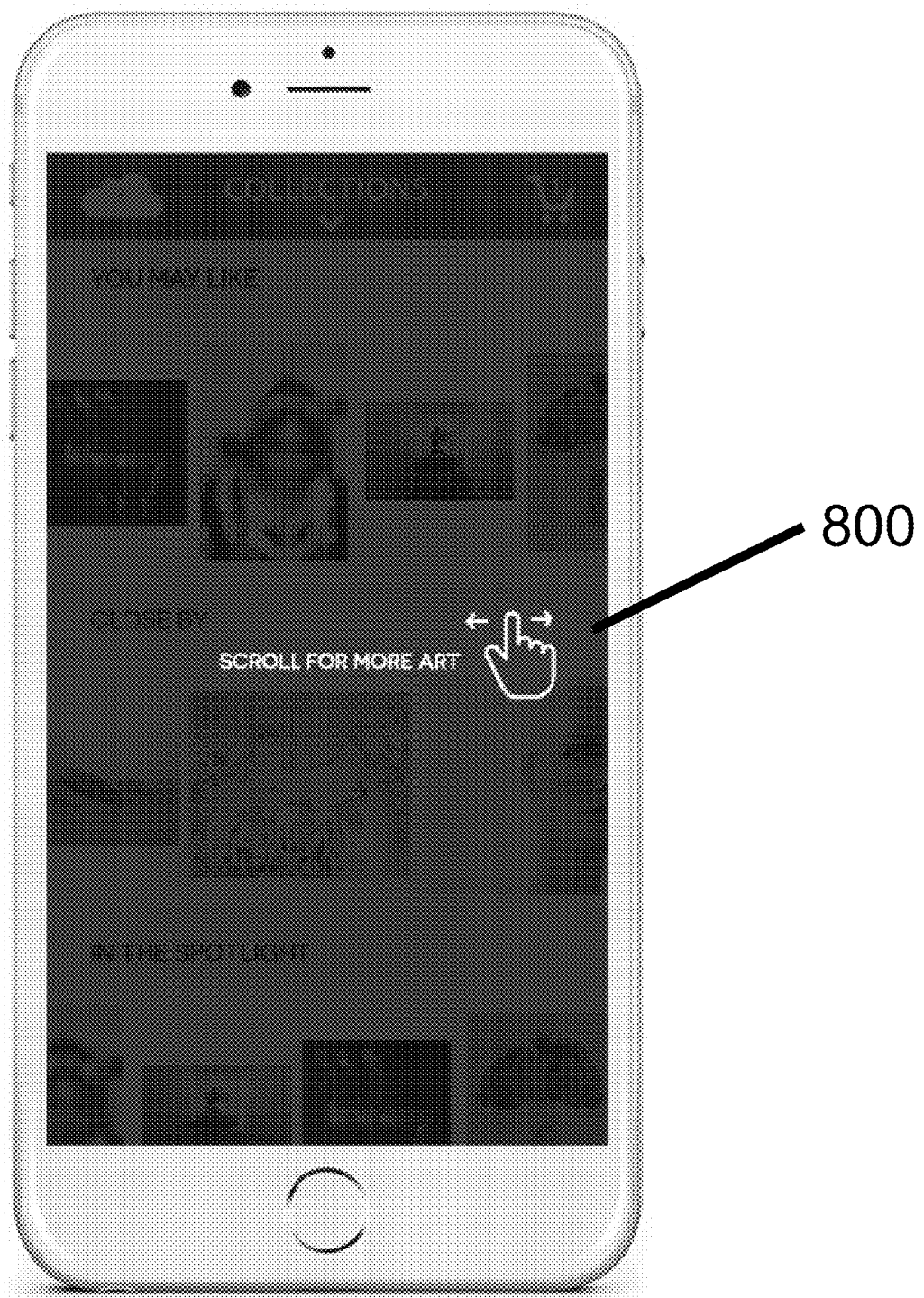
FIGS. 8-13 depict exemplary embodiments of screen shots of an interface for browsing art collections using the application of the present invention according to yet another aspect of the present invention.
Figure 9:
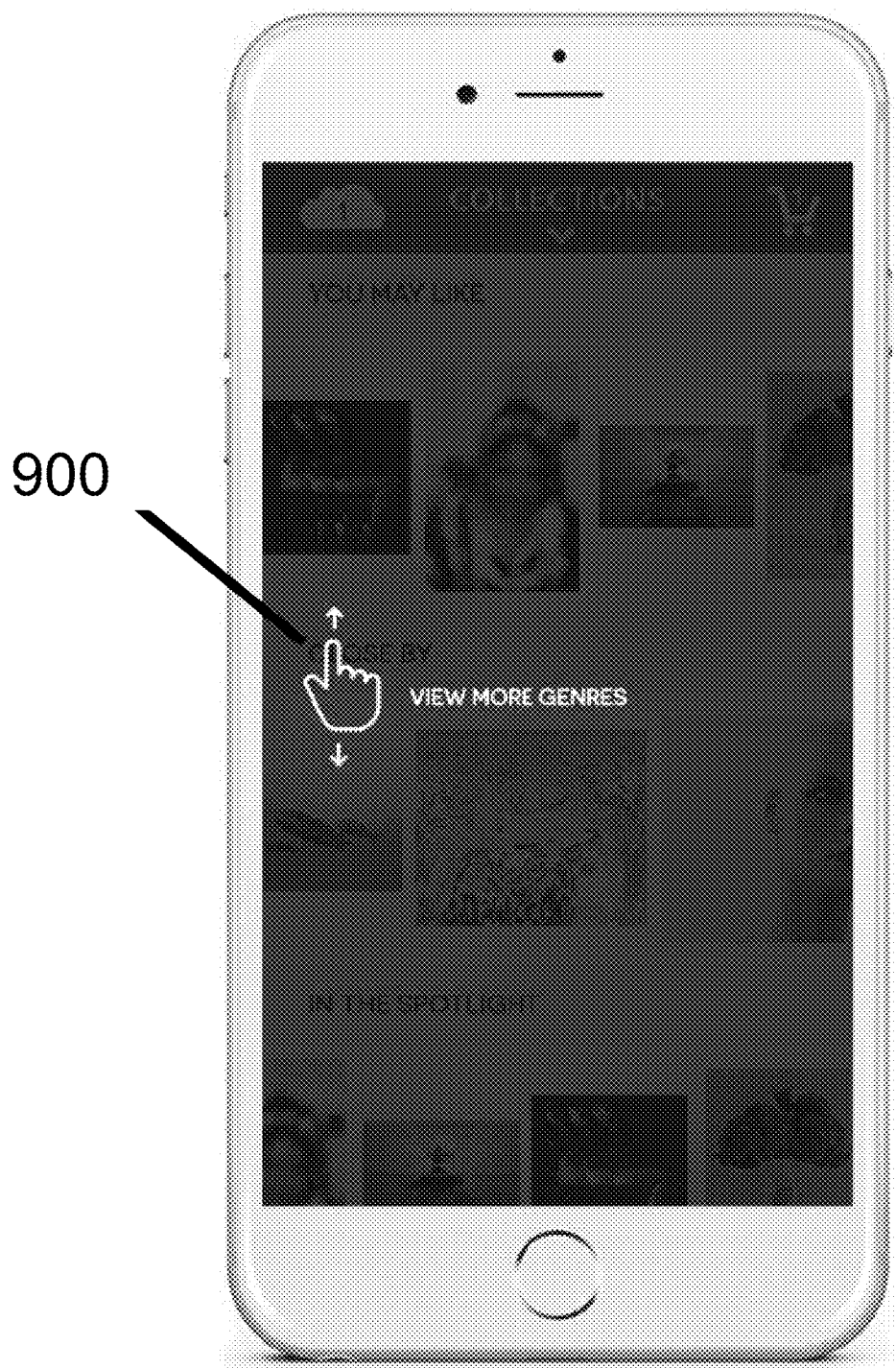
Figure 10:
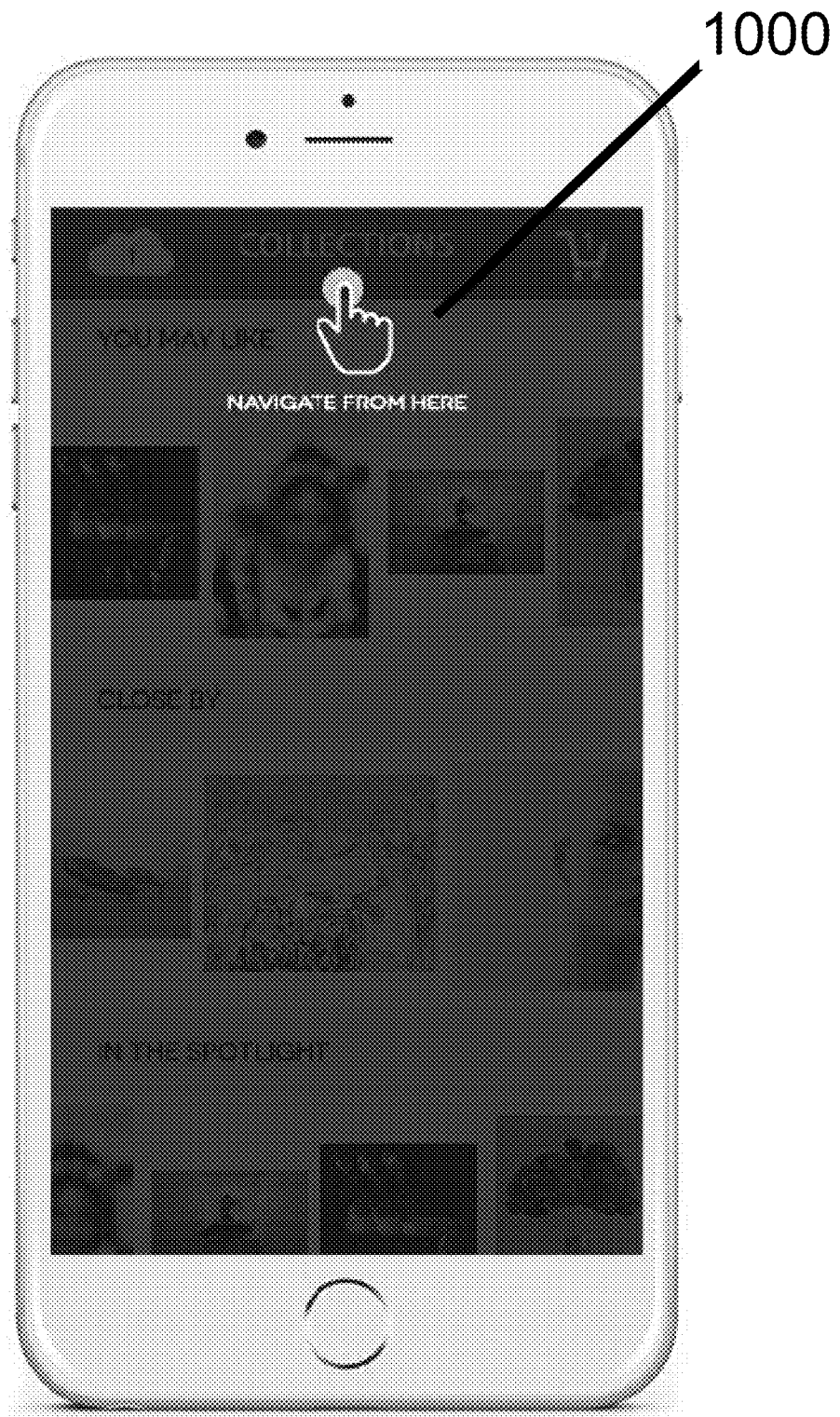
Figure 11:
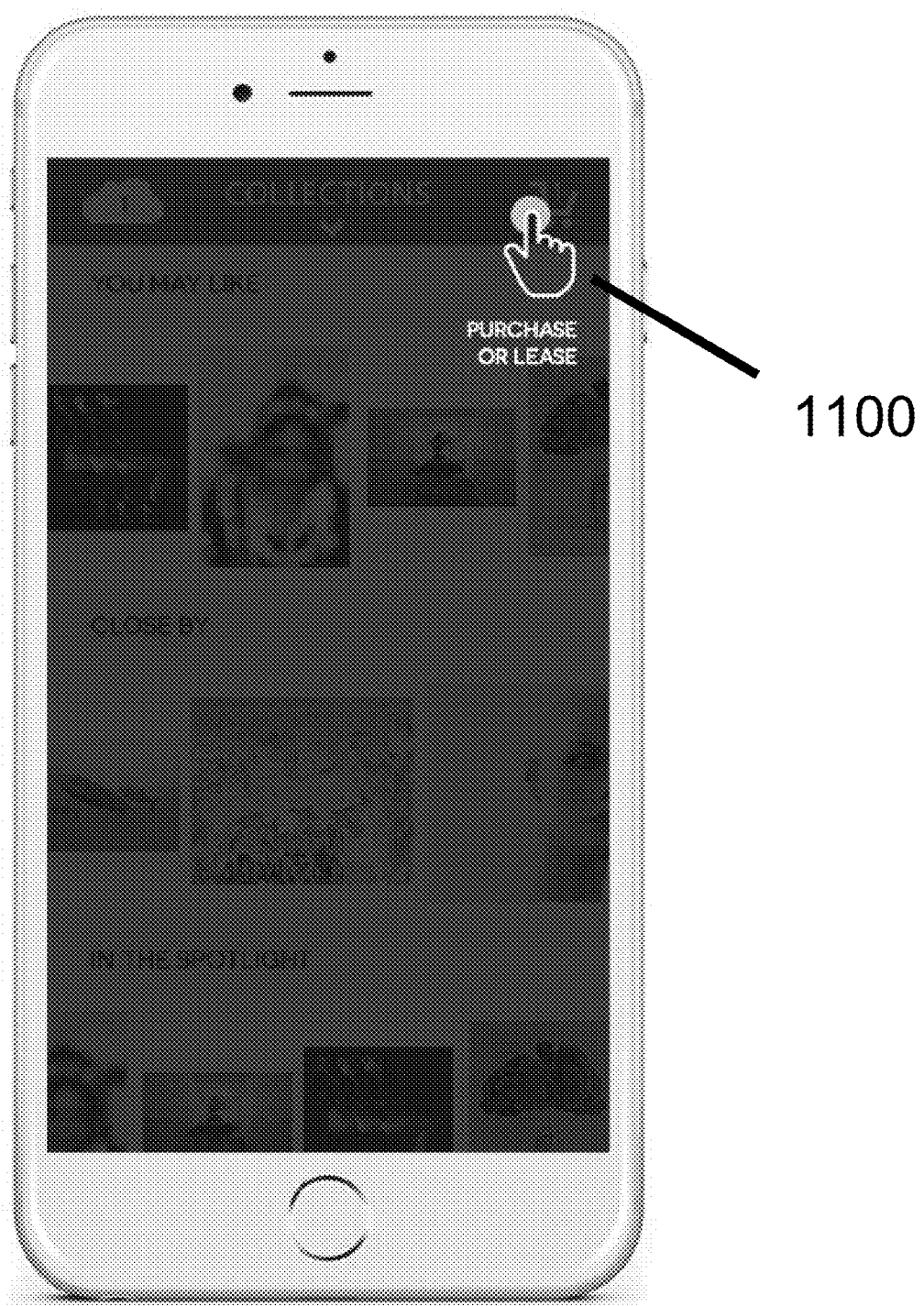
Figure 12:
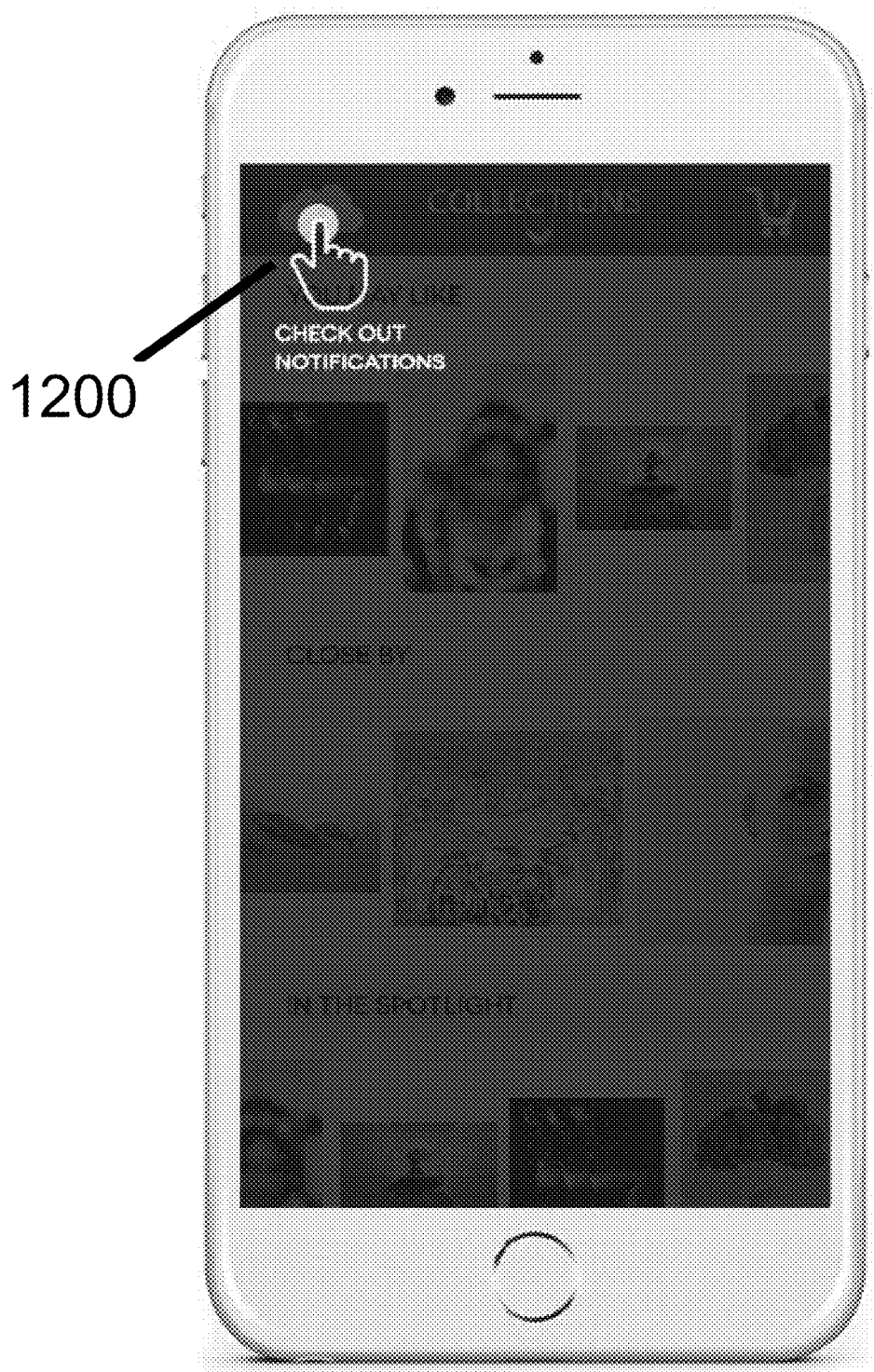
Figure 13:
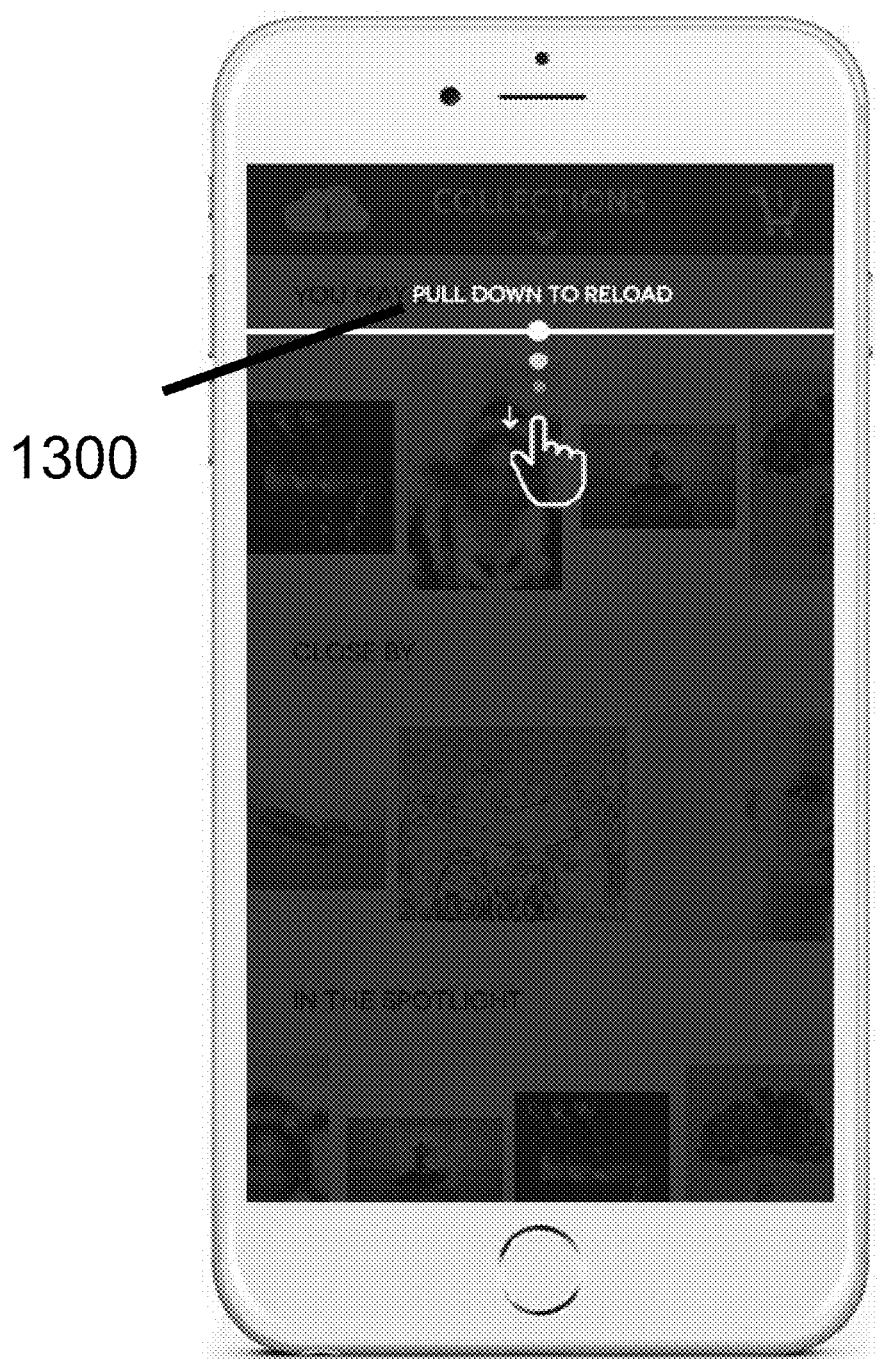

Turning to FIG. 6 shown therein is a main entry screen 600 to tour the application. FIG. 7 shows how to activate the art visualizer portion of the application by rotating the device 700. FIG. 8 shows how to scroll for more art 800. FIG. 9 shows how to view more genres 900. FIG. 10 shows up to navigate 1000 from the collections button. FIG. 11 shows how to access the purchase or lease screen 1100. FIG. 12 shows how to check out notifications 1200. FIG. 13 shows how to reload the screen 1300.

Figure 14:
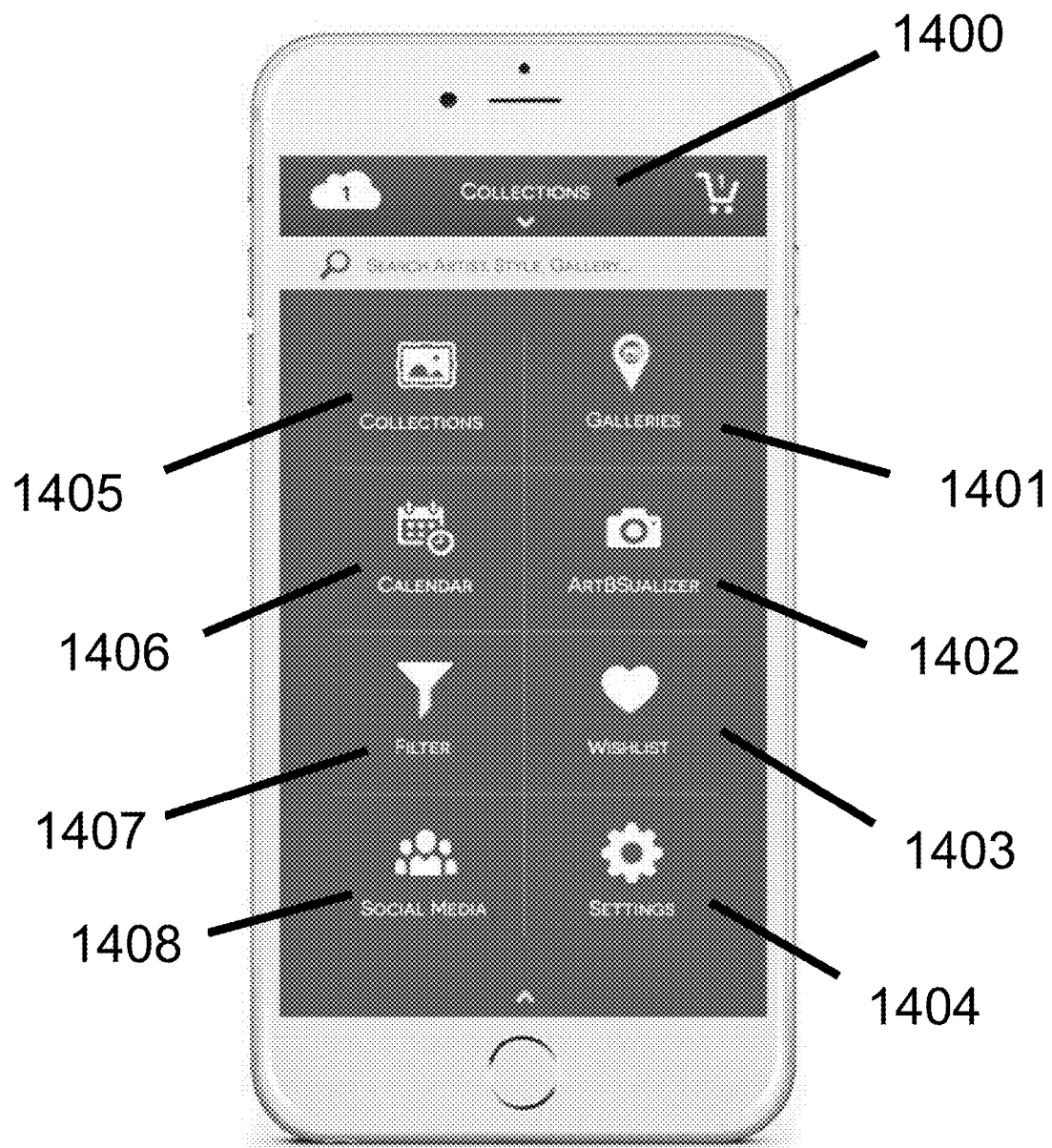
FIG. 14 depicts an exemplary embodiment of a screen shot of an icon menu of the application of the present invention that enables a user to access a menu to navigate to other pages in the application according to still another aspect of the present invention.

Turning to FIG. 14, shown therein is a screen shot 1400 of the Icon Menu (Navigator) of the application that enables a user to access a menu to navigate to other pages in the application described herein. By pressing the Pull-down arrow (below the page title) users can access a menu to navigate to other pages as described above. Pressing Collection 1405 enables a user to browse and view art. Selecting Galleries 1401 opens the galleries page. Selecting Map (not shown) enables a user to locate art near him or her you in preferred spaces or to locate a specific piece of art. Selecting Events (not shown) enables a user to view events, including online auctions organized by participating galleries and other allies. Selecting ArtBSualizer 1402 enables a user to access the ArtBSualizer™ function described herein. Other choices include calendar 1406, filter 1407, wishlist 1403, social media 1408 and settings 1404 icons.

Figure 15:
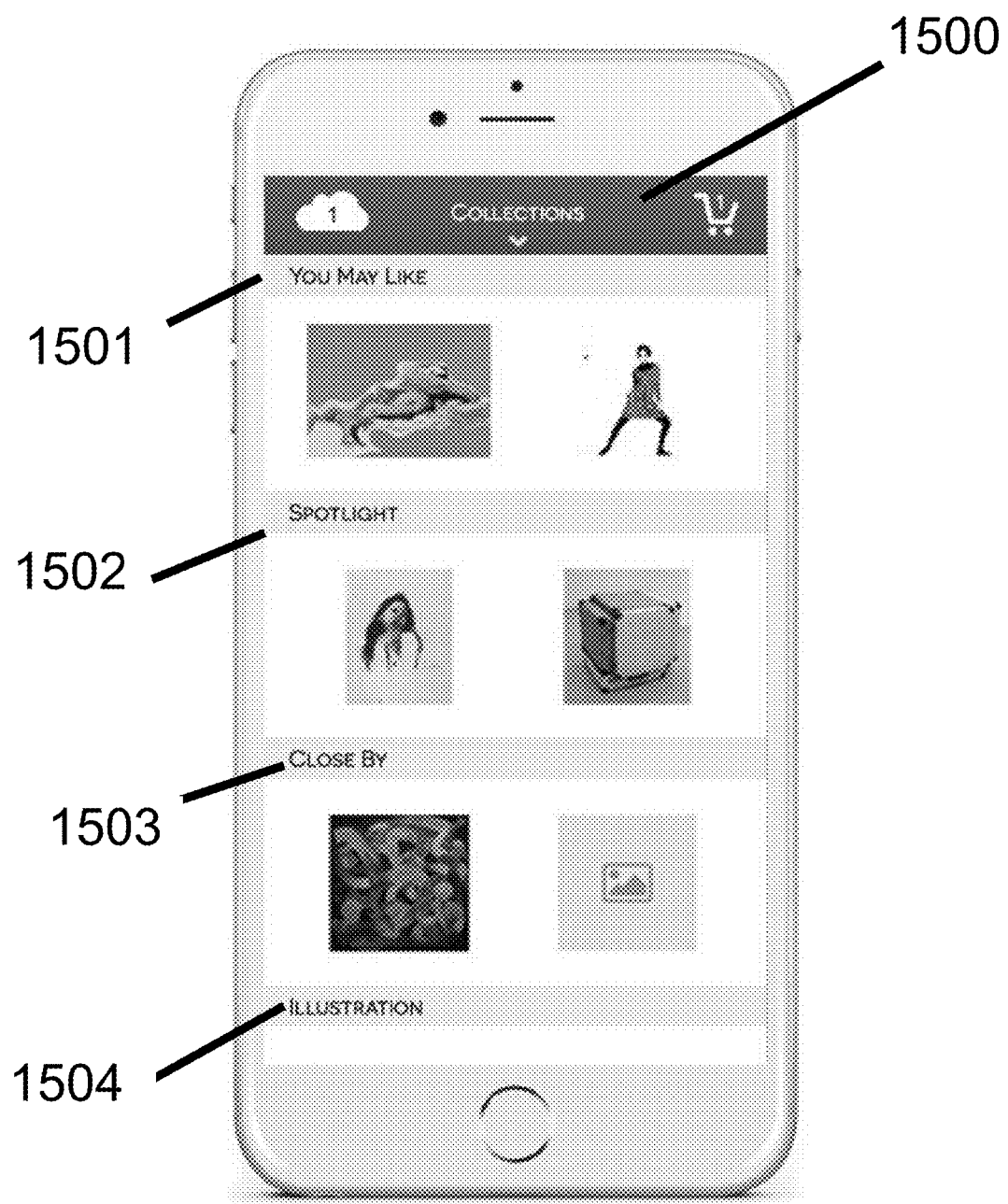
FIG. 15 depicts an exemplary embodiment of a screen shot of the application of the present invention that shows the user how to access the entire collection stored in the database to a user according to yet another aspect of the present invention.

Turning to FIG. 15, shown therein is a screen shot of the application that displays the entire collection 1500 stored in the database to a user, which collection is sorted into various categories for ease of review, such as "you may like" 1501, "spotlight" 1502, "close by" 1503 and "illustration" 1504. Other categories could include "recommended", "near you" and "featured" for example. Within each category are various artworks. This may be used as a default in-app landing page after a user signs into the application.

The first page displays content across different categories. Users can slide up or down across categories and to the sides to see additional pieces. There are multiple categories including You May Like, Spotlight, Close By, Collage, Drawing, Mixed Media, and a number of other Genres.

The You May Like category is provided based on preferences and/or events set by the user. Alternatively if no preferences have been set, the application uses an intuitive algorithm to infer potential preferences.

The Close By category provides art to the user located near the user's current location (leveraging the mobile device GPS, Wifi ping, Bluetooth sensing, and carrier signal) or if not activated the zip code users have entered in the profiles/credit card info.

The Featured Artists category displays those artists who are trending or being profiled by industry critics as rising or who have already gained popularity.

The Wishlist or My Collection category only appears when there is content in these categories (i.e., users have selected art for their Wishlists or taken pictures or their own collection/artwork).

Figure 29:
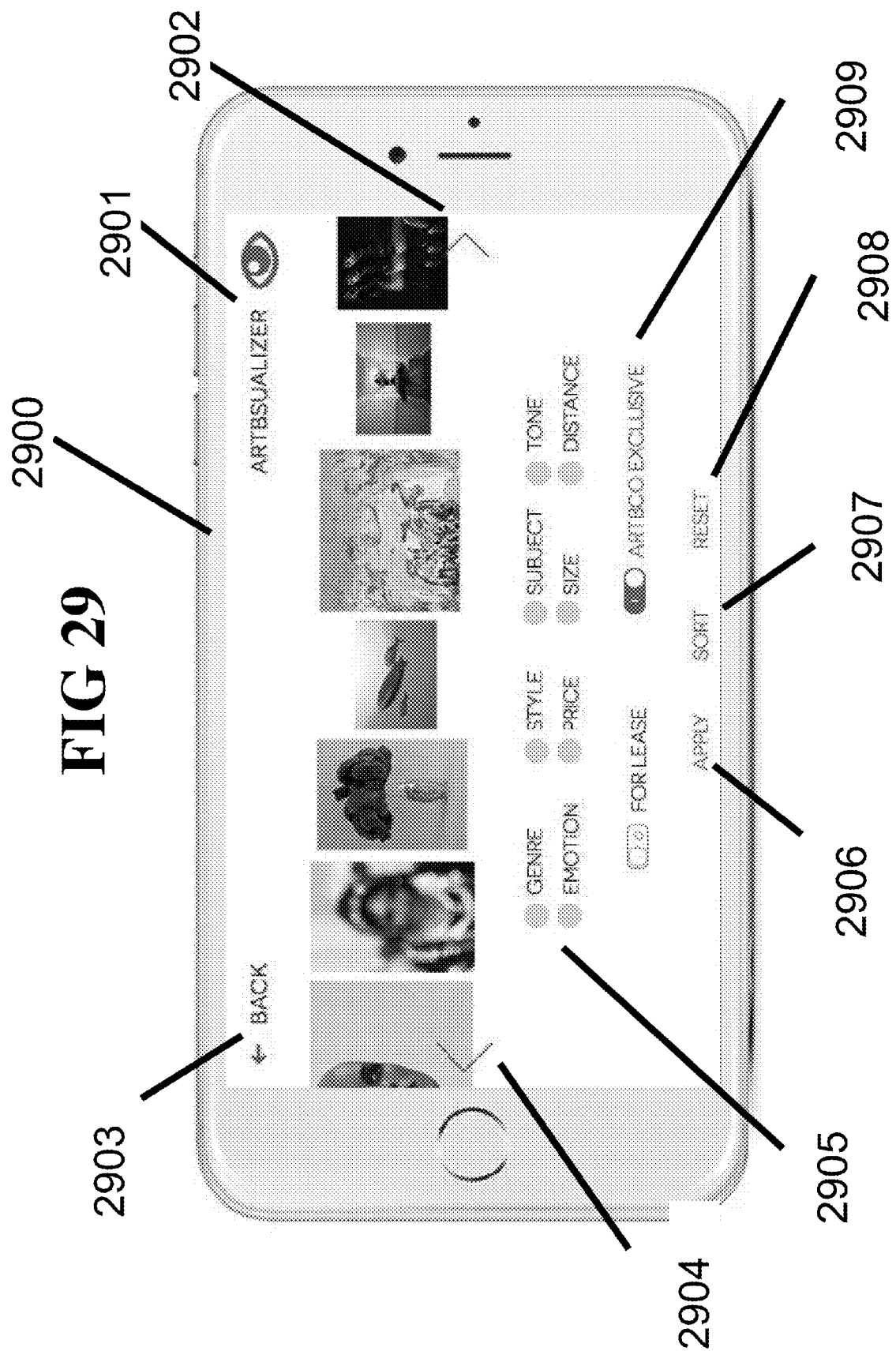
FIGS. 29-30 depict exemplary embodiments of screen shots of a sorting or filter screen of the application of the present invention according to yet another aspect of the present invention.

Referring to FIG. 15, shown therein is a screen shot of the Sorting Menu of the application that enables a user to display art based on user selected filters. By pressing "Collection" 1500 on top of the screen, the Navigator appears (see FIG. 29) and a menu 2900 is displayed to sort the artwork by category and sub-category (art, style, genre, medium, etc.). Referring to FIG. 29, filters 2905 appear in top section of the page and include Genre, Style, Subject, Tone, Emotion, Price, Size, and Distance also there are two On/Off switches called For Lease and ArtBCo Exclusive 2909 with an Apply 2906, Sort 2907 and Reset 2908 button group in the bottom-center position of the screen. Sub options include All " ", Other, Cancel, and Remove Filter. The Sort button 2907 allows Ascending and Descending options as well as by any of the top level filters (Genre, Style, Subject, etc.)

Figure 30:
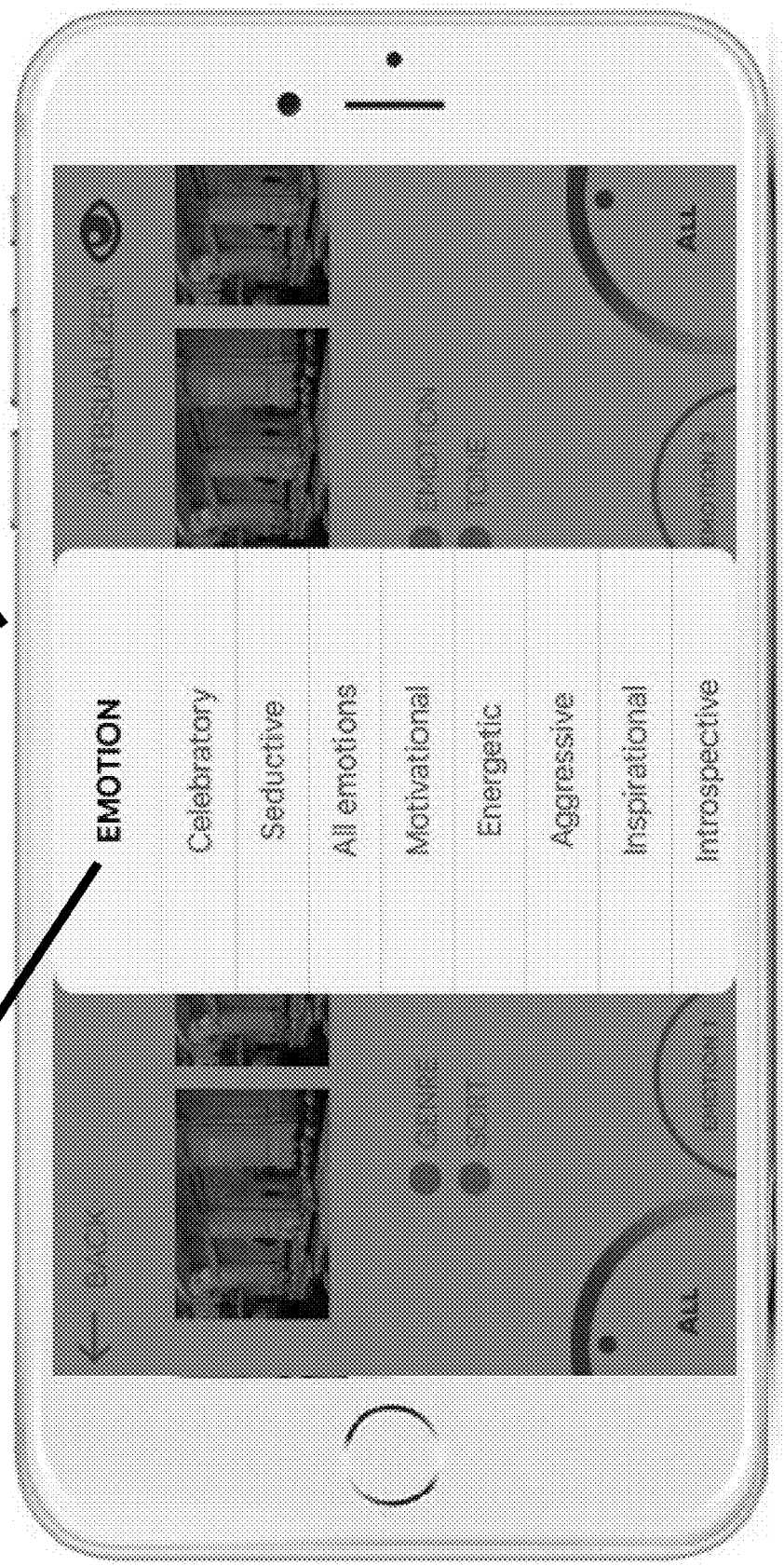

Turning to FIG. 30, screen 3000 shows the emotion filer. The Emotion 3001 filter includes Celebratory, Seductive, Motivational, Energetic, Aggressive, Inspirational, Introspective, Calm, Confident, All Emotions, Other, Cancel, and Remove Filter options). Filtered artwork based on the combination of selected criteria can be sorted based on ascending or descending price (also an option to choose in the price filter menu).

A button 2901 is provided to access the ArtBsualizer, as well as back button 2903 and scroll buttons 2904, 2902.

Figure 32:
FIG. 32 depicts an exemplary embodiment of a screen shot of a menu filter of the application of the present invention that shows the submenus for the user selectable filters according to still another aspect of the present invention.

Turning to FIG. 32, shown therein is a screen shot of the Menu Filter 3201 of the application that shows the sub-menus for the user selectable filters. Users can choose a broad range of art products or narrow to a specific type of art using this filter to further browse the desired artwork (i.e., the different types of art, styles, genres, mediums, subjects, geographic regions/continents, predominant colors through a color selector including the 'multicolor' option, and price ranges with a sub-option to display the art in an ascending or descending order). A user can only edit these categories with superadmin capability.

Figure 16:
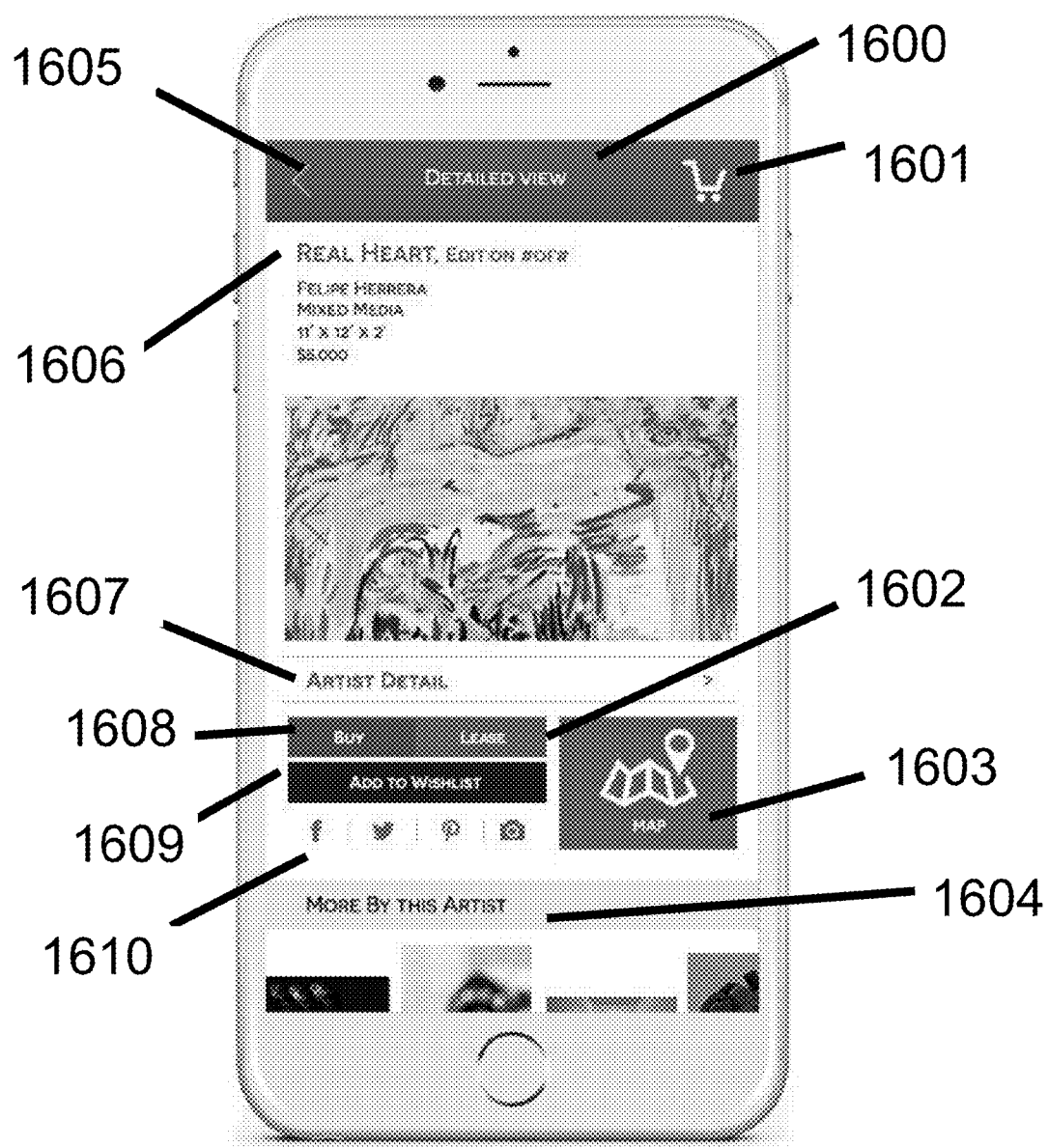
FIGS. 16-17 show exemplary embodiments of screen shots of a detailed view of artwork in the database according to yet another aspect of the present invention.

Turning to FIG. 16, shown therein is a screen shot of the Filtered Results screen 1600 of the application that displays the art results based on the applied filters. This pages lists all the relevant artwork 1606 including its details such as price, artist name, media, dimensions (in English, inches and Metric, centimeters), as well as buttons to buy 1608, lease 1602, add to the user's Wishlist 1609, locate the art (map it) 1603 or share the art through social media channels 1610. When a user clicks on the image the application takes the user to the art piece page where the user can see a larger thumbnail and access all the details of the piece including artist bio, statement, other artwork from the artist, as well as buttons to add to the user's Wishlist, locate (map it) or customize (commission) the artists for a similar piece. The user can select more by this artist 1604 or more about the artist 1607. There is a shopping cart icon 1601 and a back icon 1605.

Figure 17:
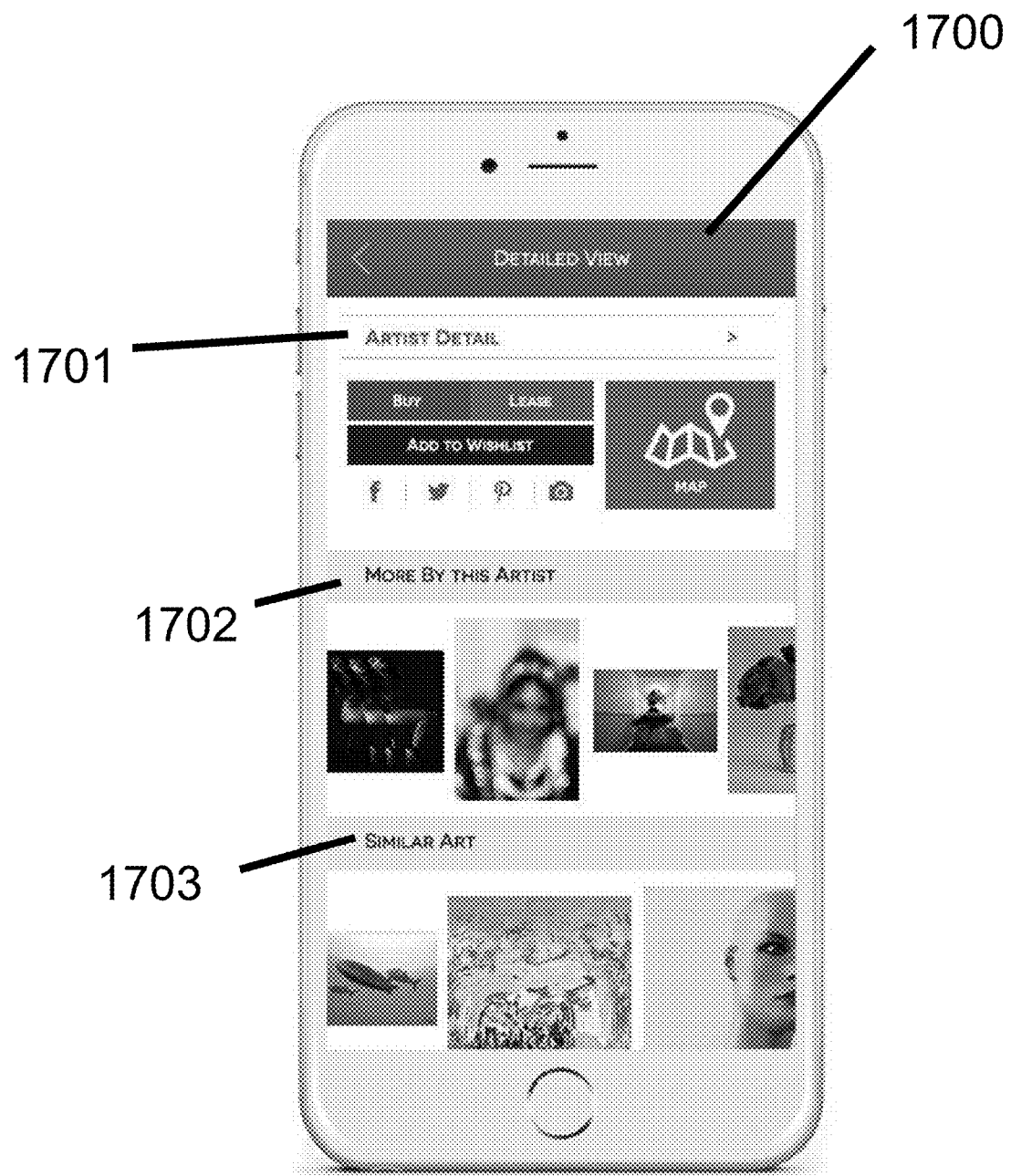

FIG. 17 shows another detailed view 1700 in more summary format. Artists detail 1701, more by the artist 1702 or similar art 1703 can be selected.

Figure 18:
FIG. 18 depicts an exemplary embodiment of a map screen of the application of the present invention that displays when accessing the map functionality according to still another aspect of the present invention.
Figure 34:
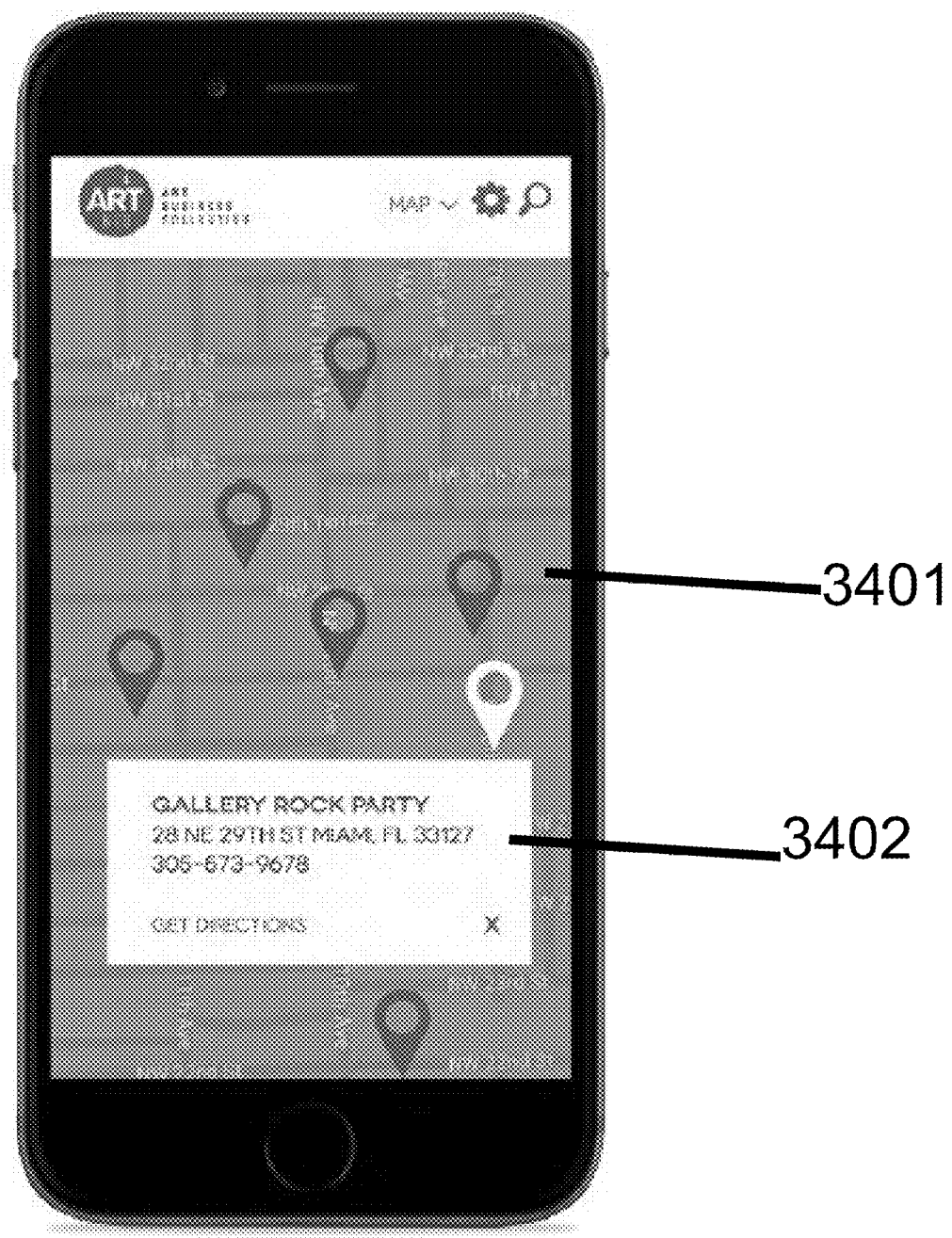
FIG. 34 depicts an exemplary embodiment of another map screen of the application of the present invention that displays when accessing the map functionality according to still another aspect of the present invention.

Turning to FIG. 18, shown therein is a screen shot of the Map screen of the application that displays when accessing the map functionality. This map function shows the user's current location (based on the GPS of user's mobile device which could include a smart phone, portable computer, handheld computer, eyeglass computer interface, watch computer interface, or a wearable device) and nearby locations of galleries 1800 where artwork of the system is publicly displayed. This screen employs has a pull up bar at the bottom where filters can be applied including type of establishment, radius, type of artwork, etc. Once filters are selected, the pull up menu rolls down and the number of icon locators is narrowed down. The Map may be filtered using the Filter feature which the user must access using the Navigator. Once filters are applied the Map displays the appropriate information. This screen also appears when a user "maps" a specific artwork (the piece is shown) with an icon showing its location (any city in any country). FIG. 34 shows the map in a more detailed view 3401 with details for the specific gallery 3402. The galleries may be viewed in a map view by selecting 1802 or a list view 1801. When a map icon 1803 is clicked, details of the location are displayed (see FIG. 20) (such as name, address, phone number, e-mail) plus an option to get directions from user's current location or a specific location as a starting point. Button 2000 opens the list of galleries (see FIG. 19). The details for the specific selected gallery 2001 are shown in FIG. 20.

Figure 19:
FIGS. 19-20 depict an exemplary embodiment of a list of art galleries by an application of the present invention according to still another aspect of the present invention.
Figure 20:

In FIG. 19, the list of galleries 1901 is shown in a list format which can be changed to a map format by selecting map 1904. Individual galleries 1903 are listed in brief form. List format button 1902 changes to list format.

Figure 21:
FIG. 21 depicts an exemplary embodiment of a screen shot of an Events screen of the application of the present invention that displays when accessing a calendar function, which displays a list of activities (events, exhibitions, shows, etc.) in current and future date ranges according to yet another aspect of the present invention.

Turning to FIG. 21, shown therein is a screen shot of the Calendar screen 2100 of the application that displays when accessing the calendar functionality, which displays a list of activities in current and future date ranges. This screen has two menu options in the top section "Events 2102 and Auctions 2101." By clicking on an event 2102 or auction 2103, the user passes to a page 2200 (see FIG. 22) displaying the details 2202 of the event 2201. Events lists all the nearby event activities (based on current location and if not available, zip code in profile). These activities are fed by users defined as admins (galleries, curators, dealers, etc.) as well as the superadmin user (e.g., events organized by ArtBCo). Events include title, dates and location (city) and are ordered by date and location. Auctions menu displays a list of the upcoming online art auctions also ordered by date. It displays the title of the auction, the organizer (e.g., a gallery, or the system) and the date when it takes place.

Figure 22:
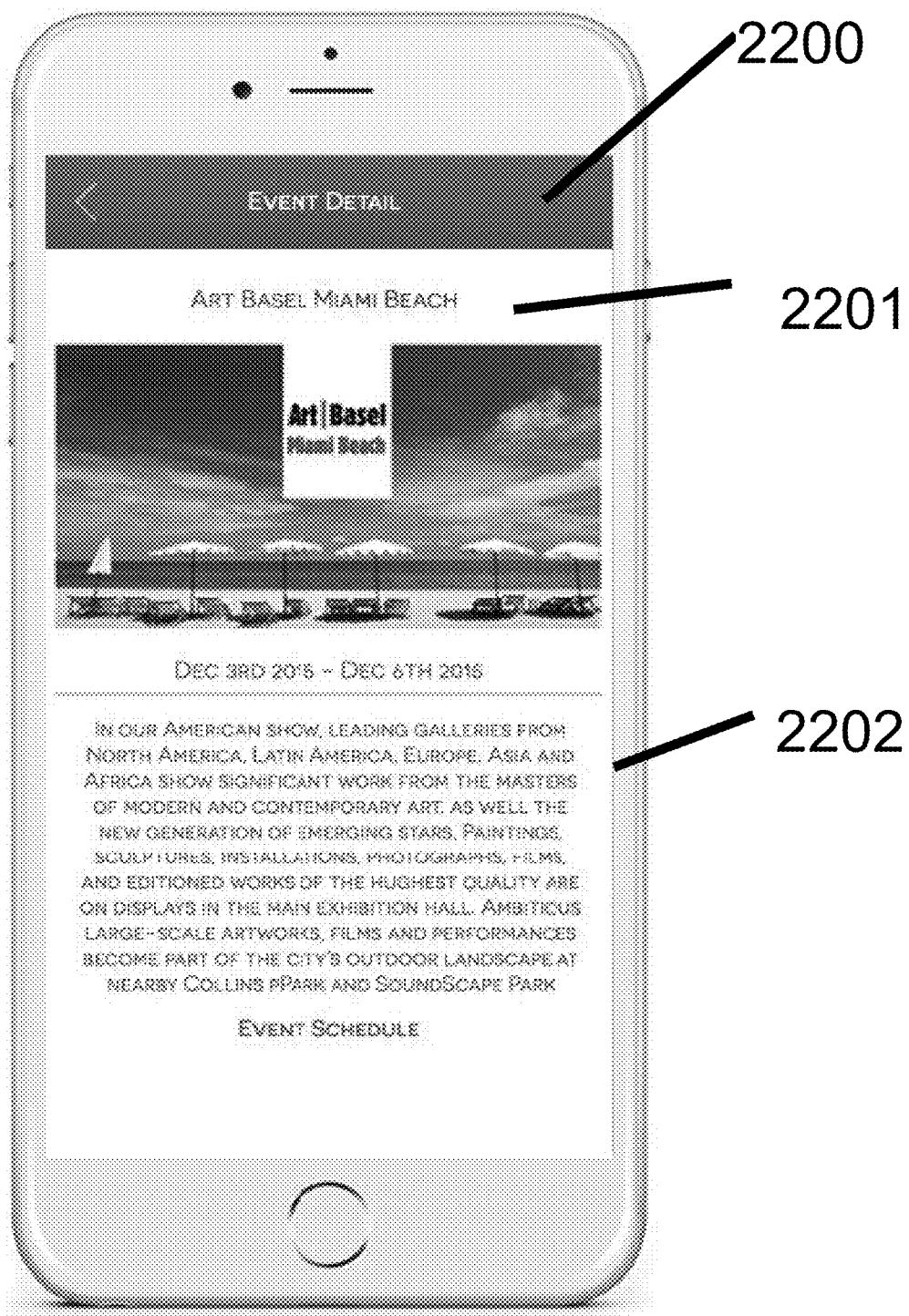
FIG. 22 depicts an exemplary embodiment of a screen shot of details of one of the events selected from the calendar screen of FIG. 21 according to yet another aspect of the present invention.

Turning to FIG. 22, shown therein is a screen shot of the Events screen of the application that displays when accessing the events functionality, which displays details about events. Such details include the title, advertising image, dates, organizer and a description of the event plus a link to register or visit a specific webpage outside the system.

Figure 23:
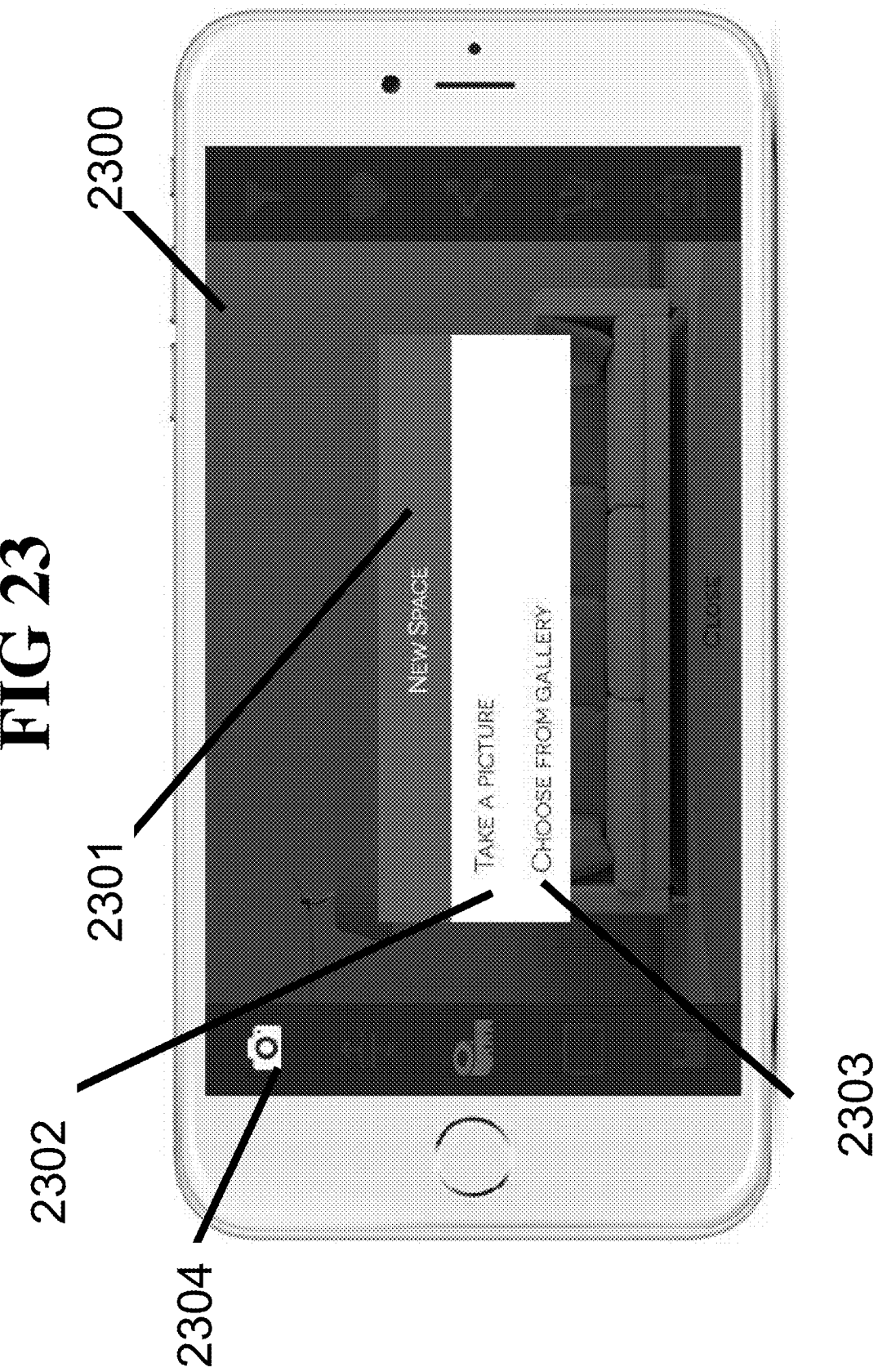
FIGS. 23-28 depict an exemplary embodiment of screen shots of a camera and ArtBsualizer™ screen of the application of the present invention that allows a user to preview selected art in a specified space to enable the user to visualize the impact of the art in their own space according to still another aspect of the present invention.

Turning to FIG. 23, shown therein is a screen shot of the Camera and ArtBsualizer™ screen 2300 of the application that allows a user to preview selected art in a specified space 2301 to enable the user to visualize the impact of the art in their own space. A user may take a picture 2302 or choose a picture from a gallery 2303. When a picture is taken 2302 (See FIG. 36) it is sampled in the lower left section to either store or discard and retake. To save the image as the selected space, users will press a button on the top or bottom part of the screen called "Save". The saved picture then appears with a mobile red squared frame (same color as ArtBCo™ logo) which can be manually adjusted by the user to the corners of the wall in the picture. Once confirmed by the user, a pop up appears at the bottom of the screen covering 20% of the screen asking to confirm the height of the wall/frame (similar to the rolling display when adjusting dates or times in an i-Phone®, but instead displaying a height in inches or cm). Once confirmed, the screen shows two columns. On the left, shown are recommended artwork and on the right shown are stored spaces. A bottom left button allows filters specific for artwork through options including my Wishlist, recommended or the combination of individual filters to create a narrow set of artwork to test in the spaces. Once the filters have been applied, the artwork on the left side gets updated. At the center of the screen there is a frame combining an art piece with a space (similar to a Vegas slot machine screen, but only two columns). The user rolls up or down the artwork and spaces to have the desired combination and then presses the ArtBSualizer™ button at the bottom center of the page to forward the combination to the picture gallery as a "saved" space. Once the user taps it, the image appears in real size. The artwork can be moved or displaced with the finger across the space like using a mouse to visualize it in its actual size. The user can then save that overlap in the desired position.

Figure 45:
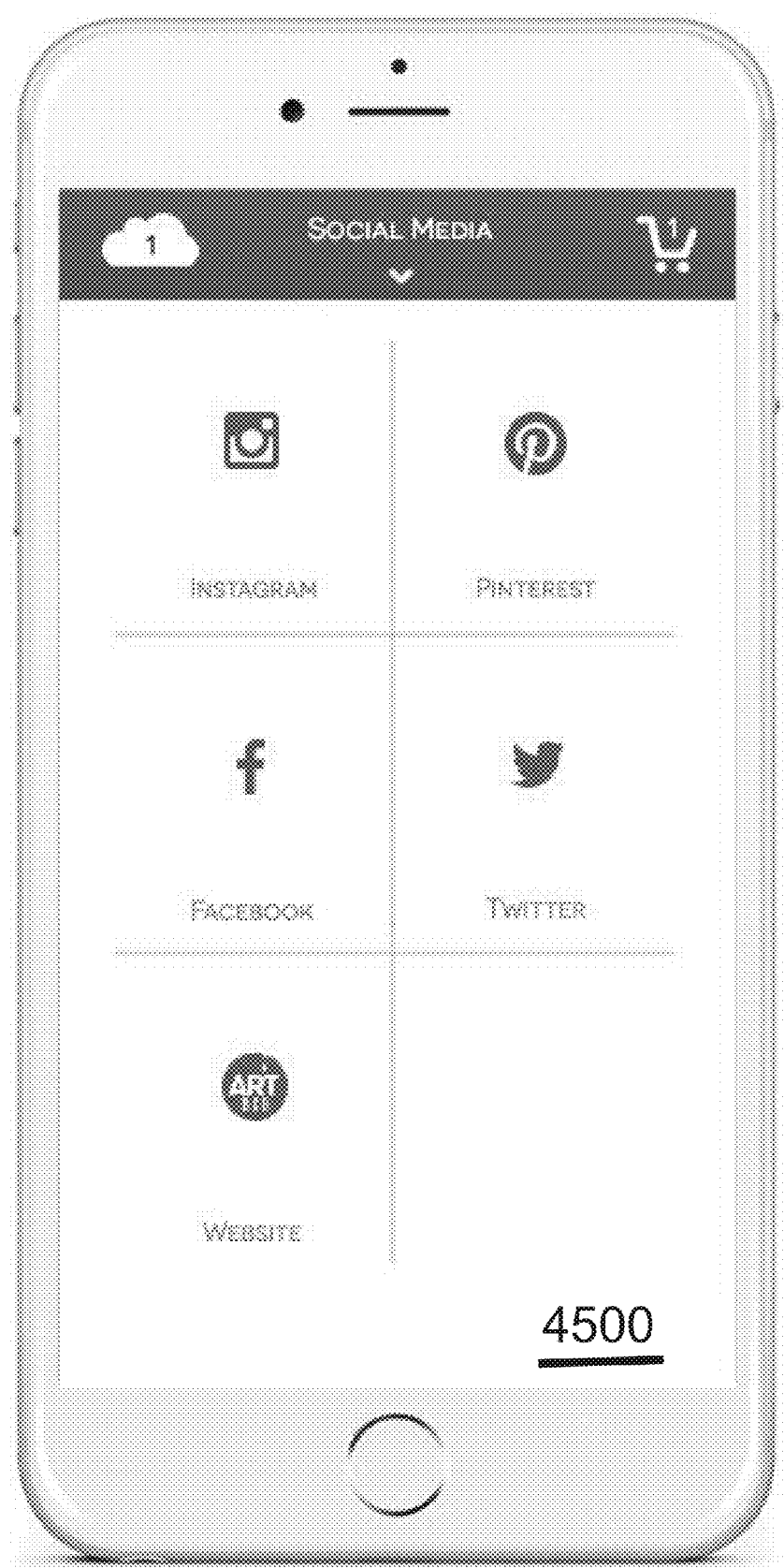
FIG. 45 depicts a social media screen of the present invention.

Turning to FIG. 45, shown therein is a screen shot of the Social Media screen 4500 of the application that allows a user to display various social networks (Instagram™, Pinterest™ Facebook™, Twitter™ or the ArtBCo™ website) via which the user can share artwork with friends. This page allows a user to share with friends by accessing ArtBCo's web page directly or via a channel from a social network.

Figure 46:
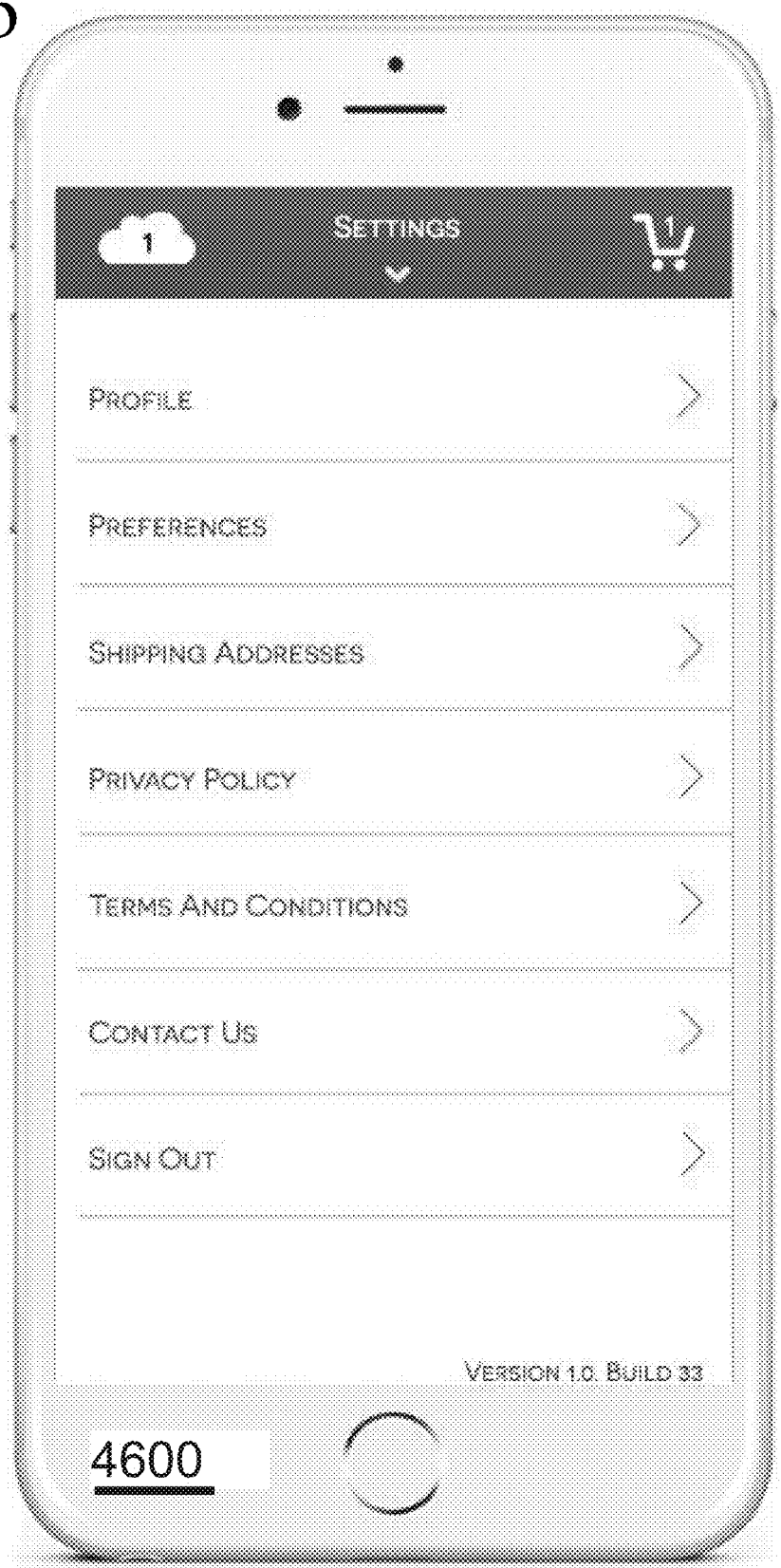
FIG. 46 depicts a profile screen for use in the application of the present invention.

The user's profile can be obtained from the Profile screen is in Settings (accessible from Navigation screen). Profile contains: first, last, email, password and edit button. Turning to FIG. 46, shown therein is a screen shot of the Settings screen 4600 of the application that allows a user to display and edit his or her profile, preferences, shipping/billing address, view the privacy policy and terms and conditions, access a contact us function, and sign out of the application. The user profile page allows users to view and/or change their personal user information such as First Name, Last Name, E-mail, and Password. Preferences let users choose between Imperial (in.) and metric (cm.) sizing of art to be displayed. Clicking Orders takes the user to a list of current and past orders and its details such as shipped date, tracking information, and contact gallery. It can contain past and current rentals, purchases or commissioning of artwork to a specific artist. It displays for each of them invoice number, amount and dates (period for rentals). Clicking Help/About us takes the user to a page displaying Contains who is ArtBCo, videos explaining the concept and differentiators, our contact info including a form to send us a message, terms & conditions, FAQ, a section on Join Us for artists and for galleries/curators, a link to our next events, and other relevant info.

Figure 31:
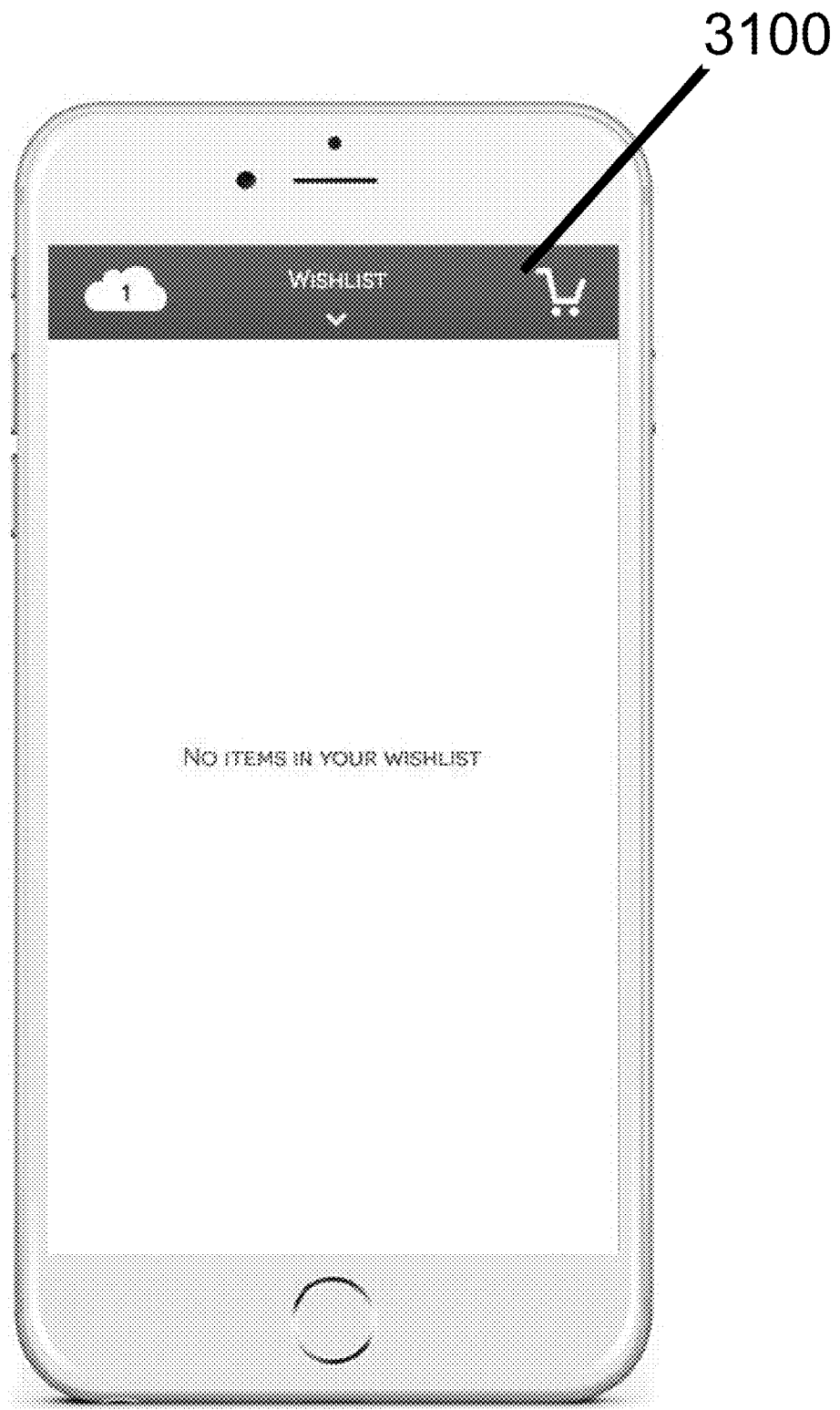
FIG. 31 depict exemplary embodiments of screen shots of a wish list of the application of the present invention according to yet another aspect of the present invention.
Figure 38:
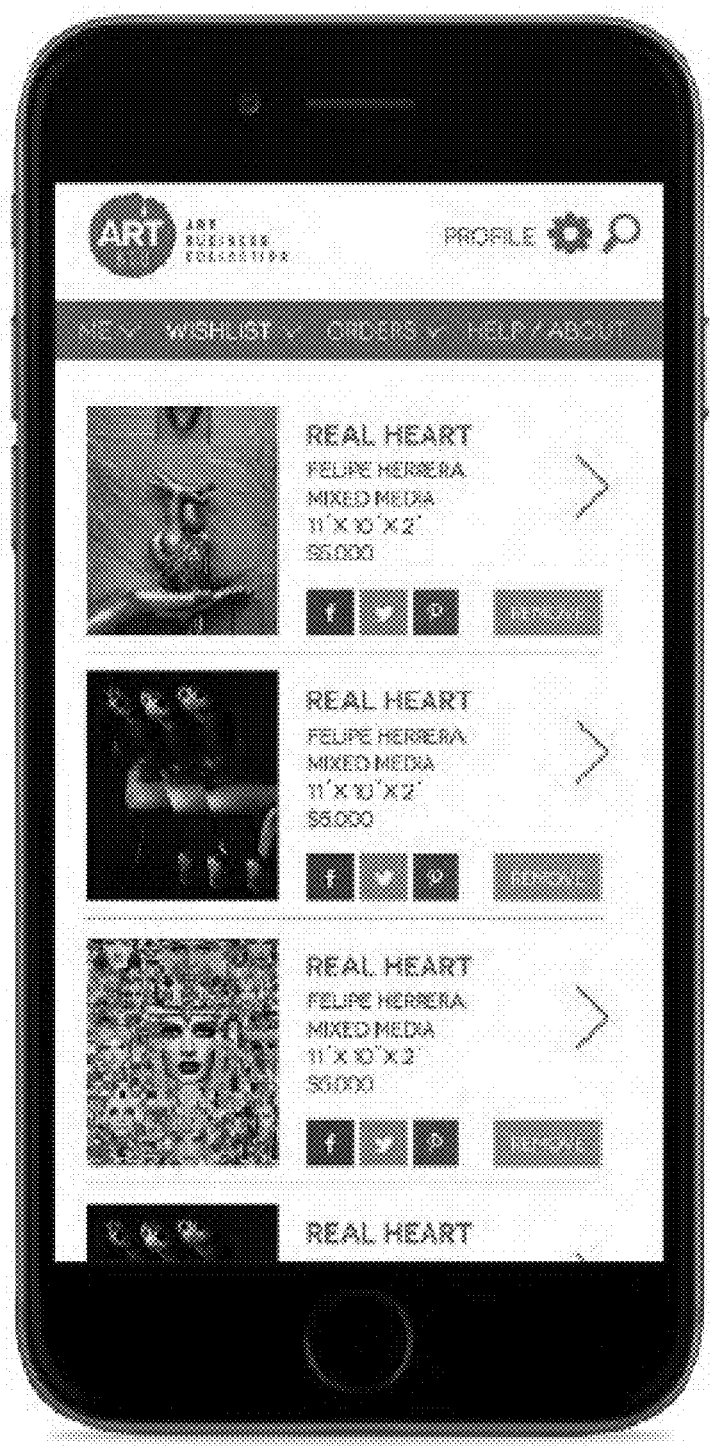

Turning to FIG. 31, shown therein is a screen shot of the Wishlist screen 3100 of the application that allows a user to display and edit his or her Wishlist. The user may access the wishlist from FIG. 37 as well. FIG. 38 shows another example of the wishlist page. This page shows each of the art pieces saved by the user in this repository. The Wishlist lists art pieces by title, author, media, dimensions, price, which they can share through social media channels, map it (screen jumps to map screen showing the location where the piece is on display) or by clicking on the image of the art piece to go to the specific page (see FIG. 39). The user can also have the option to take a piece out from their Wishlist through a Remove button.

Figure 39:
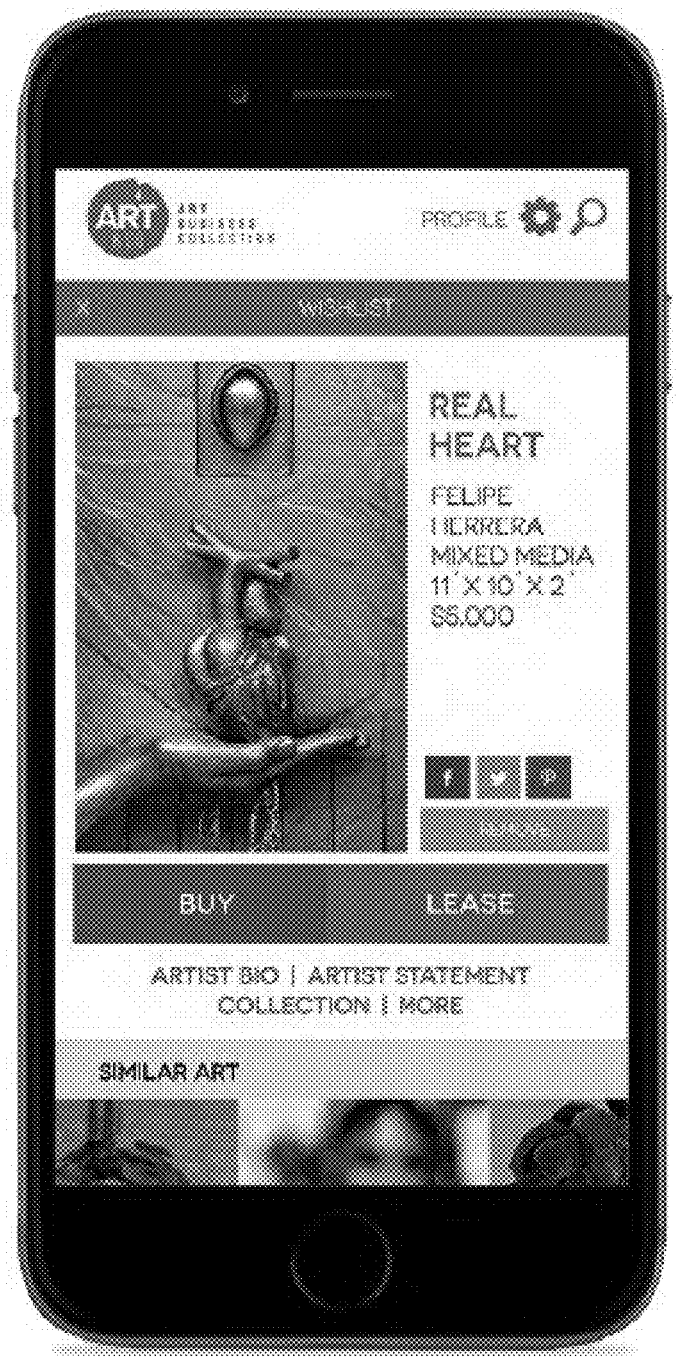
Figure 40:
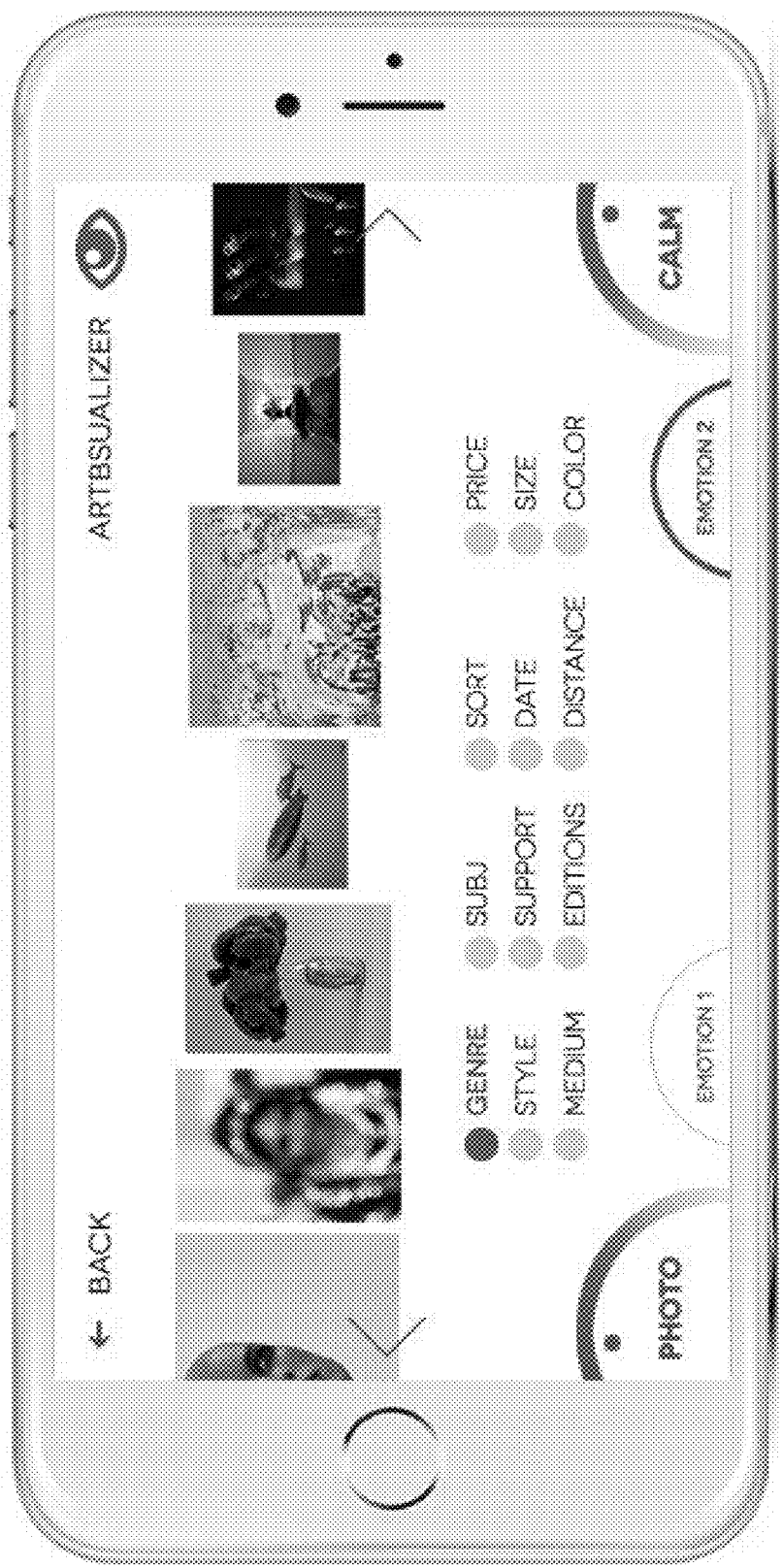
FIG. 40 depicts an exemplary embodiment of a sorting menu according to another aspect of the present invention.

Turning to FIG. 39, shown therein is a screen shot of the Wishlist Detail screen of the application that allows a user to display details of a specific piece in the Wishlist. Users can also access, in the lower section, details of the artist and his/her collection as well as see similar art. Artist Bio takes the user to a page with a picture of the artist, bio, awards, etc. Artist statement shows his/her artist statement, collection to his/her collection, more can take to video clips or other relevant material of the artist or gallery showing this artist. The user has the option to buy or lease the art by pushing the corresponding buttons or even commission a similar piece of art (e.g., same but in a different tone) to the artist by pressing the corresponding button. They can also map it, share it through social media channels or simply remove from Wishlist by clicking on the corresponding buttons. Users can also enlarge the image of the specific art piece.

Figure 33:
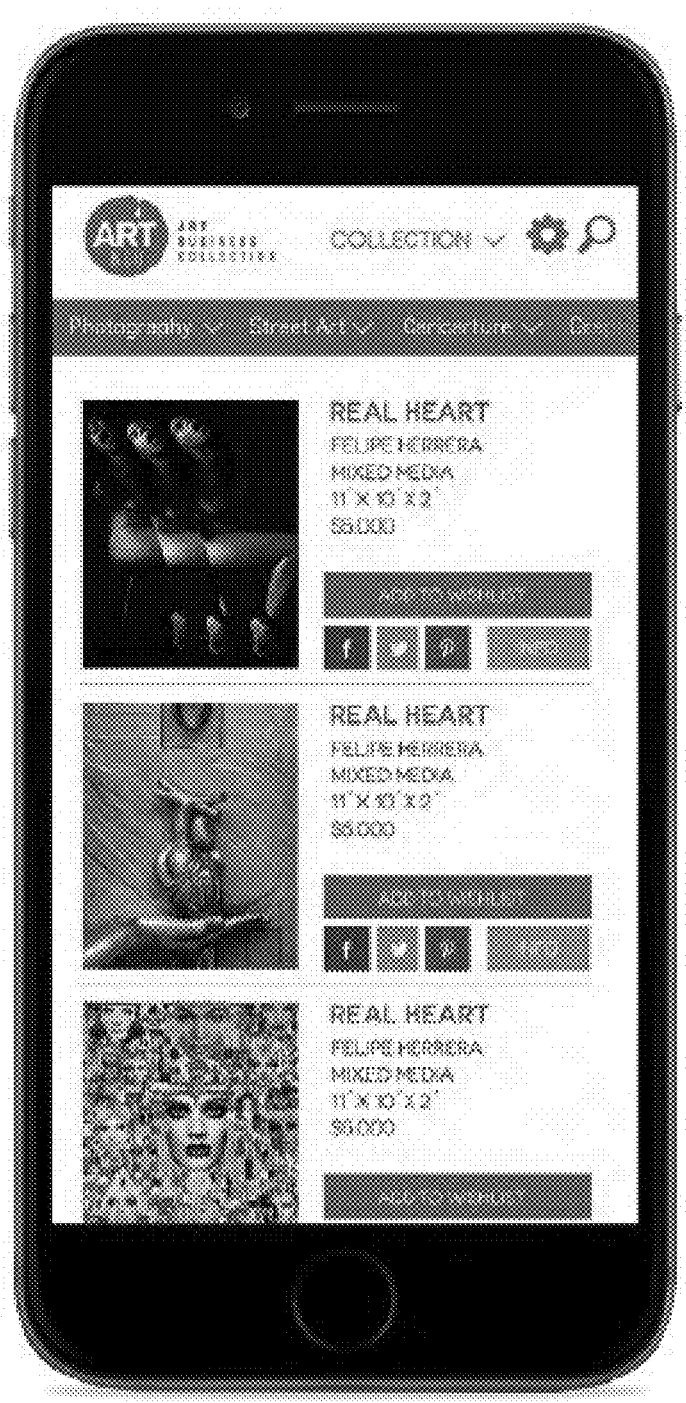
FIG. 33 depicts an exemplary embodiment of a screen shot of a sorting menu of the application of the present invention that enables a user to display art based on user selected filters according to yet another aspect of the present invention.

Turning to FIG. 33, shown therein is a screen shot of the Filtered Results screen of the application that shows the filtered artwork with its details. Applied filters appear on the top section of the page. Users can add to select art pieces to be part of their Wishlist, map them, share them through social media channels or if they want further details click on the art piece image and pass to its detailed page.

Another screen shot similar in FIG. 17 displays the Collection—Individual Artwork/Artist screen of the application that shows the specific details of an artist and/or their art. The user can access the artist and gallery details on the lower section, see similar art further down of the screen, or take an action (purchase, lease, add to Wishlist, map it or commission a similar piece to the artists, share it through social media, etc.) by pressing the corresponding buttons. Users can also enlarge the image of the specific art piece.

Other relevant features not shown in screens are included in the application of the present invention. For example, the application could include an Auctions Module as a service that also triggers push notifications and/or instant messages to enter and start placing bids on various artwork. For another example, alerts are provided when the users are near ArtBCo artwork that is relevant to the user (e.g., Wishlist, recommended, recently viewed, shared, tagged, etc. items and similar artwork), they receive an alert to visit the piece including a mapped location and relative distance. The application also includes an interface with ArtBCons (Bluetooth Low Energy enabled beacons). The application also includes an alert for marketing or to trigger sales (i.e. promotions, campaigns, notifications of relevant events, close-to-end of leasing period which asks if user wants to purchase the piece at a discount or extend the lease; if user rejects or ignores notification/offer a follow up alert asks user to purchase the piece by submitting their own offer. The user is then redirected to the gallery, dealer, purveyor to tender the transaction. Logos of participating sponsors/advertisers are displayed in the map (where they have branches or offices) similar to GPS screens that show logos of gas stations and car dealers. When a user takes a picture or "selfie" of an ArtBCo piece, the ArtBCon detects and attaches a discrete message to the bottom part of the picture with the logo of the sponsor. For example, if it is in a Bank Branch, a message at the bottom displaying the logo of the bank and a message saying "Bank is a proud sponsor of art in your community". By pressing the settings icon they can edit their profile and preferences including reviewing past orders (see FIG. 15). By pressing the magnifying glass, a search bar appears where users can type keywords and obtain the results (artwork) related to them (e.g., names of artists, galleries, themes, etc.)

Customer Data Capture and Content Management Exchange with Art Beacons

Using a platform such as PULSATE™, an ArtBCon (pronounced art beacon), and/or Eddystone, is a Bluetooth Low Energy (BLE) communications device that facilitates collecting, organizing and evaluating information captured through a platform. The communications device is programmed to gather, organize, and share information between ArtBCo's catalog of artists and prospective customers. This system is compatible with iOS, Android, and Windows platforms. It is used in tandem with the ArtBCo application. The information stored in ArtBCo's artist database includes, but is not limited to: (i) Artist's name, gender, age, and nationality; (ii) Artworks, mediums used, year produced, style, and color; (iii) Biographical information including artist's statement; (iv) Pricing, leasing, and commissioning options; (v) Location (i.e., gallery, public or private building such as corporate offices, retailers, hotels and or condominiums, etc.) and address; (vi) Status (i.e., available for purchase, lease, on hold, currently on lease, sold).

In order for users to access this information, and additional advanced features, they must first install the ArtBCo application and build a new profile. Once users create their profile the ArtBCo system analyses the user's preferences to match them with artworks currently available. The main information users must provide for the system to work is: (i) Name; (ii) Email; (iii) Preferences (The information users enter here becomes the default query which the system uses to find and display on the user interface (PC and App)); (iv) Address (Street, Apt., City, State, Zip, Country, Phone); (v) Credit Card (Card Number, Card Holder, Expiration Month, Expiration Year, Security Code, option to save in profile); and (vi) Social Media handles (Allows users to tag other users within the app).

A user may forego this process but in doing so they will only have access to a limited range of features. These include: (i) View and filter artworks in their immediate area; and (ii) View basic artist and artwork content.

Figure 42:
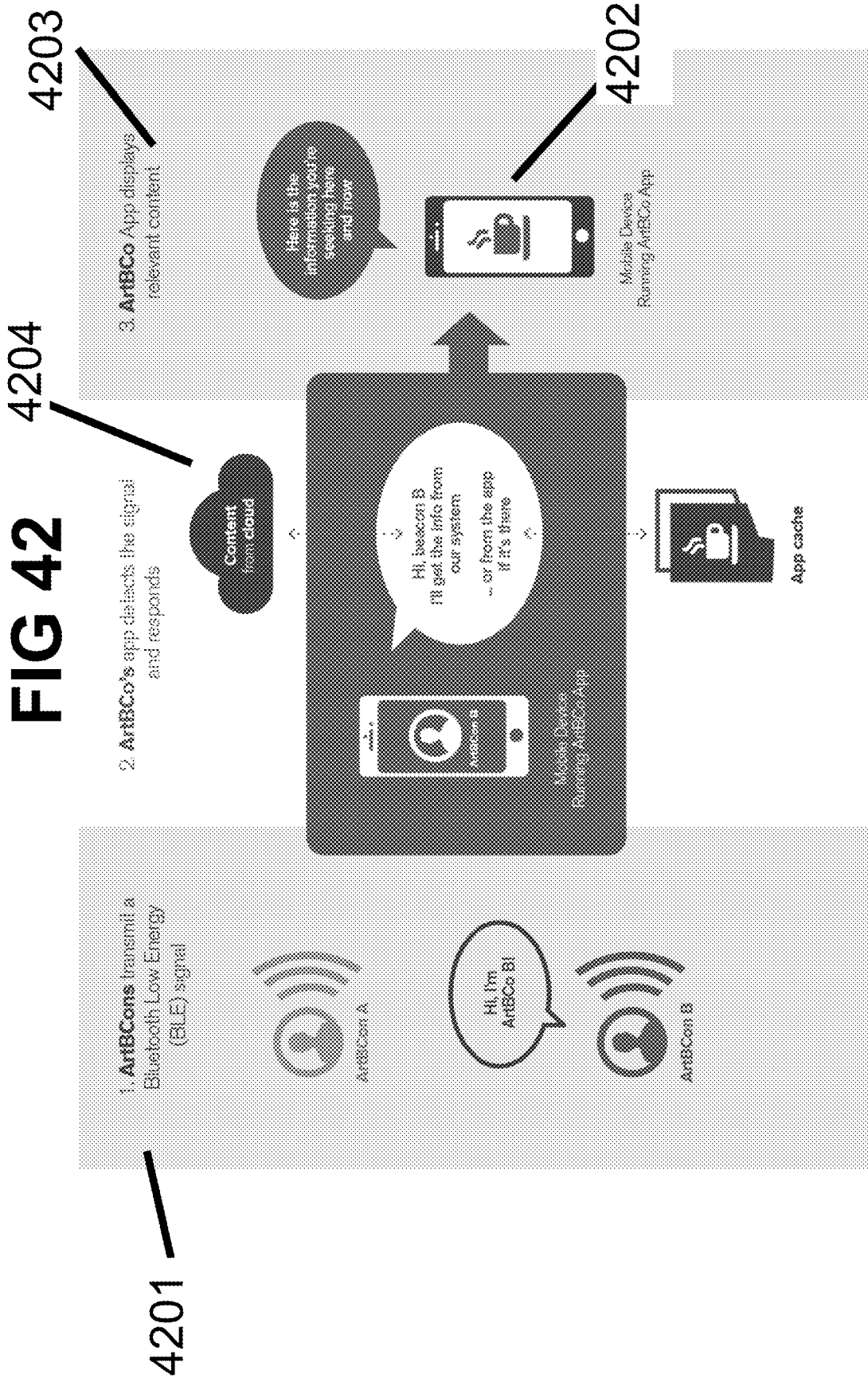
FIG. 42 depicts another exemplary embodiment of a block diagram of an apparatus according to another aspect of the present invention.

Turning to FIG. 42, the ArtBCon is a spatial positioning system 4201 that communicates with mobile devices 4202 (executing a previously downloaded Application Component) via Bluetooth Low Energy (BLE) technology. The signal strength and amplitude of each ArtBCon can be adjusted to cover a wide or narrow field to avoid interference with the signals from other nearby ArtBCons given the space requirements of each participating business. This system works together with a software solution designed to deliver relevant content 4203 to mobile devices 4202 running the proprietary app via the cloud 4204 (e.g., Internet coupled computing platform). ArtBCons can be applied to a range of functionalities from welcome messages to contextual marketing communications.

When a mobile device is within a micro-fence of an ArtBCon it "listens" for the signal being transmitted which triggers the app to interact with the solution to obtain hyper-contextual content in real-time.

Figure 41:
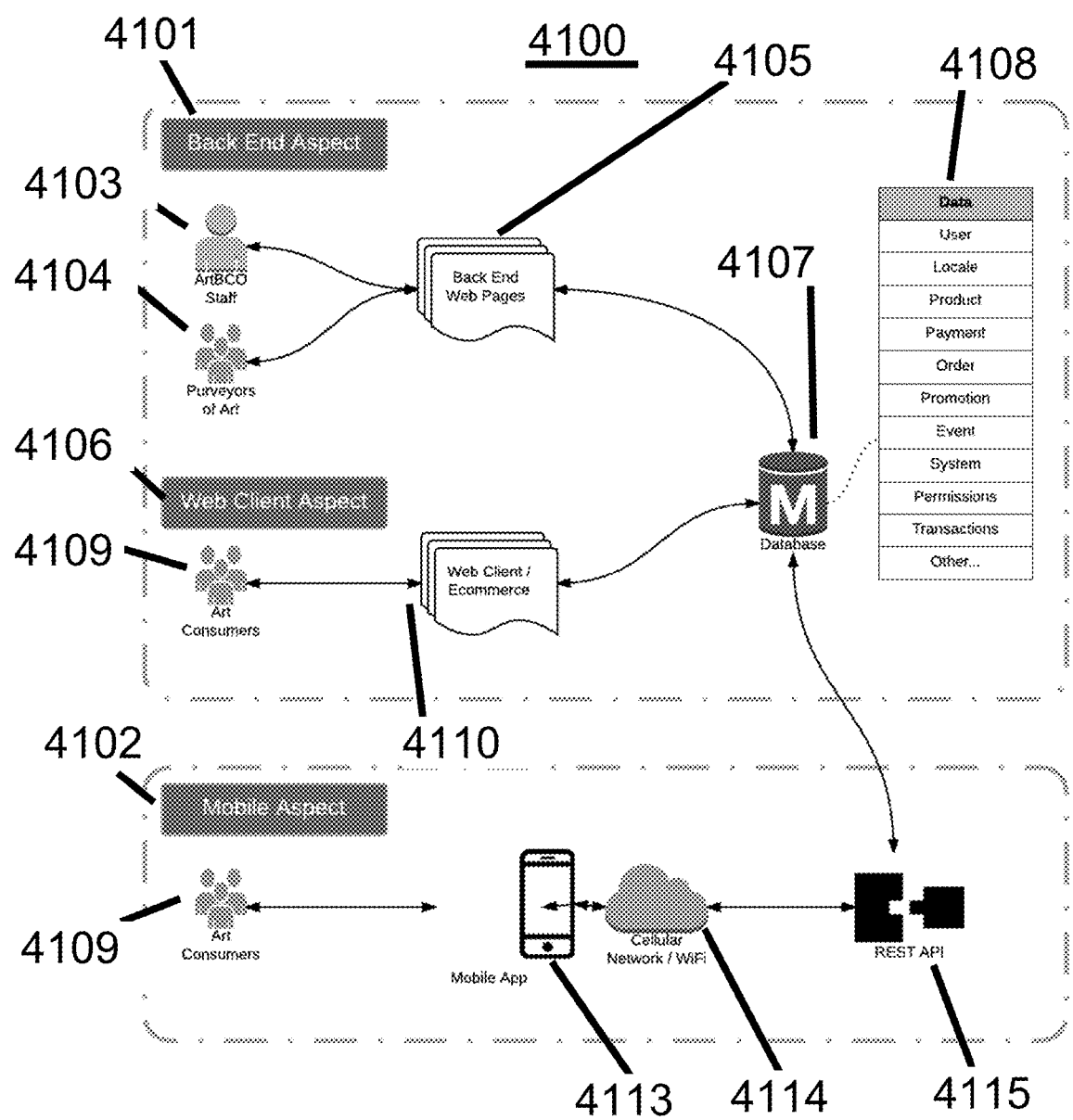
FIG. 41 depicts an exemplary embodiment of a block diagram of an apparatus according to one aspect of the present invention.

Turning to FIG. 41, an embodiment 4100 of the present invention includes a back end aspect 4101, a web client aspect 4106 and a mobile aspect 4102. The back end aspect 4101 includes back end web pages 4105, which are accessed by staff 4103 and purveyors of art 4104 and which utilize database 4107. The web client aspect 4106 has art consumers 4109 accessing a web client/ecommerce web site 4110, which also utilizes database 4107. The mobile aspect 4102 includes a restful-API (interface) 4115, and a client 4113 (e.g., mobile device, tablet, web pc, portable computing device, etc.) for consumers 4112 coupled via a cellular network or WiFi 4114. The content requested is drawn from the central repository 4107 and relays elements such as, but not limited to, artist's biography, artist's statement, artwork descriptions, artwork availability, gallery or venue information, events and related digital marketing collateral. Database stores data 4108, such as user, locale, product, payment, order, promotion, event, system, permissions, transactions and other information.

By providing immersive content, the solution receives and records quantifiable behaviors in the form of "big data." Big Data is best described as the volume of data generated at the systemic level (transaction, streaming, POS, auto-tagging, deep links) at high velocity from a variety of entry points (The three V's); in the context of ArtBCo these volumes of data are captured through the preferences, interests, interactions, and responses. These data are accumulated as qualitative (experience-based) information that is parsed, categorized, and organized as quantitative analytics (measurable data). The solution also captures and retains demographic information when users create their individual profiles. This material is used to create an initial layer of segmentation that includes, but is not limited to: Name; Email; Preferences; Artist's name, gender, age, and nationality; Artworks, mediums used, year produced, style, and color; Biographical information including artist's statement; Pricing, leasing, and commissioning options; Location (i.e. gallery, public space) and address; Status (i.e. available for purchase, lease, on hold, currently on lease, sold); Address (Street, Apt., City, State, Zip, Country, Phone); Credit Card (Card Number, Card Holder, Expiration Month, Expiration Year, Security Code, option to save in profile); Social Media handles (Allows users to tag other users within the app).

A user may forego this process by tapping on the "Skip" button at Sign Up. Doing so allows users to navigate the app with limited features. Users will not be able to: Add to cart, checkout, buy, or lease; Share on social media; Save artworks to their Wishlist; and Receive notifications.

Geo-Fencing and Contextual Marketing

Art purveyors can define a specified geographical (geo-fence) range where, upon entering (breaching) this area, users receive an alert, text message, or an email, from participating businesses. An alert can only be received if a user has opted-in allowing alerts on the user's portable computing device or smart phone while active or running in the background, however, if the application is not active then a text message and/or email is sent which does not necessarily coincide with a user being within a geo-fence and/or micro-fence. Users can set this trigger when they are creating their profile, which will activate immediately based on their preferences, or opting-in upon initial launch of the application. Artworks added to 'Wishlist' may also trigger an alert when users enter a geo-fenced area.

The alert also serves to deliver Contextual Marketing that can capture:

The effectiveness of the alert; that is, how many users actually follow the alert it into a business as a product of lead generation or recalled back into the business after exiting without recording a transaction.

Capture client whereabouts that lead to understanding how often a client visits a particular gallery or area where art is kept.

Measure engagement. Does the client now seek other venues where their favorite artists and galleries are showing or do they only show interest in specific pieces?

By collecting and analyzing this data in real time, targeted marketing efforts are customized, context-specific, and deliver relevant messaging more effectively which increases conversions. The collection of data is not necessarily dependent on a user being in a geo-fenced and/or micro-fenced area as the solution can pull information from other points of entry such as searching, filtering, and sharing artworks through social channels, events, as well as preferences.

Relevant/current information: Once a client enters a gallery either by following an alert, or by walk-in, they begin interacting and learning more about current offerings. Information regarding new artists, artwork, events, availability of items (sold, price, leasing), promotions, exhibitions, etc. is made readily available through the solution. The data gathered provides:

Analytic information: Clients' interest level can be categorized by assessing whether they remain focused on what they came to see or if they become engaged with related items.

Trends: User engagement is compiled to show where the 'hotspots' exist. Reflects if a particular artist or artwork resonates with the public, which can help drive selling costs as well as the artists' status.

Recommendations: Related material is recommended based on the user's preferences whether stated or inferred. These items are actively forwarded to the user which is measured separately.

Segmentation: Clients may be automatically tagged for future promotions, events, exhibitions, and various art categories. For example, if a client walks into a gallery, or is browsing online, and adds an artist or artwork, categorized as 'Abstract', for the first time to their Favorites they are automatically tagged as "Interested in: Abstract."

Locator functionality: The solution allows users to locate where art is kept. It acts as the bridge between a gallery's database and the user interface using a map portal (PC or App).

Measuring Behavioristics: When a client searches for a particular artwork the system calculates the distance they must travel to view it; this information can be used to determine how far clients are willing to travel and during what times and do these leads result in any transactions. This information would be used to define a media strategy based on reach and frequency.

Feedback: Clients, artists, galleries, dealers, and affiliates have the ability to communicate directly with one another before, during, and after calendar events, exhibits, and everyday walk-ins.

Clients: The information clients leave can help to strengthen, improve, or settle the relationship they have with providers (artists, galleries, dealers, affiliates). They can comment on their experience which allows providers to continue their day-to-day and reciprocate or handle matters before they reach social media Providers benefit from this information by continuing their operations and either enhancing the experience or adapting to clients' concerns. This also creates an opportunity for follow up and re-engaging clients to determine if their efforts are effective.

The interaction between users and the solution enhances the experience by strengthening engagement, differentiating ArtBCo's brand from its competition through its integrated solution and ease of use that also gives it a competitive advantage, and establishes a brand presence which effectively amplifies brand loyalty and long term client equity.

1. Alerts: A push-notification that is triggered when a client is within a geo-fence and/or micro-fence to where an artwork is being kept (i.e., gallery, restaurant, bank lobby, art school lobby, etc.) which invites the passer-by client into the space to view and interact with the art in which the user has indicated interest and/or has been hyper-contextually linked. To enable this feature a user must set a distance in proximity to where the art is kept and that either the artist or a particular artwork is itemized in the user's 'Wishlist' and/or shared/tagged through social media, meaning they only want to be sent an alert when they are within 100 feet of the art. The alert also serves as/to:

A call to action which measures the effectiveness of the alert; how many clients actually follow it into a space to view the art.

Capture client movements which leads to understanding how often a client visits a particular gallery or area where art is kept.

Measure engagement: Does the client now seek other venues where their favorite artist are showing or do they only show interest in very specific pieces.

By collecting and analyzing this data, marketing efforts can be adjusted and delivered more strategically at certain times of the day, month, or year in order to trigger more transactions.

2. Relevant/current information: Once a client enters a gallery either by following an alert, or as a walk-in, they begin interacting and learning more about what is being offered. Information regarding new artists, artwork, events, availability of items (sold, price, leasing, commissioning), promotions, exhibitions, etc. is made readily available through the ArtBCon platform. The data gathered provides:

Analytic information: Clients' interest level can be categorized by assessing whether they remain focused on what they came to see or if they become engaged with related items.

Trends: User engagement is compiled to show where the 'hotspots' exist. Reflects if a particular artist or work is resonating with the public which can help drive up selling cost and the artists' status.

Recommendations: Related material is recommended based on the user's preferences. These items are actively forwarded to the user which can be measured separately Segmentation: Clients can be automatically tagged for future promotions, events, exhibitions, and various art categories. For example, if a client walks into a gallery, or browsing online, and adds an artist or artwork, categorized as 'Abstract', for the first time to their Favorites they are automatically tagged as "Interested in: Abstract."

3. Locator functionality: ArtBCons allow users to locate where art is kept. It acts as the bridge between a gallery's database and the user interface (PC or App).

Measuring Behavioristics: When a client searches for a particular artwork the system calculates the distance they must travel to view I; this information is stored and can be used to determine how far clients are willing to travel and when.

4. Feedback: Clients, artists, galleries, dealers, and affiliates have the ability to communicate directly with one another before, during, and after calendar events, exhibits, and everyday walk-ins.

Clients: The information clients leave can help to strengthen, improve, or settle the relationship they have with providers (artists, galleries, dealers, affiliates). They can comment on their experience which allows providers to continue their day-to-day and reciprocate or handle matters before they reach social media Providers benefit from this information by continuing their operations and either enhancing the experience or adapting to clients' concerns. This also creates an opportunity for follow up and re-engaging clients to determine if their efforts are effective.

The interaction between users and ArtBCons enhances the user experience in that it strengthens engagement, differentiates the ArtBCo brand from competition with its advanced platform and ease of use, realizes a competitive advantage, and establishes a brand presence which effectively amplifies brand loyalty and long term equity.

Filter

Turning to FIG. 30, the present invention ensures a creative and entertaining user experience. The Filter design delivers an intuitive and fun gamer-style look and feel.

1. Users begin by tapping on one of the Filter Categories located at the center of the screen to activate it and begin filtering.

2. The category will populate on-screen with a default of "All"

3. By selecting one or more sub-categories the user can narrow their search. Users can filter one category at a time but may use all the categories available.

4. To save more than two selections, users must tap one category at a time and tap Apply to render the results or Reset to begin filtering from default all.

5. Applied selections will appear above the displayed art as "Genre: Photo, Oil on Canvas, etc. . . . " for each category 6. The Art by Emotion category behaves the same as described in steps 1-5 above but filters art based on a pre-determined assortment of "emotions."

No other art site or available app currently offers a combination of features including geolocation, visualization, hyper-contextual marketing, and buying and leasing or provides rich media and related content in one user-friendly platform. The combination of these features creates a unique user experience to promote purchases of art.

The present invention may be implemented on multiple remote computers and servers that provide processing, storage, and input/output devices executing application programs and the like. Remote computers may be linked over communication links through communications networks to each other and to other computing devices, including servers, handheld computers or the like. The communications network can be part of the Internet, a worldwide collection of computers, networks, and gateways that currently use the TCP/IP suite of protocols to communicate with one another. The Internet provides a backbone of high-speed data communication lines between major nodes or host computers, comprising thousands of commercial, government, educational and other computer networks, that route data and messages. However, computers and servers may be linked over any suitable communication network.

Embodiments of the invention may operate in any client-server arrangement or in any networked arrangement in which resources that originate communications and resources that receive communications may reside on separate elements in a network. For example, embodiments of the invention may operate in a mobile communications/data architecture (such as a mobile telecommunications network adhering to the International Mobile Telecommunications-2000 (also termed 3G) or IMT-Advanced (also termed 4G) standards), in which a mobile telecommunications device (e.g., cell/mobile telephone) communicates.

Each computer typically contains system bus, where a bus is a set of hardware lines used for data transfer among the components of a computer. The bus is essentially a shared conduit that connects different elements of a computer system (e.g., processor, disk storage, memory, input/output ports, network ports, etc.) that enables the transfer of information between the elements. Attached to the system bus is I/O device interface for connecting various input and output devices (e.g., displays, printers, speakers, microphones, etc.) to the computer. Alternatively, the I/O devices may be connected via one or more I/O processors attached to the system bus. A network interface allows the computer to connect to various other devices attached to a network. Memory provides volatile storage for computer software instructions and data used to implement an embodiment of the present invention. Disk storage provides non-volatile storage for computer software instructions and data used to implement an embodiment of the present invention. A central processor unit is also attached to system bus and provides for the execution of computer instructions. The present invention may be a system, a method, and/or a computer program product.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's handheld computer, partly on the user's handheld computer, as a stand-alone software package, partly on the user's handheld computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus to enable a user to interact with at least one of a plurality of artwork displays using a portable computing device comprising:
    a computing platform including:
        a database storing a relevant content file regarding each of the plurality of artwork displays in relation with a unique instruction for each of the plurality of artwork displays; and
        a server coupled to the database and to be coupled to a communications network to enable a plurality of other computing devices that are also coupled to the communications network to interact with the database;
    a plurality of spatial positioning systems, each disposed near one of the plurality of artwork displays, each of said spatial positioning systems to transmit a low energy beacon having encoded therein one of the unique instructions related to said one of the plurality of artwork displays near which said each spatial positioning system is disposed; and
    a non-transitory computer readable media having encoded thereon an application for executing on the portable computing device, said application to enable the portable computing device to interact with the communications platform upon detection of one of the low energy beacons by using an encoded unique instruction encoded in the detected low energy beacon to obtain the relevant content file related to the encoded unique instruction from the database.

2. The apparatus according to claim 1, wherein the relevant content file includes one of more of the following types of information: an artist's biography, an artist's statement, one or more artwork descriptions, artwork availability, gallery information, venue information and related digital marketing collateral.

3. An apparatus to enable a user to interact with at least one of a plurality of artwork displays using a portable computing device comprising:
    a computing platform including:
        a database storing a relevant content file regarding each of the plurality of artwork displays in relation with a unique instruction for each of the plurality of artwork displays; and
        a server coupled to the database and to be coupled to a communications network to enable a plurality of other computing devices that are also coupled to the communications network to interact with the database;
    a plurality of spatial positioning systems, each disposed near one of the plurality of artwork displays, each of said spatial positioning systems to transmit a low energy beacon having encoded therein one of the unique instructions related to said one of the plurality of artwork displays near which said each spatial positioning system is disposed;
    a non-transitory computer readable media having encoded thereon an application for executing on the portable computing device, said application to enable the portable computing device to interact with the communications platform upon detection of one of the low energy beacons by using an encoded unique instruction encoded in the detected low energy beacon to obtain the relevant content file related to the encoded unique instruction from the database; and a visualizing module in which a user can take a picture of a desired location of selected artwork, specify dimensions within the picture, electronically place the selected artwork into the picture and view the selected artwork in proportion in the desired location, thereby enabling the user to view size, color and image suitability of the artwork.

4. An apparatus to enable a user to interact with at least one of a plurality of artwork displays using a portable computing device comprising:

a computing platform including:

a database storing a relevant content file regarding each of the plurality of artwork displays in relation with a unique instruction for each of the plurality of artwork displays; and a server coupled to the database and to be coupled to a communications network to enable a plurality of other computing devices that are also coupled to the communications network to interact with the database;

a plurality of spatial positioning systems, each disposed near one of the plurality of artwork displays, each of said spatial positioning systems to transmit a low energy beacon having encoded therein one of the unique instructions related to said one of the plurality of artwork displays near which said each spatial positioning system is disposed; and a non-transitory computer readable media having encoded thereon an application for executing on the portable computing device, said application to enable the portable computing device to interact with the communications platform upon detection of one of the low energy beacons by using an encoded unique instruction encoded in the detected low energy beacon to obtain the relevant content file related to the encoded unique instruction from the database; and the application enables an alert to be displayed on the portable computing device, which alert is triggered when the portable computing device is within a geo-fence and/or micro-fence where a previously selected work of art is being displayed, which alert invites the user of the portable computing device into the location to view and interact with the previously selected work of art in which the user has previously indicated interest and/or is hypercontextually linked.

5. The apparatus according to claim 4, wherein the application enables the user to establish a predetermined distance in proximity to the location in which the previously selected art is being displayed, which controls a distance from the location at which the alert is triggered.

6. A method for interacting with a user regarding one or more displays of one or more works of art comprising:

storing relevant content regarding said one or more displays of said one or more works of art, each of the stored relevant content being stored in relation with a unique instruction;

disposing a plurality of transmitters near a plurality of displays of the one or more works of art, each transmitter being disposed near only one of the one or more displays, each of the transmitters transmitting a low energy beacon having encoded therein only one of the unique instructions for said only one of said one or more displays; and causing a mobile device to interact with a server and a database upon detection of one of the low energy beacons being transmitted for a particular one of the one or more displays using an encoded instruction encoded within the detected one of the low energy beacons to obtain the relevant content related to the encoded instruction and the particular one of the one or more displays.

7. The method according to claim 6, wherein the relevant content comprises one or more of the following: an artist's biography, an artist's statement, one or more artwork descriptions, artwork availability, gallery information, venue information and related digital marketing collateral.

8. A method for interacting with a user regarding one or more displays of one or more works of art comprising:

storing relevant content regarding said one or more displays of said one or more works of art, each of the stored relevant content being stored in relation with a unique instruction;

disposing a plurality of transmitters near a plurality of displays of the one or more works of art, each transmitter being disposed near only one of the one or more displays, each of the transmitters transmitting a low energy beacon having encoded therein only one of the unique instructions for said only one of said one or more displays; and causing a mobile device to interact with a server and a database upon detection of one of the low energy beacons being transmitted for a particular one of the one or more displays using an encoded instruction encoded within the detected one of the low energy beacons to obtain the relevant content related to the encoded instruction and the particular one of the one or more displays; and generating an alert to be displayed on the mobile device, which alert is triggered when the mobile device is within a geo-fence and/or micro-fence where a selected work of art in which the user of the mobile device has previously expressed interest is being displayed, which alert invites the user of the mobile device into the location to view and interact with the selected work of art.

9. The method according to claim 8, further comprising enabling the user to establish a predetermined distance in proximity to the location in which the selected work of art is being displayed, which controls a distance from the location at which the alert is triggered.

10. A method for interacting with a user regarding one or more displays of one or more works of art comprising:

providing an art viewing application to a subscriber for installation on a wireless communications device;

storing relevant content regarding each of said one or more displays of said one or more works of art, each of the one or more displays having associated therewith a unique instruction via which the relevant content for said each of the one or more displays can be retrieved; and disposing a plurality of transmitters near a plurality of displays of one or more works of art, each transmitter being disposed near a particular one of the one or more displays, each of the transmitters transmitting a low energy beacon having encoded therein a particular unique instruction for a particular one of the one or more displays.

11. The method according to claim 10, further comprising:

causing the wireless communications device to interact with a server and a database upon detection of one of the low energy beacons and the particular unique instruction encoded therein.

12. The method according to claim 11, further comprising:
transmitting formatted relevant content regarding the particular one of the one or more displays associated with the particular unique instruction over a wireless communication channel to the wireless communications device associated with the subscriber.

13. The method according to claim 11, further comprising activating an alert to cause the alert to display on the wireless communications device and to enable connection under user control via a URL to the server and database over the Internet when the wireless communications device breaches the micro-fence of any of the beacons or has breached a geo-fenced area.

14. The method according to claim 10, wherein the relevant content comprises one of more of the following: an artist's biography, an artist's statement, one or more artwork descriptions, artwork availability, gallery information, venue information and related digital marketing collateral.

15. A non-transitory computer readable media having encoded thereon an application for executing on a portable communications device to enable a user to interact with one or more displays of one or more works of art, said application comprising:
a detection module to enable the portable communications device to detect a low energy beacon having encoded therein a unique instruction code associated with one of the one or more displays of the one or more works of art;
a communications module to cause the portable communications device to interact with a database storing relevant content regarding the one or more displays of the one or more works of art upon detection of the low energy beacon using the unique instruction encoded within the low energy beacon to obtain relevant content regarding said one of the one or more displays of the one or more works of art; and
a viewing module to enable the user to view the relevant content regarding said one of the one or more displays of the one or more works of art on the portable communications device.

16. A non-transitory computer readable media having encoded thereon an application for executing on a portable communications device to enable a user to interact with one or more displays of one or more works of art, said application comprising:
a detection module to enable the portable communications device to detect a low energy beacon having encoded therein a unique instruction code associated with one of the one or more displays of the one or more works of art;
a communications module to cause the portable communications device to interact with a database storing relevant content regarding the one or more displays of the one or more works of art upon detection of the low energy beacon using the unique instruction encoded within the low energy beacon to obtain relevant content regarding said one of the one or more displays of the one or more works of art;
a viewing module to enable the user to view the relevant content regarding said one of the one or more displays of the one or more works of art on the portable communications device; and
a visualizing module in which a user can take an image of a desired location of selected artwork, specify dimensions within the image, electronically place the selected artwork in the image and view the selected artwork in proper scale within the image of the desired location, thereby enabling the user to view the selected artwork in the desired location to view size, color and image suitability of the selected artwork.

17. The non-transitory computer readable media according to claim 15, wherein the communications module generates an alert to display on the portable communications device and upon user control to enable connection via a URL to the database over the Internet when the portable communications device breaches the micro-fence of any of the beacons or has breached a geo-fenced area.

18. The non-transitory computer readable media according to claim 15, wherein the relevant content comprises one of more of the following: an artist's biography, an artist's statement, one or more artwork descriptions, artwork availability, gallery information, venue information and related digital marketing collateral.

19. A non-transitory computer readable media having encoded thereon an application for executing on a portable communications device to enable a user to interact with one or more displays of one or more works of art, said application comprising:
a detection module to enable the portable communications device to detect a low energy beacon having encoded therein a unique instruction code associated with one of the one or more displays of the one or more works of art;
a communications module to cause the portable communications device to interact with a database storing relevant content regarding the one or more displays of the one or more works of art upon detection of the low energy beacon using the unique instruction encoded within the low energy beacon to obtain relevant content regarding said one of the one or more displays of the one or more works of art;
a viewing module to enable the user to view the relevant content regarding said one of the one or more displays of the one or more works of art on the portable communications device;
an alert to be displayed on the portable communications device, which alert is triggered when the portable communications device is within a geo-fence and/or micro-fence where a user-selected work of art is being displayed, which alert invites the user of the portable communications device into the location to view and interact with the user selected work of art in which the user has previously indicated interest.

20. The non-transitory computer readable media according to claim 19, wherein a user sets a predetermined distance in proximity to the location in which the user selected art is being displayed, which controls the distance from the location at which the alert is triggered.

21. An apparatus to enable a user to interact with at least one of a plurality of artwork displays using a portable computing device comprising:
a computing platform including:
a database storing a relevant content file regarding each of the plurality of artwork displays in relation with a unique instruction for each of the plurality of artwork displays; and
a server coupled to the database and to be coupled to a communications network to enable a plurality of other computing devices that are also coupled to the communications network to interact with the database;

a contextual marketing platform establishing a geo-fence around the plurality of artwork displays, said geo-fence including a macro-fence area capable of covering an area as small as a city block, a building or a country;

a non-transitory computer readable media having encoded thereon an application for executing on the portable computing device, said application to enable the portable computing device to interact with the communications platform and the contextual marketing platform upon the portable computing device breaching the geo-fence; and said application providing an alert to be displayed on the portable communications device, which alert is triggered when the portable communications device breaches the geo-fence where a user-selected work of art is being displayed, which alert invites the user of the portable communications device into the location to view and interact with the user selected work of art in which the user has previously indicated interest.

22. The apparatus according to claim 21, wherein the application actively monitors behavior of the user while inside the geo-fence.

23. The apparatus according to claim 21, further comprising one or more transmitters each transmitting a beacon inside the geo-fence to establish a micro-fence within the geo-fence, wherein the application actively monitors behavior of the user while inside the geo-fence, including measuring an amount of time a user dwells within said micro-fence.

24. The apparatus according to claim 21, wherein the application actively monitors behavior of the user while inside the geo-fence, including determining a location by storing in the database a beacon location, a beacon identification and a gallery address where each beacon is located.

25. The apparatus according to claim 21, wherein the application actively monitors behavior of the user while inside the geo-fence, and said application stores the user behavior as big data for later analysis and targeted marketing.

* * * * *